United States Patent
Zhang et al.

(10) Patent No.: US 11,111,368 B2
(45) Date of Patent: Sep. 7, 2021

(54) MEANS FOR INCREASING THE MOLECULAR WEIGHT AND DECREASING THE DENSITY OF ETHYLENE INTERPOLYMERS EMPLOYING HOMOGENEOUS AND HETEROGENEOUS CATALYST FORMULATIONS

(71) Applicant: NOVA Chemicals (International) S.A., Fribourg (CH)

(72) Inventors: Zengrong Zhang, Calgary (CA); Niousha Kazemi, Calgary (CA); Stephen Salomons, Calgary (CA); Monika Kleczek, Calgary (CA); Mehdi Keshtkar, Calgary (CA); Brian Molloy, Airdrie (CA); Qinyan Wang, Calgary (CA); Peter Zoricak, Calgary (CA); Charles Carter, Calgary (CA); XiaoChuan Wang, Calgary (CA); Christopher Dobbin, Calgary (CA); Fazle Sibtain, Calgary (CA); Kenneth Taylor, Sarnia (CA); Lawrence VanAsseldonk, Sarnia (CA); Hamidreza Khakdaman, Houston, TX (US)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 16/910,141

(22) Filed: Jun. 24, 2020

(65) Prior Publication Data

US 2020/0325317 A1    Oct. 15, 2020

Related U.S. Application Data

(63) Continuation of application No. 16/557,153, filed on Aug. 30, 2019, now Pat. No. 10,738,183, which is a
(Continued)

(51) Int. Cl.
*C08L 23/08* (2006.01)
*C08F 210/16* (2006.01)
(Continued)

(52) U.S. Cl.
CPC ........ *C08L 23/0815* (2013.01); *C08F 210/16* (2013.01); *C08J 5/18* (2013.01);
(Continued)

(58) Field of Classification Search
CPC ............. C08L 23/0815; C08L 2203/16; C08L 2205/025; C08L 2205/03; C08L 2207/07;
(Continued)

(56) References Cited

U.S. PATENT DOCUMENTS 5,198,401 A    3/1993  Turner et al.
5,382,630 A    1/1995  Stehling et al.
(Continued)

FOREIGN PATENT DOCUMENTS

WO    WO 2006/102155 A2 *   9/2006

*Primary Examiner* — William K Cheung
(74) *Attorney, Agent, or Firm* — Thomas J. Styslinger

(57) ABSTRACT

A continuous solution polymerization process is disclosed wherein at least two catalyst formulations are employed. A first homogeneous catalyst formulation is employed in a first reactor to produce a first ethylene interpolymer and a first heterogeneous catalyst formulation is employed in a second reactor to produce a second ethylene interpolymer. Optionally a third ethylene interpolymer is formed in a third reactor. The resulting ethylene interpolymer products possess desirable properties in a variety of end use applications, for example in film applications. A means for increasing the molecular weight of the first ethylene interpolymer is disclosed and/or a means for increasing the temperature of the first reactor, relative to a third homogeneous catalyst formulation. A means for reducing the (α-olefin/ethylene) weight ratio in the first reactor is disclosed and/or reducing
(Continued)

the density of the first ethylene interpolymer, relative to a third homogeneous catalyst formulation.

43 Claims, 5 Drawing Sheets

Related U.S. Application Data continuation of application No. 15/491,264, filed on Apr. 19, 2017, now Pat. No. 10,442,920.

(51) Int. Cl.
    *C08J 5/18* (2006.01)
    *C08F 4/659* (2006.01)
    *C08F 4/6592* (2006.01)

(52) U.S. Cl.
    CPC ...... *C08F 4/65908* (2013.01); *C08F 4/65912* (2013.01); *C08F 4/65927* (2013.01); *C08F 2410/01* (2013.01); *C08F 2410/05* (2013.01); *C08F 2420/01* (2013.01); *C08F 2800/20* (2013.01); *C08J 2323/08* (2013.01); *C08J 2423/08* (2013.01); *C08L 2203/16* (2013.01); *C08L 2205/025* (2013.01); *C08L 2205/03* (2013.01); *C08L 2207/07* (2013.01); *C08L 2314/02* (2013.01); *C08L 2314/06* (2013.01)

(58) Field of Classification Search
    CPC .............. C08L 2314/02; C08L 2314/06; C08F 210/16; C08F 4/65908; C08F 4/65912; C08F 4/65927; C08F 2410/01; C08F 2410/05; C08F 2420/01; C08F 2800/20; C08J 5/18; C08J 2323/08; C08J 2423/08
    USPC ........................................................ 428/220
See application file for complete search history.

(56) References Cited

U.S. PATENT DOCUMENTS

| | | | |
|---|---|---|---|
| 5,382,631 A | 1/1995 | Stehling et al. |
| 5,408,004 A | 4/1995 | Lai et al. |
| 5,519,091 A | 5/1996 | Tsutsui et al. |
| 5,530,065 A | 6/1996 | Farley et al. |
| 5,571,880 A | 11/1996 | Alt et al. |
| 5,663,249 A | 9/1997 | Ewen et al. |
| 5,674,342 A | 10/1997 | Obijeski et al. |
| 5,677,383 A | 10/1997 | Chum et al. |
| 5,685,128 A | 11/1997 | Chum et al. |
| 5,747,594 A | 5/1998 | deGroot et al. |
| 5,767,208 A | 6/1998 | Turner et al. |
| 5,773,106 A | 6/1998 | deGroot et al. |
| 5,792,534 A | 8/1998 | deGroot et al. |
| 5,844,045 A | 12/1998 | Kolthammer et al. |
| 5,847,053 A | 12/1998 | Chum et al. |
| 5,874,139 A | 2/1999 | Bosiers et al. |
| 6,111,023 A | 8/2000 | Chum et al. |
| 6,121,185 A | 9/2000 | Rosen et al. |
| 6,221,982 B1 | 4/2001 | Debras et al. |
| 6,262,195 B1 | 7/2001 | Dall'Occo et al. |
| 6,300,433 B1 | 10/2001 | Rodriguez et al. |
| 6,306,969 B1 | 10/2001 | Patel et al. |
| 6,313,240 B1 | 11/2001 | Hasegawa et al. |
| 6,316,549 B1 | 11/2001 | Chum et al. |
| 6,388,017 B1 | 5/2002 | McDaniel et al. |
| 6,392,076 B1 | 5/2002 | Strauss et al. |
| 6,403,717 B1 | 6/2002 | Adams et al. |
| 6,416,833 B1 | 7/2002 | Climenhage et al. |
| 6,433,095 B1 | 8/2002 | Laurent |
| 6,441,116 B1 | 8/2002 | Shikuma et al. |
| 6,448,341 B1 | 9/2002 | Kolthammer et al. |
| 6,462,135 B1 | 10/2002 | Rohde et al. |
| 6,462,136 B1 | 10/2002 | Saito et al. |
| 6,469,103 B1 | 10/2002 | Jain et al. |
| 6,486,088 B1 | 11/2002 | Crowther et al. |
| 6,489,427 B1 | 12/2002 | Clutton et al. |
| 6,506,867 B1 | 1/2003 | Lai et al. |
| 6,518,385 B1 | 2/2003 | Chai |
| 6,534,612 B1 | 3/2003 | Lai et al. |
| 6,562,919 B2 | 5/2003 | Crowther et al. |
| 6,569,948 B2 | 5/2003 | Laurent |
| 6,579,922 B2 | 6/2003 | Laurent |
| 6,642,339 B1 | 11/2003 | Chai et al. |
| 6,683,149 B2 | 1/2004 | Jain et al. |
| 6,723,398 B1 | 4/2004 | Chum et al. |
| 6,806,220 B2 | 10/2004 | Crowther et al. |
| 6,844,398 B2 | 1/2005 | Shikuma et al. |
| 6,870,010 B1 | 3/2005 | Lue et al. |
| 6,908,968 B2 | 6/2005 | Jain et al. |
| 6,916,883 B2 | 7/2005 | Parikh et al. |
| 6,921,795 B2 | 7/2005 | Wang et al. |
| 6,969,741 B2 | 11/2005 | Lustiger et al. |
| 6,982,311 B2 | 1/2006 | Karande et al. |
| 7,022,770 B2 | 4/2006 | Lustiger et al. |
| 7,041,617 B2 | 5/2006 | Jensen et al. |
| 7,101,939 B2 | 9/2006 | Nowlin et al. |
| 7,125,933 B2 | 10/2006 | German et al. |
| 7,148,304 B2 | 12/2006 | Kimberley et al. |
| 7,166,676 B2 | 1/2007 | Jacobsen et al. |
| 7,250,473 B2 | 7/2007 | Schramm et al. |
| 7,250,474 B2 | 7/2007 | Maziers |
| 7,300,983 B2 | 11/2007 | Degroot et al. |
| 7,396,881 B2 | 7/2008 | Lustiger et al. |
| 7,439,306 B2 | 10/2008 | Davis |
| 7,456,243 B2 | 11/2008 | Jensen et al. |
| 7,514,504 B2 | 4/2009 | Van Sinoy et al. |
| 7,645,835 B2 | 1/2010 | Van Dun et al. |
| 7,659,343 B2 | 2/2010 | Wooster et al. |
| 7,714,073 B2 | 5/2010 | Jacobsen et al. |
| 7,846,552 B2 | 12/2010 | Weeks |
| 7,858,702 B2 | 12/2010 | Jaker |
| 7,868,092 B2 | 1/2011 | Kwalk et al. |
| 7,968,659 B2 | 6/2011 | Chai |
| 7,999,039 B2 | 8/2011 | DeGroot et al. |
| 8,039,554 B2 | 10/2011 | Iseki et al. |
| RE43,004 E | 12/2011 | DeGroot et al. |
| 8,076,428 B2 | 12/2011 | Shim et al. |
| 8,101,685 B2 | 1/2012 | Jiang et al. |
| 8,101,687 B2 | 1/2012 | Schramm et al. |
| 8,227,564 B2 | 7/2012 | Loveday et al. |
| 8,410,217 B2 | 4/2013 | Tse et al. |
| 8,426,525 B2 | 4/2013 | Nozue et al. |
| 8,475,898 B2 | 7/2013 | Wang et al. |
| 8,475,899 B2 | 7/2013 | Yang et al. |
| 8,481,647 B2 | 7/2013 | Jiang et al. |
| 8,895,466 B2 | 11/2014 | Busico et al. |
| 8,933,175 B2 | 1/2015 | Yu et al. |
| 9,068,033 B2 | 6/2015 | Fiscus et al. |
| 9,102,819 B2 | 8/2015 | Kapur et al. |
| 9,115,275 B2 | 8/2015 | Kupar et al. |
| 9,540,457 B1 | 1/2017 | Ding et al. |
| 9,540,459 B2 | 1/2017 | Ebisawa et al. |
| 2002/0177677 A1 | 11/2002 | Kanamori et al. |
| 2003/0114595 A1 | 6/2003 | Van Dun et al. |
| 2003/0149181 A1 | 8/2003 | Kolthammer et al. |
| 2005/0119413 A1 | 6/2005 | Maziers |
| 2006/0036041 A1 | 2/2006 | Kwalk |
| 2012/0065335 A1 | 3/2012 | Kipke et al. |
| 2012/0252989 A1 | 10/2012 | Dewachter et al. |
| 2012/0309910 A1 | 12/2012 | Dewachter et al. |
| 2013/0085231 A1 | 4/2013 | Lue et al. |

* cited by examiner

MEANS FOR INCREASING THE MOLECULAR WEIGHT AND DECREASING THE DENSITY OF ETHYLENE INTERPOLYMERS EMPLOYING HOMOGENEOUS AND HETEROGENEOUS CATALYST FORMULATIONS

CROSS REFERENCE TO RELATED APPLICATIONS

This application is a continuation of U.S. patent application Ser. No. 16/557,153, filed on Aug. 30, 2019, now issued as U.S. Pat. No. 10,738,183, which is a continuation of U.S. patent application Ser. No. 15/491,264, filed on Apr. 19, 2017, now issued as U.S. Pat. No. 10,442,920, all of which are hereby incorporated in their entirety by reference.

BACKGROUND

Solution polymerization processes are typically carried out at temperatures that are above the melting point of the ethylene homopolymer or copolymer product. In a typical solution polymerization process, catalyst components, solvent, monomers and hydrogen are fed under pressure to one or more reactors.

For ethylene polymerization, or ethylene copolymerization, reactor temperatures can range from about 80° C. to about 300° C. while pressures generally range from about 3 MPag to about 45 MPag. The ethylene homopolymer or copolymer produced remains dissolved in the solvent under reactor conditions. The residence time of the solvent in the reactor is relatively short, for example, from about 1 second to about 20 minutes. The solution process can be operated under a wide range of process conditions that allow the production of a wide variety of ethylene polymers. Post reactor, the polymerization reaction is quenched to prevent further polymerization, by adding a catalyst deactivator, and passivated, by adding an acid scavenger. Once passivated, the polymer solution is forwarded to a polymer recovery operation where the ethylene homopolymer or copolymer is separated from process solvent, unreacted residual ethylene and unreacted optional α-olefin(s).

There is a need to improve the continuous solution polymerization process, for example, to increase the molecular weight of the ethylene interpolymer produced at a given reactor temperature. Given a specific catalyst formulation, it is well known to those of ordinary experience that polymer molecular weight increases as reactor temperature decreases. However, decreasing reactor temperature can be problematic when the viscosity of the solution becomes too high. As a result, in the solution polymerization process there is a need for catalyst formulations that produce high molecular weight ethylene interpolymers at high reactor temperatures. The catalyst formulations and solution polymerization processes disclosed herein satisfy this need.

In the solution polymerization process there is also a need for catalyst formulations that are very efficient at incorporating one or more α-olefins into a propagating macromolecular chain. In other words, at a given [α-olefin/ethylene] weight ratio in a solution polymerization reactor, there is a need for catalyst formulations that produce lower density ethylene/α-olefin copolymers. Expressed alternatively, there is a need for catalyst formulations that produce an ethylene/α-olefin copolymer, having a specific density, at a lower (α-olefin/ethylene) ratio in the reactor feed. Such catalyst formulations efficiently utilize the available α-olefin and reduce the amount of α-olefin in solution process recycle streams.

The catalyst formulations and solution process disclosed herein, produce unique ethylene interpolymer products that have desirable properties in a variety of end use applications, for example applications that employ ethylene interpolymer films. Non-limiting examples of desirable film properties include higher film stiffness, higher film tear resistance, lower hexane extractables and lower seal initiation temperature. Films prepared from the ethylene interpolymer products, disclosed herein, have these desirable properties.

SUMMARY OF DISCLOSURE

One embodiment of this disclosure is an ethylene interpolymer product comprising: (i) a first ethylene interpolymer; (ii) a second ethylene interpolymer, and; (iii) optionally a third ethylene interpolymer: where the ethylene interpolymer product has a dimensionless Long Chain Branching Factor (LCBF) greater than or equal to about 0.001; from about 0.0015 ppm to about 2.4 ppm of hafnium, and; from about 0.1 ppm to about 11.4 ppm of titanium.

Additional embodiments of this disclosure include ethylene interpolymer products comprising: (i) a first ethylene interpolymer; (ii) a second ethylene interpolymer, and; (iii) optionally a third ethylene interpolymer: where the ethylene interpolymer product has a dimensionless Long Chain Branching Factor (LCBF) greater than or equal to about 0.001; from about 0.0015 ppm to about 2.4 ppm of hafnium; from about 0.1 ppm to about 11.4 ppm of titanium, and; greater than or equal to about 0.02 terminal vinyl unsaturations per 100 carbon atoms.

Further embodiments of this disclosure include ethylene interpolymer products comprising: (i) a first ethylene interpolymer; (ii) a second ethylene interpolymer, and; (iii) optionally a third ethylene interpolymer: where the ethylene interpolymer product has a dimensionless Long Chain Branching Factor (LCBF) greater than or equal to about 0.001; from about 0.0015 ppm to about 2.4 ppm of hafnium; from about 0.1 ppm to about 11.4 ppm of titanium, and; greater than or equal to about 0.12 parts per million (ppm) of a total catalytic metal.

Embodiment of this disclosure include ethylene interpolymer products comprising: (i) a first ethylene interpolymer; (ii) a second ethylene interpolymer, and; (iii) optionally a third ethylene interpolymer: where the ethylene interpolymer product has a dimensionless Long Chain Branching Factor (LCBF) greater than or equal to about 0.001; from about 0.0015 ppm to about 2.4 ppm of hafnium; from about 0.1 ppm to about 11.4 ppm of titanium; greater than or equal to about 0.02 terminal vinyl unsaturations per 100 carbon atoms, and; greater than or equal to about 0.12 parts per million (ppm) of a total catalytic metal.

Embodiments of this disclosure include ethylene interpolymer products having a melt index from about 0.3 to about 500 dg/minute. Further embodiments include ethylene interpolymer products having a density from about 0.862 to about 0.975 g/cc. Other embodiments include ethylene interpolymer products having a $M_w/M_n$ from about 2 to about 25. Embodiments include ethylene interpolymer products having a $CDBI_{50}$ (Composition Distribution Breadth Index) from about 20% to about 98%.

Embodiments include ethylene interpolymer products containing 5 to 60 wt. % of a first ethylene interpolymer, 20 to 95 wt. % of a second ethylene interpolymer and 0 to 30 wt. % of a third ethylene interpolymer; where wt. % is the weight of the first, the second or the optional third ethylene interpolymer, individually, divided by the total weight of the ethylene interpolymer product. Additional embodiments include ethylene interpolymer products where the first ethylene interpolymer has a melt index from about 0.01 to about 200 dg/minute, the second ethylene interpolymer has melt index from about 0.3 to about 1000 dg/minute, and the third ethylene interpolymer has a melt index from about 0.5 to about 2000 dg/minute. Other embodiments include ethylene interpolymer products where the first ethylene interpolymer has a density from about 0.855 g/cm$^3$ to about 0.975 g/cc, the second ethylene interpolymer has a density from about 0.89 g/cm$^3$ to about 0.975 g/cc, and the third ethylene interpolymer has density from about 0.855 g/cm$^3$ to about 0.975 g/cc.

Embodiments include ethylene interpolymer products containing from 0 to 10 mole percent of one or more α-olefin, where the α-olefins are $C_3$ to $C_{10}$ α-olefins. Non-limiting examples include ethylene interpolymer products containing the following α-olefins: 1-octene, 1-hexene or a mixture of 1-octene and 1-hexene.

Embodiments of this disclosure include a first ethylene interpolymer synthesized using at least one homogeneous catalyst formulation. Additional embodiments include the synthesis of a first ethylene interpolymer using a first homogeneous catalyst formulation. One non-limiting example of the first homogeneous catalyst formulation is a bridged metallocene catalyst formulation containing a component A defined by Formula (I)

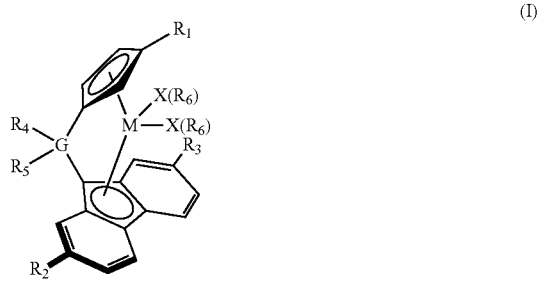

Embodiments of this disclosure include a second ethylene interpolymer synthesized using a first heterogeneous catalyst formulation. Non-limiting examples of the first heterogeneous catalyst formulation include a first in-line Ziegler-Natta catalyst formulation or a first batch Ziegler-Natta catalyst formulation.

Optional embodiments include the synthesis of a third ethylene interpolymer using the first heterogeneous catalyst formulation or the second heterogeneous catalyst formulation; optionally the first and second heterogeneous catalyst formulations are the same formulation.

Further optional embodiments include the synthesis of the third ethylene interpolymer using a fifth homogeneous catalyst formulation. The fifth homogeneous catalyst formulation may be: a bridged metallocene catalyst formulation, an unbridged single site catalyst formulation or a fourth homogeneous catalyst formulation. The fourth homogeneous catalyst formulation contains a bulky ligand-metal complex that is not a member of the chemical genera that defines: a) the bulky ligand-metal complex employed in the bridged metallocene catalyst formulation, and; b) the bulky ligand-metal complex employed in the unbridged single site catalyst formulation.

Embodiments of this disclosure include ethylene interpolymer products containings 2.4 ppm of a catalytic metal A, where catalytic metal A originates from the first homogeneous catalyst formulation. Non-limiting examples of metal A include titanium, zirconium and hafnium. Additional embodiments include ethylene interpolymer products containing a catalytic metal Z1 and optionally a catalytic metal Z2 and the total amount of said catalytic metal Z1 plus said catalytic metal Z2 is from about 0.1 to about 11.4 parts per million; where catalytic metal Z1 originates from the first heterogeneous catalyst formulation and catalytic metal Z2 originates from the second heterogeneous catalyst formulation; optionally catalytic metal Z1 and catalytic metal Z2 are the same metal. Non-limiting examples of catalytic metals Z1 and Z2 include: titanium, zirconium, hafnium, vanadium, niobium, tantalum, chromium, molybdenum, tungsten, manganese, technetium, rhenium, iron, ruthenium or osmium (it being understood that metals Z1 and Z2 are independently selected from this list). Optional embodiments include an ethylene interpolymer product containing ≤1 ppm of a catalytic metal D; where catalytic metal D originates from said fourth homogeneous catalyst formulation. Non-limiting examples of metal D include titanium, zirconium and hafnium.

Embodiments of the disclosed ethylene interpolymer products contain a first ethylene interpolymer having a first $M_w/M_n$ from about 1.7 to about 2.8, a second ethylene interpolymer having a second $M_w/M_n$ from about 2.2 to about 4.4 and an optional third ethylene interpolymer having a third $M_w/M_n$ from about 1.7 to about 5.0.

Further embodiments of the ethylene interpolymer products contain a first ethylene interpolymer having a first $CDBI_{50}$ from about 70 to about 98%, a second ethylene interpolymer having a second $CDBI_{50}$ from about 45 to about 98% and an optional third ethylene interpolymer having a third $CDBI_{50}$ from about 35 to about 98%. This disclosure includes embodiment of a continuous solution polymerization process where a first and a second reactor are operated in series mode (i.e. the effluent from the first reactor flows into the second reactor), a first homogeneous catalyst formulation is employed in the first reactor and a first heterogeneous catalyst formulations is employed in the second reactor; optionally the first heterogeneous catalyst formulation or a second heterogeneous catalyst formulation or a fifth homogeneous catalyst formulation is employed in an optional third reactor. This embodiment of a continuous solution polymerization process comprises: i) injecting ethylene, a process solvent, a first homogeneous catalyst formulation, optionally one or more α-olefins and optionally hydrogen into a first reactor to produce a first exit stream containing a first ethylene interpolymer in process solvent; ii) passing the first exit stream into a second reactor and injecting into the second reactor, ethylene, process solvent, a first heterogeneous catalyst formulation, optionally one or more α-olefins and optionally hydrogen to produce a second exit stream containing a second ethylene interpolymer and the first ethylene interpolymer in process solvent; iii) passing the second exit stream into a third reactor and optionally injecting into the third reactor, ethylene, process solvent, one or more α-olefins, hydrogen and one or more of the first heterogeneous catalyst formulation, a second heterogeneous catalyst formulation and a fifth homogenous catalyst formulation to produce a third exit stream containing an optional third ethylene interpolymer, the second ethylene interpolymer and the first ethylene interpolymer in process solvent; iv) phase separating the third exit stream to recover an ethylene interpolymer product comprising the first ethylene interpolymer, the second ethylene interpolymer and the optional third ethylene interpolymer. The solution process, series mode embodiments, were improved by having a lower [α-olefin/ethylene] weight ratio in the first reactor and/or the first reactor produces a higher molecular first ethylene interpolymer. In some embodiments, the disclosed solution process had at least a 70% improved (reduced) [α-olefin/ethylene] weight ratio as defined by the following formula $$\% \text{ Reduced} \left[\frac{\alpha - \text{olefin}}{\text{ethylene}}\right] = 100 \times \left\{ \frac{\left(\frac{\alpha - \text{olefin}}{\text{ethylene}}\right)^A - \left(\frac{\alpha - \text{olefin}}{\text{ethylene}}\right)^C}{\left(\frac{\alpha - \text{olefin}}{\text{ethylene}}\right)^C} \right\} \leq -70\%$$

where (α-olefin/ethylene)$^A$ was calculated by dividing the weight of α-olefin added to the first reactor by the weight of ethylene added to the first reactor where a first ethylene interpolymer having a target density was produced by the first homogeneous catalyst formulation, and; (α-olefin/ethylene) was calculated by dividing the weight of α-olefin added to the first reactor by the weight of ethylene added to the first reactor where a control ethylene interpolymer having the target density was produced by replacing the first homogeneous catalyst formulation with a third homogeneous catalyst formulation. In other embodiments of the solution polymerization process had at least a 5% improved (higher) weight average molecular weight as defined by the following formula $$\% \text{ Improved } M_w = 100\% \times (M_w^A - M_w^C)/M_w^C \geq 5\%$$

where $M_w^A$ was the weight average molecular weight of the first ethylene interpolymer and $M_w^C$ was the weight average molecular weight of a comparative ethylene interpolymer; where the comparative ethylene interpolymer was produced in the first reactor by replacing the first homogeneous catalyst formulation with the third homogeneous catalyst formulation.

In another embodiment of the continuous solution polymerization process the first and second reactors are operated in parallel mode, i.e. the first exit stream (exiting the first reactor) by-passes the second reactor and the first exit stream is combined with the second exit stream (exiting the second reactor) downstream of the second reactor. Parallel mode embodiments comprises: i) injecting ethylene, a process solvent, a first homogeneous catalyst formulation, optionally one or more α-olefins and optionally hydrogen into a first reactor to produce a first exit stream containing a first ethylene interpolymer in process solvent; ii) injecting ethylene, process solvent, a first heterogeneous catalyst formulation, optionally one or more α-olefins and optionally hydrogen into a second reactor to produce a second exit stream containing a second ethylene interpolymer in process solvent; iii) combining the first and second exit streams to form a third exit stream; iv) passing the third exit stream into a third reactor and optionally injecting into the third reactor, ethylene, process solvent, one or more α-olefins, hydrogen and one or more of the first heterogeneous catalyst formulation, a second heterogeneous catalyst formulation and a fifth homogenous catalyst formulation to produce a fourth exit stream containing an optional third ethylene interpolymer, the second ethylene interpolymer and the first ethylene interpolymer in said process solvent; v) phase separating the fourth exit stream to recover an ethylene interpolymer product comprising the first ethylene interpolymer, the second ethylene interpolymer and the optional third ethylene interpolymer. Parallel mode embodiment were improved by having a lower [α-olefin/ethylene] weight ratio in the first reactor and/or a higher molecular first ethylene interpolymer, as characterized by the series mode embodiments described immediately above.

Additional embodiments of the series and parallel solution polymerization processes include the post reactor addition of a catalyst deactivator to neutralize or deactivate the catalysts, forming a deactivated solution. In further embodiments, the series and parallel solution polymerization process may also include an additional step where a passivator is added to the deactivated solution, forming a passivated solution.

The solution polymerization processes described above, includes embodiments where the first homogeneous catalyst formulation was a bridged metallocene catalyst formulation. Additional embodiments included steps where the catalyst inlet temperature was adjusted to optimize the activity of the bridged metallocene catalyst formulation.

The solution polymerization processes disclosed include embodiment where the third homogeneous catalyst formulation was an unbridged single site catalyst formulation.

The disclosed solution polymerization processes include embodiments where the first heterogeneous catalyst formulation is a Ziegler-Natta catalyst formulation prepared using an in-line process, hereinafter the 'first in-line Ziegler-Natta catalyst formulation'. In alternative embodiments the first heterogeneous catalyst formulation is a Ziegler-Natta catalyst formulation prepared using a batch process, hereinafter the 'first batch Ziegler-Natta catalyst formulation'.

Optionally, the first in-line or first batch Ziegler-Natta catalyst formulations may be injected into the third reactor to produce the optional third ethylene interpolymer; or a second in-line Ziegler-Natta formulation or a second batch Ziegler-Natta catalyst formulation may be produced and injected into the third reactor. Optionally, a fifth homogeneous catalyst formulation may be injected into the third reactor to produce the optional third ethylene interpolymer.

Further embodiments include the solution process synthesis of an ethylene interpolymer product that includes a means for reducing, by at least −70%, the [α-olefin/ethylene] weight ratio required to produce the first ethylene interpolymer (in the ethylene interpolymer product), where the first ethylene interpolymer has a target density; the means involves the appropriate selection of the catalyst formulation employed in the first reactor.

Further embodiments include the synthesis of a solution process ethylene interpolymer product that includes a means for increasing, by at least 5%, the weight average molecular weight ($M_w$) of the first ethylene interpolymer (in the ethylene interpolymer product); the means involves the appropriate selection of the catalyst formulation employed in the first reactor.

Further embodiments of the present disclosure include manufactured articles; non-limiting examples of manufactured articles include flexible articles such as films and rigid articles such a containers.

Manufactured articles embodiments include a polyethylene film comprising at least one layer, where the layer comprises at least one ethylene interpolymer product disclosed herein, and the film has an improved machine direction 1% secant modulus, by being at least 25% improved (higher), relative to a comparative polyethylene film of the same composition but the first ethylene interpolymer in the ethylene interpolymer product is replaced with a comparative ethylene interpolymer; where the first ethylene interpolymer was synthesized with a bridged metallocene catalyst formulation and the comparative ethylene interpolymer was synthesized with an unbridged single site catalyst formulation.

Further embodiments include a polyethylene film comprising at least one layer, where the layer comprises at least one ethylene interpolymer product disclosed herein, and the film has an improved transverse direction 1% secant modulus, by being at least 40% improved (higher), relative to a comparative polyethylene film of the same composition but said first ethylene interpolymer is replaced with a comparative ethylene interpolymer; where the first ethylene interpolymer was synthesized with a bridged metallocene catalyst formulation and the comparative ethylene interpolymer was synthesized with an unbridged single site catalyst formulation.

Embodiments include a polyethylene film comprising at least one layer, where the layer comprises at least one ethylene interpolymer product disclosed herein, and the film has improved weight % hexane extractables, by being at least 40% improved (lower), relative to a comparative polyethylene film of the same composition but the first ethylene interpolymer was replaced with a comparative ethylene interpolymer; where the first ethylene interpolymer was synthesized with a bridged metallocene catalyst formulation and the comparative ethylene interpolymer was synthesized with an unbridged single site catalyst formulation.

Further embodiments include a polyethylene film comprising at least one layer, where the layer comprises at least one ethylene interpolymer product disclosed herein, and the film has an improved machine direction Elmendorf tear strength, by being at least 15% improved (higher), relative to a comparative polyethylene film of the same composition but the first ethylene interpolymer was replaced with a comparative ethylene interpolymer; where the first ethylene interpolymer was synthesized with a bridged metallocene catalyst formulation and the comparative ethylene interpolymer was synthesized with an unbridged single site catalyst formulation; where both the first ethylene interpolymer and the comparative ethylene interpolymer are synthesized in a dual reactor solution process where the first and second reactor are configured in parallel.

Additional embodiments include a polyethylene film comprising at least one layer, where the layer comprises at least one ethylene interpolymer product disclosed herein, and the film has an improved seal initiation temperature, by being at least 5% improved (lower), relative to a comparative polyethylene film of the same composition but said first ethylene interpolymer was replaced with a comparative ethylene interpolymer; wherein the first ethylene interpolymer was synthesized with a bridged metallocene catalyst formulation and the comparative ethylene interpolymer was synthesized with an unbridged single site catalyst formulation; where both the first ethylene interpolymer and the comparative ethylene interpolymer were synthesized in a dual reactor solution process where the first and second reactor were configured in parallel.

Further embodiments include a polyethylene film comprising at least one layer, where the layer comprises at least one ethylene interpolymer product and at least one second polymer. Non-limiting examples of second polymers include ethylene polymers, propylene polymers or a mixture of ethylene polymers and propylene polymers.

Additional embodiments include a polyethylene films having a thickness from about 0.5 mil to about 10 mil. Embodiments also include multilayer films comprises from 2 to 11 layers, where at least one layer comprises at least one of the ethylene interpolymer products disclosed herein.

BRIEF DESCRIPTION OF FIGURES

The following Figures are presented for the purpose of illustrating selected embodiments of this disclosure; it being understood, that the embodiments in this disclosure are not limited to the precise arrangement of, or the number of, vessels shown.

DEFINITION OF TERMS

Figure 1:
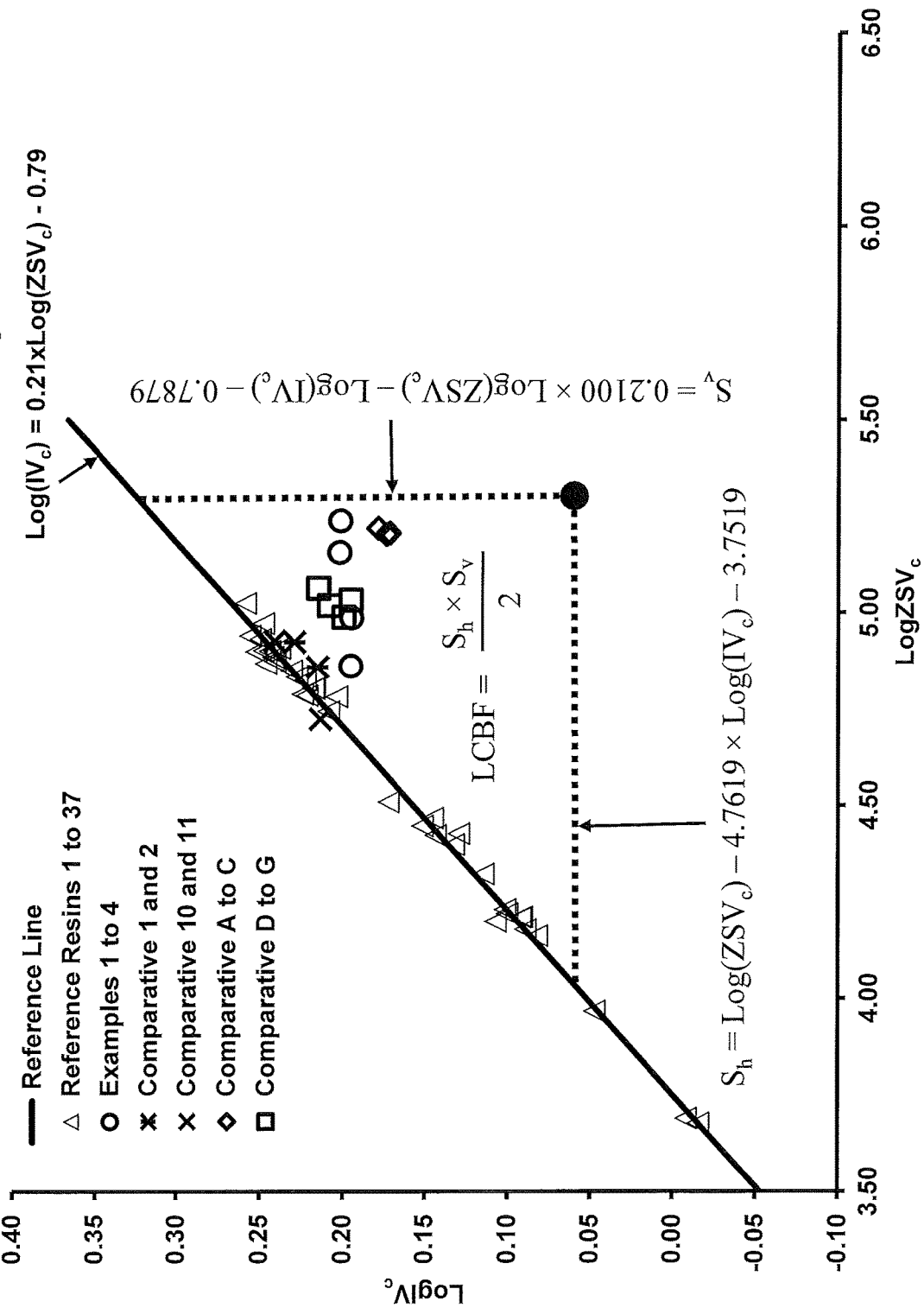
FIG. 1 shows the determination of the Long Chain Branching Factor (LCBF). The abscissa plotted was the log of the corrected Zero Shear Viscosity ($\log(ZSV_c)$) and the ordinate plotted was the log of the corrected Intrinsic Viscosity ($\log(IV_c)$). Ethylene polymers that do not have LCB, or undetectable LCB, fall on the reference line. Ethylene polymers having LCB deviate from the reference line and were characterized by the dimensionless Long Chain Branching Factor (LCBF). $LCBF=(S_h \times S_v)/2$; where $S_h$ and $S_v$ are horizontal and vertical shift factors, respectively.

Other than in the examples or where otherwise indicated, all numbers or expressions referring to quantities of ingredients, extrusion conditions, etc., used in the specification and claims are to be understood as modified in all instances by the term "about." Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

In order to form a more complete understanding of this disclosure the following terms are defined and should be used with the accompanying figures and the description of the various embodiments throughout.

As used herein, the term "monomer" refers to a small molecule that may chemically react and become chemically bonded with itself or other monomers to form a polymer.

As used herein, the term "α-olefin" is used to describe a monomer having a linear hydrocarbon chain containing from 3 to 20 carbon atoms having a double bond at one end of the chain; an equivalent term is "linear α-olefin".

As used herein, the term "ethylene polymer", refers to macromolecules produced from ethylene monomers and optionally one or more additional monomers; regardless of the specific catalyst or specific process used to make the ethylene polymer. In the polyethylene art, the one or more additional monomers are called "comonomer(s)" and often include α-olefins. The term "homopolymer" refers to a polymer that contains only one type of monomer. Common ethylene polymers include high density polyethylene (HDPE), medium density polyethylene (MDPE), linear low density polyethylene (LLDPE), very low density polyethylene (VLDPE), ultralow density polyethylene (ULDPE), plastomer and elastomers. The term ethylene polymer also includes polymers produced in a high pressure polymerization processes; non-limiting examples include low density polyethylene (LDPE), ethylene vinyl acetate copolymers (EVA), ethylene alkyl acrylate copolymers, ethylene acrylic acid copolymers and metal salts of ethylene acrylic acid (commonly referred to as ionomers). The term ethylene polymer also includes block copolymers which may include 2 to 4 comonomers. The term ethylene polymer also includes combinations of, or blends of, the ethylene polymers described above.

The term "ethylene interpolymer" refers to a subset of polymers within the "ethylene polymer" group that excludes polymers produced in high pressure polymerization processes; non-limiting examples of polymer produced in high pressure processes include LDPE and EVA (the latter is a copolymer of ethylene and vinyl acetate).

The term "heterogeneous ethylene interpolymers" refers to a subset of polymers in the ethylene interpolymer group that are produced using a heterogeneous catalyst formulation; non-limiting examples of which include Ziegler-Natta or chromium catalysts.

The term "homogeneous ethylene interpolymer" refers to a subset of polymers in the ethylene interpolymer group that are produced using homogeneous catalyst formulations. Typically, homogeneous ethylene interpolymers have narrow molecular weight distributions, for example Size Exclusion Chromatography (SEC) $M_w/M_n$ values of less than 2.8; $M_w$ and $M_n$ refer to weight and number average molecular weights, respectively. In contrast, the $M_w/M_n$ of heterogeneous ethylene interpolymers are typically greater than the $M_w/M_n$ of homogeneous ethylene interpolymers. In general, homogeneous ethylene interpolymers also have a narrow comonomer distribution, i.e. each macromolecule within the molecular weight distribution has a similar comonomer content. Frequently, the composition distribution breadth index "CDBI" is used to quantify how the comonomer is distributed within an ethylene interpolymer, as well as to differentiate ethylene interpolymers produced with different catalysts or processes. The "$CDBI_{50}$" is defined as the percent of ethylene interpolymer whose composition is within 50% of the median comonomer composition; this definition is consistent with that described in U.S. Pat. No. 5,206,075 assigned to Exxon Chemical Patents Inc. The $CDBI_{50}$ of an ethylene interpolymer can be calculated from TREF curves (Temperature Rising Elution Fractionation); the TREF method is described in Wild, et al., J. Polym. Sci., Part B, Polym. Phys., Vol. 20 (3), pages 441-455. Typically the $CDBI_{50}$ of homogeneous ethylene interpolymers are greater than about 70%. In contrast, the $CDBI_{50}$ of α-olefin containing heterogeneous ethylene interpolymers are generally lower than the $CDBI_{50}$ of homogeneous ethylene interpolymers. A blend of two or more homogeneous ethylene interpolymers, that differ in comonomer content, may have a $CDBI_{50}$ less than 70%; in this disclosure such a blend was defined as a homogeneous blend or homogeneous composition. Similarly, a blend of two or more homogeneous ethylene interpolymers, that differ in weight average molecular weight ($M_w$), may have a $M_w/M_n \geq 2.8$; in this disclosure such a blend was defined as a homogeneous blend or homogeneous composition.

In this disclosure, the term "homogeneous ethylene interpolymer" refers to both linear homogeneous ethylene interpolymers and substantially linear homogeneous ethylene interpolymers. In the art, linear homogeneous ethylene interpolymers are generally assumed to have no long chain branches or an undetectable amount of long chain branches; while substantially linear ethylene interpolymers are generally assumed to have greater than about 0.01 to about 3.0 long chain branches per 1000 carbon atoms. A long chain branch is macromolecular in nature, i.e. similar in length to the macromolecule that the long chain branch is attached to.

In this disclosure the term homogeneous catalyst is used, for example to describe a first, a third, a fourth and a fifth homogeneous catalyst formulation. The term catalyst refers to the chemical compound containing the catalytic metal, which is a metal-ligand complex. In this disclosure, the term 'homogeneous catalyst' is defined by the characteristics of the polymer produced by the homogeneous catalyst. Specifically, a catalyst is a homogeneous catalyst if it produces a homogeneous ethylene interpolymer that has a narrow molecular weight distribution (SEC $M_w/M_n$ values of less than 2.8) and a narrow comonomer distribution ($CDBI_{50}>70\%$). Homogeneous catalysts are well known in the art. Two subsets of the homogeneous catalyst genus include unbridged metallocene catalysts and bridged metallocene catalysts. Unbridged metallocene catalysts are characterized by two bulky ligands bonded to the catalytic metal, a non-limiting example includes bis(isopropyl-cyclopentadienyl) hafnium dichloride. In bridged metallocene catalysts the two bulky ligands are covalently bonded (bridged) together, a non-limiting example includes diphenylmethylene (cyclopentadienyl) (2,7-di-t-butylfuorenyl) hafnium dichloride; wherein the diphenylmethylene group bonds, or bridges, the cyclopentadienyl and fluorenyl bulky ligands together. Two additional subsets of the homogeneous catalyst genus include unbridged and bridged single site catalysts. In this disclosure, single site catalysts are characterized as having only one bulky ligand bonded to the catalytic metal. A non-limiting example of an unbridged single site catalyst includes cyclopentadienyl tri(tertiary butyl)phosphinimine titanium dichloride. A non-limiting example of a bridged single site catalyst includes [$C_5(CH_3)_4$—$Si(CH_3)_2$—N(tBu)] titanium dichloride, where the —$Si(CH_3)_2$— group functions as the bridging group.

Herein, the term "polyolefin" includes ethylene polymers and propylene polymers; non-limiting examples of propylene polymers include isotactic, syndiotactic and atactic propylene homopolymers, random propylene copolymers containing at least one comonomer (e.g. α-olefins) and impact polypropylene copolymers or heterophasic polypropylene copolymers.

The term "thermoplastic" refers to a polymer that becomes liquid when heated, will flow under pressure and solidify when cooled. Thermoplastic polymers include ethylene polymers as well as other polymers used in the plastic industry; non-limiting examples of other polymers commonly used in film applications include barrier resins (EVOH), tie resins, polyethylene terephthalate (PET), polyamides and the like.

As used herein the term "monolayer film" refers to a film containing a single layer of one or more thermoplastics.

As used herein, the terms "hydrocarbyl", "hydrocarbyl radical" or "hydrocarbyl group" refers to linear, branched, or cyclic, aliphatic, olefinic, acetylenic and aryl (aromatic) radicals comprising hydrogen and carbon that are deficient by one hydrogen.

As used herein, an "alkyl radical" includes linear, branched and cyclic paraffin radicals that are deficient by one hydrogen radical; non-limiting examples include methyl (—$CH_3$) and ethyl (—$CH_2CH_3$) radicals. The term "alkenyl radical" refers to linear, branched and cyclic hydrocarbons containing at least one carbon-carbon double bond that is deficient by one hydrogen radical.

As used herein, the term "aryl" group includes phenyl, naphthyl, pyridyl and other radicals whose molecules have an aromatic ring structure; non-limiting examples include naphthylene, phenanthrene and anthracene. An "arylalkyl" group is an alkyl group having an aryl group pendant there from; non-limiting examples include benzyl, phenethyl and tolylmethyl; an "alkylaryl" is an aryl group having one or more alkyl groups pendant there from; non-limiting examples include tolyl, xylyl, mesityl and cumyl.

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms selected from the group consisting of boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, thioethers, and the like. The term "heterocyclic" refers to ring systems having a carbon backbone that comprise from 1 to 3 atoms selected from the group consisting of boron, aluminum, silicon, germanium, nitrogen, phosphorous, oxygen and sulfur.

As used herein the term "unsubstituted" means that hydrogen radicals are bounded to the molecular group that follows the term unsubstituted. The term "substituted" means that the group following this term possesses one or more moieties that have replaced one or more hydrogen radicals in any position within the group; non-limiting examples of moieties include halogen radicals (F, Cl, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Non-limiting examples of substituted alkyls and aryls include: acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals and combinations thereof.

Herein the term "R1" and its superscript form "$^{R1}$" refers to a first reactor in a continuous solution polymerization process; it being understood that R1 is distinctly different from the symbol $R^1$; the latter is used in chemical formula, e.g. representing a hydrocarbyl group. Similarly, the term "R2" and it's superscript form "$^{R2}$" refers to a second reactor, and; the term "R3" and it's superscript form "$^{R3}$" refers to a third reactor.

As used herein, the term "oligomers" refers to an ethylene polymer of low molecular weight, e.g., an ethylene polymer with a weight average molecular weight ($M_w$) of about 2000 to 3000 daltons. Other commonly used terms for oligomers include "wax" or "grease". As used herein, the term "light-end impurities" refers to chemical compounds with relatively low boiling points that may be present in the various vessels and process streams within a continuous solution polymerization process; non-limiting examples include, methane, ethane, propane, butane, nitrogen, $CO_2$, chloroethane, HCl, etc.

DETAILED DESCRIPTION

Catalysts

Catalyst formulations that are efficient in polymerizing olefins are well known. In the embodiments disclosed herein, at least two catalyst formulations were employed in a continuous solution polymerization process. One of the catalyst formulations comprised a first homogeneous catalyst formulation that produces a homogeneous first ethylene interpolymer in a first reactor, one embodiment of the first homogeneous catalyst formulation was a bridged metallocene catalyst formulation (Formula (I)). The other catalyst formulation comprised a first heterogeneous catalyst formulation that produced a heterogeneous second ethylene interpolymer in a second reactor. Optionally a third ethylene interpolymer may be produced in a third reactor using one or more of: the first heterogeneous catalyst formulation, a second heterogeneous catalyst formulation and/or a fifth homogeneous catalyst formulation. The fifth homogeneous catalyst formulation was selected from the first homogeneous catalyst formulation, a third homogeneous catalyst formulation and/or a fourth homogeneous catalyst formulation; an embodiment of the third homogeneous catalyst formulation was an unbridged single site catalyst formulation (Formula (II)) and the fourth homogeneous catalyst formulation contains a bulky ligand-metal complex that was not a species of the chemical genera defined by Formula (I) or Formula (II). In the continuous solution process disclosed, at least one homogeneous ethylene interpolymer and at least one heterogeneous ethylene interpolymer were produced and solution blended to produce an ethylene interpolymer product.

Bulky Ligand-Metal Complexes

Component A

The present disclosure included "a first homogeneous catalyst formulation". One embodiment of the first homogeneous catalyst formulation was "a bridged metallocene catalyst formulation" containing a bulky ligand-metal complex, hereinafter "component A", represented by Formula (I).

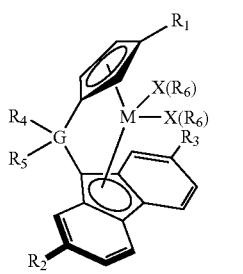

(I)

In Formula (I): non-limiting examples of M include Group 4 metals, i.e. titanium, zirconium and hafnium; non-limiting examples of G include Group 14 elements, carbon, silicon, germanium, tin and lead; X represents a halogen atom, fluorine, chlorine, bromine or iodine; the $R_6$ groups are independently selected from a hydrogen atom, a $C_{1-20}$ hydrocarbyl radical, a $C_{1-20}$ alkoxy radical or a $C_{6-10}$ aryl oxide radical (these radicals may be linear, branched or cyclic or further substituted with halogen atoms, $C_{1-10}$ alkyl radicals, $C_{1-10}$ alkoxy radicals, $C_{6-10}$ aryl or aryloxy radicals); $R_1$ represents a hydrogen atom, a $C_{1-20}$ hydrocarbyl radical, a $C_{1-20}$ alkoxy radical or a $C_{6-10}$ aryl oxide radical; $R_2$ and $R_3$ are independently selected from a hydrogen atom, a $C_{1-20}$ hydrocarbyl radical, a $C_{1-20}$ alkoxy radical or a $C_{6-10}$ aryl oxide radical, and; $R_4$ and $R_5$ are independently selected from a hydrogen atom, a $C_{1-20}$ hydrocarbyl radical, a $C_{1-20}$ alkoxy radical or a $C_{6-10}$ aryl oxide radical.

In the art, a commonly used term for the $X(R_6)$ group shown in Formula (I) is "leaving group", i.e. any ligand that can be abstracted from Formula (I) forming a catalyst species capable of polymerizing one or more olefin(s). An equivalent term for the $X(R_6)$ group is an "activatable ligand". Further non-limiting examples of the $X(R_6)$ group shown in Formula (I) include weak bases such as amines, phosphines, ethers, carboxylates and dienes. In another embodiment, the two $R_6$ groups may form part of a fused ring or ring system.

Further embodiments of component A include structural, optical or enantiomeric isomers (meso and racemic isomers) and mixtures thereof of the structure shown in Formula (I).

In this disclosure, various species of component A (Formula (I)) were denoted by the terms "component A1", "component A2" and "component A3", etc. While not to be construed as limiting, two species of component A were employed as examples in this disclosure. Specifically: "component A" refers to diphenylmethylene(cyclo-pentadienyl)(2,7-di-t-butylfuorenyl)hafnium dichloride having the molecular formula [(2,7-tBu$_2$Flu)Ph$_2$C(Cp)HfCl$_2$], and; "component A2" refers to diphenylmethylene-(cyclopentadienyl)(2,7-di-t-butylfuorenyl)hafnium dimethyl having the molecular formula [(2,7-tBu$_2$Flu)Ph$_2$C(Cp)HfMe$_2$]. In this disclosure, component A1 and component A2 were used to prepare examples of the bridged metallocene catalyst formulation.

Long Chain Branching in Ethylene Interpolymer Products (via Component A)

In this disclosure, the first homogeneous catalyst formulation, comprising a component A, produces ethylene interpolymer products that have long chain branches, hereinafter 'LCB'.

LCB is a well-known structural phenomenon in polyethylenes and well known to those of ordinary skill in the art. Traditionally, there are three methods for LCB analysis, namely, nuclear magnetic resonance spectroscopy (NMR), for example see J. C. Randall, J Macromol. Sci., Rev. Macromol. Chem. Phys. 1989, 29, 201; triple detection SEC equipped with a DRI, a viscometer and a low-angle laser light scattering detector, for example see W. W. Yau and D. R. Hill, Int. J. Polym. Anal. Charact. 1996; 2:151; and rheology, for example see W. W. Graessley, Acc. Chem. Res. 1977, 10, 332-339. In this disclosure, a long chain branch is macromolecular in nature, i.e. long enough to be seen in an NMR spectra, triple detector SEC experiments or rheological experiments.

A limitation with LCB analysis via NMR is that it cannot distinguish branch length for branches equal to or longer than six carbon atoms (thus, NMR cannot be used to characterize LCB in ethylene/1-octene copolymers, which have hexyl groups as side branches).

The triple detection SEC method measures the intrinsic viscosity ([η]) (see W. W. Yau, D. Gillespie, Analytical and Polymer Science, TAPPI Polymers, Laminations, and Coatings Conference Proceedings, Chicago 2000; 2: 699 or F. Beer, G. Capaccio, L. J. Rose, J. Appl. Polym. Sci. 1999, 73: 2807 or P. M. Wood-Adams, J. M. Dealy, A. W. deGroot, O. D. Redwine, Macromolecules 2000; 33: 7489). By referencing the intrinsic viscosity of a branched polymer ([η]$_b$) to that of a linear one ([η]$_l$) at the same molecular weight, the viscosity branching index factor g' (g'=[η]$_b$/[η]$_l$) was used for branching characterization. However, both short chain branching (SCB) and long chain branching (LCB) make contribution to the intrinsic viscosity ([η]), effort was made to isolate the SCB contribution for ethylene/1-butene and ethylene/1-hexene copolymers but not ethylene/1-octene copolymers (see Lue et al., U.S. Pat. No. 6,870,010 B1). In this disclosure, a systematical investigation was performed to look at the SCB impact on the Mark-Houwink constant K for three types ethylene/1-olefin copolymers, i.e. octene, hexene and butene copolymers. After the deduction of SCB contribution, a Viscosity LCB Index was introduced for the characterization of ethylene/1-olefin copolymers containing LCB. The Viscosity LCB Index was defined as the measured Mark-Houwink constant ($K_m$) in 1,2,4-trichlorobenzene (TCB) at 140° C. for the sample divided by the SCB corrected Mark-Houwink constant ($K_{co}$) for linear ethylene/1-olefin copolymer, Eq.(1).

$$\text{Viscosity } LCB \text{ Index} = \frac{K_m}{K_{co}} = \frac{[\eta]/M_v^{0.725}}{(391.98 - A \times SCB)/1000000} \quad \text{Eq.(1)}$$

Where [η] was the intrinsic viscosity (dL/g) determined by 3D-SEC, $M_v$ was the viscosity average molar mass (g/mole) determined using 3D-SEC; SCB was the short chain branching content (CH$_3$#/1000 C) determined using FTIR, and; A was a constant which depends on the α-olefin present in the ethylene/α-olefin interpolymer under test, specifically, A is 2.1626, 1.9772 and 1.1398 for 1-octene, 1-hexene and 1-butene respectively. In the case of an ethylene homopolymer no correction is required for the Mark-Houwink constant, i.e. SCB is zero.

In the art, rheology has also been an effective method to measure the amount of LCB, or lack of, in ethylene interpolymers. Several rheological methods to quantify LCB have been disclosed. One commonly-used method was based on zero-shear viscosity ($\eta_0$) and weight average molar mass ($M_w$) data. The 3.41 power dependence ($\eta_0$=K× $M_w^{3.41}$) has been established for monodisperse polyethylene solely composed of linear chains, for example see R. L.

Arnett and C. P. Thomas, J. Phys. Chem. 1980, 84, 649-652. An ethylene polymer with a $\eta_0$ exceeding what was expected for a linear ethylene polymer, with the same $M_w$, was considered to contain long-chain branches. However, there is a debate in the field regarding the influence of polydispersity, e.g. $M_w/M_n$. A dependence on polydispersity was observed in some cases (see M. Ansari et al., Rheol. Acta, 2011, 5017-27) but not in others (see T. P. Karjala et al., Journal of Applied Polymer Science 2011, 636-646).

Another example of LCB analysis via rheology was based on zero-shear viscosity ($\eta_0$) and intrinsic viscosity ($[\eta]$) data, for example see R. N. Shroff and H. Mavridis, Macromolecules 1999, 32, 8454; which is applicable for essentially linear polyethylenes (i.e. polyethylenes with very low levels of LCB). A critical limitation of this method is the contribution of the SCB to the intrinsic viscosity. It is well known that $[\eta]$ decreases with increasing SCB content.

In this disclosure, a systematical investigation was performed to look at the impact of both SCB and molar mass distribution. After the deduction of the contribution of both SCB and molar mass distribution (polydispersity), a Long Chain Branching Factor (LCBF) was introduced to characterize the amount of LCB in ethylene/α-olefin copolymers, as described below.

Long Chain Branching Factor (LCBF)

In this disclosure the Long Chain Branching Factor, hereinafter LCBF, was used to characterize the amount of LCB in ethylene interpolymer products. The disclosed ethylene interpolymer products were in-situ blends of at least two ethylene interpolymers produced with at least two different catalyst formulations.

FIG. 1 illustrates the calculation of the LCBF. The solid 'Reference Line' shown in FIG. 1 characterizes ethylene polymers that do not contain LCB (or undetectable LCB). Ethylene polymers containing LCB deviate from this Reference Line. For example, the disclosed ethylene interpolymer products Examples 1 through 4 (the open circles in FIG. 1) deviate horizontally and vertically from the Reference Line.

LCBF calculation requires the polydispersity corrected Zero Shear Viscosity ($ZSV_c$) and the SCB corrected Intrinsic Viscosity ($IV_c$) as fully described in the following paragraphs.

The correction to the Zero Shear Viscosity, $ZSV_c$, having dimensions of poise, was performed as shown in equation Eq.(2):

$$ZSV_c = \frac{1.8389 \times \eta_0}{2.4110^{Ln(Pd)}} \qquad \text{Eq.(2)}$$

where $\eta_0$, the zero shear viscosity (poise), was measured by DMA as described in the 'Testing Methods' section of this disclosure; Pd was the dimensionless polydispersity ($M_w/M_n$) as measured using conventional SEC (see 'Testing Methods') and 1.8389 and 2.4110 are dimensionless constants.

The correction to the Intrinsic Viscosity, $IV_c$, having dimensions of dL/g, was performed as shown in equation Eq.(3):

$$IV_c = [\eta] + \frac{A \times SCB \times M_v^{0.725}}{1000000} \qquad \text{Eq.(3)}$$

where the intrinsic viscosity $[\eta]$ (dL/g) was measured using 3D-SEC (see 'Testing Methods'); SCB having dimensions of ($CH_3$#/1000 C) was determined using FTIR (see 'Testing Methods'); $M_v$, the viscosity average molar mass (g/mole), was determined using 3D-SEC (see 'Testing Methods'), and; A was a dimensionless constant that depends on the α-olefin in the ethylene/α-olefin interpolymer sample, i.e. A was 2.1626, 1.9772 or 1.1398 for 1-octene, 1-hexene and 1-butene α-olefins, respectively. In the case of an ethylene homopolymer no correction is required for the Mark-Houwink constant, i.e. SCB is zero.

As shown in FIG. 1, linear ethylene/α-olefin interpolymers (which do not contain LCB or contain undetectable levels of LCB) fall on the Reference Line defined by Eq.(4).

$$\text{Log}(IV_c) = 0.2100 \times \text{Log}(ZSV_c) - 0.7879 \qquad \text{Eq.(4)}$$

Table 1A shows the Reference Resins had $M_w/M_n$ values that ranged from 1.68 to 9.23 and contained 1-octene, 1-hexene or 1-butene α-olefins. Further, Reference Resins included ethylene polymers produced in solution, gas phase or slurry processes with Ziegler-Natta, homogeneous and mixed (Ziegler-Natta+homogeneous) catalyst formulations.

The ethylene interpolymer products, disclosed herein, contain long chain branching as evidenced by Table 2 and FIG. 1. More specifically, Table 2 discloses that the LCBF of Examples 1 through 4 were 0.0034, 0.0099, 0.021 and 0.029, respectively. Examples 1 through 4 (open circles) deviate significantly from the Reference Line shown in FIG. 1. Examples 1 through 4 were produced using a bridged metallocene catalyst formulation in the first reactor and an in-line Ziegler-Natta catalyst formulation in the second reactor. In contrast, as shown in Table 2, Comparatives 1, 2 had much lower LCBF of 0.00070 and 0.00068, respectively, and these samples were well described by the linear Reference Line shown in FIG. 1 (the X-bar symbols), i.e. Comparatives 1 and 2 have no or undetectable LCB.

Comparatives 1 and 2 were produced in a solution process pilot plant using an unbridged single site catalyst formulation in the first reactor and an in-line Ziegler-Natta catalyst formulation in the second reactor where the two reactors were operated in series mode. Comparatives 10 and 11 (Table 2) were produced on a commercial-scale solution process employing an unbridged single site catalyst formulation in the first reactor and an in-line Ziegler-Natta catalyst formulation in the second reactor (series mode). Relative to Examples 1-4, Comparatives 10 and 11 had much lower LCBF of 0.00023 and 0.0000658, respectively, and these samples were well described by the linear Reference Line shown in FIG. 1 (the X symbols).

As shown in FIG. 1, the calculation of the LCBF was based on the Horizontal-Shift ($S_h$) and Vertical-Shift ($S_v$) from the linear reference line, as defined by the following equations:

$$S_h = \text{Log}(ZSV_c) - 4.7619 \times \text{Log}(IV_c) - 3.7519 \qquad \text{Eq.(5)}$$

$$S_v = 0.2100 \times \text{Log}(ZSV_c) - \text{Log}(IV_c) - 0.7879 \qquad \text{Eq.(6).}$$

In Eq. (5) and (6), it is required that $ZSV_c$ and $IV_c$ have dimensions of poise and dL/g, respectively. The Horizontal-Shift ($S_h$) was a shift in $ZSV_c$ at constant Intrinsic Viscosity ($IV_c$), if one removes the Log function its physical meaning is apparent, i.e. a ratio of two Zero Shear Viscosities, the $ZSV_c$ of the sample under test relative to the $ZSV_c$ of a linear ethylene polymer having the same $IV_c$. The Horizontal-Shift ($S_h$) was dimensionless. The Vertical-Shift ($S_v$) was a shift in $IV_c$ at constant Zero Shear Viscosity ($ZSV_c$), if one removes the Log function its physical meaning is apparent, i.e. a ratio of two Intrinsic Viscosities, the $IV_c$ of a linear ethylene polymer having the same $ZSV_c$ relative to the $IV_c$ of the sample under test. The Vertical-Shift ($S_v$) was dimensionless.

The dimensionless Long Chain Branching Factor (LCBF) was defined by Eq.(7):

$$LCBF = \frac{S_h \times S_v}{2} \qquad \text{Eq.(7)}$$

Given the data in Table 2, the LCBF of Examples and Comparatives were calculated. To be more clear, as shown in Table 2, the $S_h$ and $S_v$ of Example 3 were 0.442 and 0.0929, respectively, thus the LCBF was 0.0205 ((0.442×0.0929)/2). In contrast, the $S_h$ and $S_v$ of Comparative 2 were 0.0804 and 0.0169, respectively, thus the LCBF was 0.000678 ((0.0804×0.0169)/2).

In this disclosure, resins having no LCB (or undetectable LCB) were characterized by a LCBF of less than 0.001 (dimensionless), as evidenced by Table 1B where the reference resins had LCBF values ranging from 0.000426 to $1.47 \times 10^{-9}$.

In this disclosure, resins having LCB were characterized by a LCBF of 0.001 (dimensionless), as evidenced by Examples 1 and 4 shown in Table 2 that had LCBF of 0.00339 and 0.0291, respectively.

Table 3 summarizes the LCBF of Comparatives A-C and Comparatives D-G. Comparatives A-C (open diamond in FIG. 1) were believed to be produced in a solution process employing one reactor and a constrained geometry single site catalyst formulation, i.e. AFFINITY™ PL 1880 (three different samples (lots)). AFFINITY™ products are ethylene/1-octene interpolymers available from The Dow Chemical Company (Midland, Mich., USA). It has been well documented in the art that the constrained geometry catalyst produces long chain branched ethylene/1-octene copolymers, as evidenced by the LCBF values disclosed in Table 3, i.e. from 0.0396 to 0.0423. Comparatives D-G (open squares in FIG. 1) were believed to be solution process series dual reactor and dual catalyst ethylene interpolymers, where a constrained geometry single site catalyst formulation was employed in a first reactor and a batch Ziegler-Natta catalyst formulation was employed in a second reactor, i.e. Elite® 5401G and Elite® 5100G (two different samples (lots)) and Elite® 5400G, respectively. Elite® products are ethylene/1-octene interpolymers available from The Dow Chemical Company (Midland, Mich., USA). As shown in Table 3, Comparatives D-G had LCBF values from 0.00803 to 0.0130.

$^{13}$C NMR Determination of Long Chain Branching in the First Ethylene Interpolymer Examples of ethylene interpolymer product, disclosed herein, contain a first ethylene interpolymer that was produced with a first homogeneous catalyst formulation. One embodiment of the first homogenous catalyst formulation was a bridged metallocene catalyst formulation, this catalyst formulation produced a long chain branched (LCB) first ethylene interpolymer. Pure samples of the first ethylene interpolymer were produced using the Continuous Polymerization Unit (CPU). The CPU was fully described in the 'Continuous Polymerization Unit (CPU)' section of this disclosure. The CPU employs one reactor and one catalyst formulation was used. The CPU and the bridged metallocene catalyst formulation containing Component A [(2,7-tBu$_2$Flu)Ph$_2$C(Cp)HfMe$_2$] were used to produce examples of the first ethylene interpolymer and the amount of long chain branching in this interpolymer was measured by $^{13}$C NMR. Table 11 illustrates typical CPU operating continues for the bridged metallocene catalyst formulating to produce a first ethylene interpolymer at three reactor temperatures (130° C., 160° C. and 190° C.) and two levels of ethylene conversion, i.e. low ethylene conversion (about 75%) and high ethylene conversion (about 94%). No hydrogen was used.

Table 12 discloses the amount of LCB in Examples C10 to C15, i.e. pure samples of the first ethylene interpolymer, produced with the bridged metallocene catalyst formulation, as determined by $^{13}$C-NMR (nuclear magnetic resonance). Examples C10 to C15 were ethylene homopolymers produced on the CPU at three reactor temperatures (190° C., 160° C. and 130° C.), three levels of ethylene conversions, i.e. about 95 wt %, about 85 wt % and about 75 wt % and no hydrogen was used. As shown in Table 12, the amount of long chain branching in the first ethylene interpolymer varied from 0.03 LCB/1000 C to 0.23 LCB/1000 C.

Component C

The present disclosure includes "a third homogeneous catalyst formulation". One embodiment of the third homogeneous catalyst formulation include "an unbridged single site catalyst formulation" containing a bulky ligand-metal complex, hereinafter "component C", represented by Formula (II).

$$(L^A)_a M(Pl)_b (Q)_n \qquad (II)$$

In Formula (II): ($L^A$) represents a bulky ligand; M represents a metal atom; Pl represents a phosphinimine ligand; Q represents a leaving group; a is 0 or 1; b is 1 or 2; (a+b)=2; n is 1 or 2, and; the sum of (a+b+n) equals the valance of the metal M. Non-limiting examples of M in Formula (II) include Group 4 metals, titanium, zirconium and hafnium.

Non-limiting examples of the bulky ligand $L^A$ in Formula (II) include unsubstituted or substituted cyclopentadienyl ligands or cyclopentadienyl-type ligands, heteroatom substituted and/or heteroatom containing cyclopentadienyl-type ligands. Additional non-limiting examples include, cyclopentaphenanthreneyl ligands, unsubstituted or substituted indenyl ligands, benzindenyl ligands, unsubstituted or substituted fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine, pyrrolyl ligands, pyrozolyl ligands, carbazolyl ligands, borabenzene ligands and the like, including hydrogenated versions thereof, for example tetrahydroindenyl ligands. In other embodiments, $L^A$ may be any other ligand structure capable of η-bonding to the metal M, such embodiments include both $\eta^3$-bonding and $\eta^5$-bonding to the metal M. In other embodiments, $L^A$ may comprise one or more heteroatoms, for example, nitrogen, silicon, boron, germanium, sulfur and phosphorous, in combination with carbon atoms to form an open, acyclic, or a fused ring, or ring system, for example, a heterocyclopentadienyl ancillary ligand. Other non-limiting embodiments for $L^A$ include bulky amides, phosphides, alkoxides, aryloxides, imides, carbolides, borollides, porphyrins, phthalocyanines, corrins and other polyazomacrocycles.

The phosphinimine ligand, Pl, is defined by Formula (III):

$$(R^P)_3 P = N — \qquad (III)$$

wherein the $R^P$ groups are independently selected from: a hydrogen atom; a halogen atom; $C_{1-20}$ hydrocarbyl radicals which are unsubstituted or substituted with one or more halogen atom(s); a $C_{1-8}$ alkoxy radical; a $C_{6-10}$ aryl radical;

a $C_{6-10}$ aryloxy radical; an amido radical; a silyl radical of formula —Si($R^s$)$_3$, wherein the $R^s$ groups are independently selected from, a hydrogen atom, a $C_{1-8}$ alkyl or alkoxy radical, a $C_{6-10}$ aryl radical, a $C_{6-10}$ aryloxy radical, or a germanyl radical of formula —Ge($R^G$)$_3$, wherein the $R^G$ groups are defined as $R^s$ is defined in this paragraph.

The leaving group Q is any ligand that can be abstracted from Formula (II) forming a catalyst species capable of polymerizing one or more olefin(s). In some embodiments, Q is a monoanionic labile ligand having a sigma bond to M. Depending on the oxidation state of the metal, the value for n is 1 or 2 such that Formula (II) represents a neutral bulky ligand-metal complex. Non-limiting examples of Q ligands include a hydrogen atom, halogens, $C_{1-20}$ hydrocarbyl radicals, $C_{1-20}$ alkoxy radicals, $C_{5-10}$ aryl oxide radicals; these radicals may be linear, branched or cyclic or further substituted by halogen atoms, $C_{1-10}$ alkyl radicals, $C_{1-10}$ alkoxy radicals, $C_{6-10}$ aryl or aryloxy radicals. Further non-limiting examples of Q ligands include weak bases such as amines, phosphines, ethers, carboxylates, dienes, hydrocarbyl radicals having from 1 to 20 carbon atoms. In another embodiment, two Q ligands may form part of a fused ring or ring system.

Further embodiments of component C include structural, optical or enantiomeric isomers (meso and racemic isomers) and mixtures thereof of the bulky ligand-metal complex shown in Formula (II).

In this disclosure, unique chemical species of component C (Formula (II)) are denoted by the terms "component C1", "component C2" and "component C3", etc. While not to be construed as limiting, two species of component C were employed as examples in this disclosure. Specifically: "component C1" refers to cyclopentadienyl tri(tertiary butyl) phosphinimine titanium dichloride having the molecular formula [Cp[(t-Bu)$_3$PN]TiCl$_2$], and; "component C2" refers to cyclopentadienyl tri(isopropyl)phosphinimine titanium dichloride having the molecular formula [Cp[(isopropyl)$_3$PN]TiCl$_2$]. In this disclosure, component C1 and component C2 were used as the source of bulky ligand-metal complex to prepare two examples of the unbridged single site catalyst formulation.

Long Chain Branching in Ethylene Interpolymers Produced with Component C

As shown in FIG. 1 and Table 2, Comparative ethylene interpolymer products (Comparative 1, 2, 10 and 11) produced with a homogeneous catalyst formulation containing Component C had undetectable levels of LCB, as evidenced by the dimensionless Long Chain Branching Factor (LCBF) of less than 0.001, e.g. LCBF ranged from 0.0000658 to 0.000700.

Homogeneous Catalyst Formulations

In this disclosure non-limiting "Examples" of ethylene interpolymer product were prepared by employing a bridged metallocene catalyst formulation in a first reactor.

The bridged metallocene catalyst formulation contains a component A (defined above), a component $M^A$, a component $B^A$ and a component $P^A$. Components M, B and P are defined below and the superscript "$^A$" denotes that fact that the respective component was part of the catalyst formulation containing component A, i.e. the bridged metallocene catalyst formulation.

In this disclosure "Comparative" ethylene interpolymers were prepared by employing an unbridged single site catalyst formulation in the first reactor. In other words, in Comparative samples, the unbridged single site catalyst formulation replaced the bridged metallocene catalyst formulation in the first reactor. The unbridged single site catalyst formulation contains a component C (defined above), a component $M^C$ a component $B^C$ and a component $P^C$. Components M, B and P are defined below and the superscript "$^C$" denoted that fact that the respective component was part of the catalyst formulation containing component C, i.e. the unbridged single site catalyst formulation.

The catalyst components M, B and P were independently selected for each catalyst formulation. To be more clear: components $M^A$ and $M^C$ may, or may not be, the same chemical compound; components $B^A$ and $B^C$ may, or may not be, the same chemical compound, and; components $P^A$ and $P^C$ may, or may not be, the same chemical compound. Further, catalyst activity was optimized by independently adjusting the mole ratios of the components in each catalyst formulation.

Components M, B and P were not particularly limited, i.e. a wide variety of components can be used as described below.

Component M functioned as a co-catalyst that activated component A or component C, into a cationic complex that effectively polymerized ethylene, or mixtures of ethylene and α-olefins, producing high molecular weight ethylene interpolymers. In the bridged metallocene catalyst formulation and the unbridged single site catalyst formulation the respective component M was independently selected from a variety of compounds and those skilled in the art will understand that the embodiments in this disclosure are not limited to the specific chemical compound disclosed. Suitable compounds for component M included an alumoxane co-catalyst (an equivalent term for alumoxane is aluminoxane). Although the exact structure of an alumoxane co-catalyst was uncertain, subject matter experts generally agree that it was an oligomeric species that contain repeating units of the general Formula (IV):

$$(R)_2AlO—(Al(R)—O)_n—Al(R)_2 \quad (IV)$$

where the R groups may be the same or different linear, branched or cyclic hydrocarbyl radicals containing 1 to 20 carbon atoms and n is from 0 to about 50. A non-limiting example of an alumoxane was methyl aluminoxane (or MMAO-7) wherein each R group in Formula (IV) is a methyl radical.

Component B was an ionic activator. In general, ionic activators are comprised of a cation and a bulky anion; wherein the latter is substantially non-coordinating.

In the bridged metallocene catalyst formulation and the unbridged single site catalyst formulation the respective component B was independently selected from a variety of compounds and those skilled in the art will understand that the embodiments in this disclosure are not limited to the specific chemical compound disclosed. Non-limiting examples of component B were boron ionic activators that are four coordinate with four ligands bonded to the boron atom. Non-limiting examples of boron ionic activators included the following Formulas (V) and (VI) shown below;

$$[R^5]^+[B(R^7)_4]^- \quad (V)$$

where B represented a boron atom, $R^5$ was an aromatic hydrocarbyl (e.g. triphenyl methyl cation) and each $R^7$ was independently selected from phenyl radicals which were unsubstituted or substituted with from 3 to 5 substituents selected from fluorine atoms, $C_{1-4}$ alkyl or alkoxy radicals which were unsubstituted or substituted by fluorine atoms; and a silyl radical of formula —Si($R^9$)$_3$, where each $R^9$ was independently selected from hydrogen atoms and $C_{1-4}$ alkyl radicals, and; compounds of formula (VI);

$$[(R^8)_zZH]^+[B(R^7)_4]^- \quad (VI)$$

where B was a boron atom, H was a hydrogen atom, Z was a nitrogen or phosphorus atom, t was 2 or 3 and $R^8$ was selected from $C_{1-8}$ alkyl radicals, phenyl radicals which were unsubstituted or substituted by up to three $C_{1-4}$ alkyl radicals, or one $R^8$ taken together with the nitrogen atom may form an anilinium radical and $R^7$ was as defined above in Formula (VI).

In both Formula (V) and (VI), a non-limiting example of $R^7$ was a pentafluorophenyl radical. In general, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators included: triethylammonium tetra(phenyl) boron, tripropylammonium tetra(phenyl)boron, tri(n-butyl) ammonium tetra(phenyl)boron, trimethylammonium tetra (p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene(diazonium)tetrakispentafluorophenyl borate, tropillium tetrakis(2,3,5,6-tetrafluorophenyl)borate, triphenylmethylium tetrakis(2,3,5,6-tetrafluorophenyl)borate, benzene(diazonium) tetrakis(3,4,5-trifluorophenyl)borate, tropillium tetrakis(3,4,5-trifluorophenyl)borate, benzene(diazonium) tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropillium tetrakis(2,3,4,5-tetrafluorophenyl)borate, triphenylmethylium tetrakis(2,3,4,5-tetrafluorophenyl)borate, and benzene(diazonium) tetrakis (2,3,4,5 tetrafluorophenyl)borate. Readily available commercial ionic activators included N,N-dimethylanilinium tetrakispentafluorophenyl borate, and triphenylmethylium tetrakispentafluorophenyl borate.

Component P is a hindered phenol and is an optional component in the respective catalyst formulation. In the bridged metallocene catalyst formulation and the unbridged single site catalyst formulation the respective component P was independently selected from a variety of compounds and those skilled in the art will understand that the embodiments in this disclosure are not limited to the specific chemical compound disclosed. Non-limiting example of hindered phenols included butylated phenolic antioxidants, butylated hydroxytoluene, 2,4-di-tertiarybutyl-6-ethyl phenol, 4,4'-methylenebis (2,6-di-tertiary-butylphenol), 1,3,5-trimethyl-2,4,6-tris (3,5-di-tert-butyl-4-hydroxybenzyl) benzene and octadecyl-3-(3',5'-di-tert-butyl-4'-hydroxyphenyl) propionate.

As fully described below, a highly active first homogeneous catalyst formulation, or in one specific embodiment a highly active bridged metallocene catalyst formulation was produced by optimizing the quantity and mole ratios of the four components in the formulation; for example, component A1, component $M^{A1}$, component $B^{A1}$ and component $P^{A1}$. Where highly active means a very large amount of ethylene interpolymer is produced from a very small amount of catalyst formulation. Similarly, a highly active third homogeneous catalyst formulation or an unbridged single site catalyst formulation (comparative catalyst formulations) were produced by optimizing the quantity and mole ratios of the four components in the formulation; e.g., one embodiment comprises a component C1, a component $M^{C1}$, a component $B^{C1}$ and a component $P^{C1}$.

Heterogeneous Catalyst Formulations

A number of heterogeneous catalyst formulations are well known to those skilled in the art, including, as non-limiting examples, Ziegler-Natta and chromium catalyst formulations. In this disclosure, a first heterogeneous catalyst formulation was used to manufacture the Examples, as well as Comparatives, where the first heterogeneous catalyst formulation was injected in a second reactor producing the second ethylene interpolymer. In this disclosure, an optional second heterogeneous catalyst formulation may be used, where the second heterogeneous catalyst formulation may be injected in a third reactor producing an optional third ethylene interpolymer. In this disclosure, the catalytic metal in the first heterogeneous catalyst formulation was identified by the term "metal Z1"; the catalytic metal in the second heterogeneous catalyst formulation was identified by the term "metal Z2".

In this disclosure, embodiments are described where "a first in-line Ziegler-Natta catalyst formulation" and "a first batch Ziegler-Natta catalyst formation" are used. The term "in-line" refers to the continuous synthesis of a small quantity of active Ziegler-Natta catalyst and immediately injecting this catalyst into at least one continuously operating reactor, wherein the catalyst polymerizes ethylene and one or more optional α-olefins to form an ethylene interpolymer. The term "batch" refer to the synthesis of a much larger quantity of catalyst or procatalyst in one or more mixing vessels that are external to, or isolated from, the continuously operating solution polymerization process. Once prepared, the batch Ziegler-Natta catalyst formulation, or batch Ziegler-Natta procatalyst, is transferred to a catalyst storage tank. The term "procatalyst" refers to an inactive catalyst formulation (inactive with respect to ethylene polymerization); the procatalyst is converted into an active catalyst by adding an alkyl aluminum co-catalyst. As needed, the procatalyst is pumped from the storage tank to at least one continuously operating reactor, wherein an active catalyst polymerizes ethylene and one or more optional α-olefins to form an ethylene interpolymer. The procatalyst may be converted into an active catalyst in the reactor or external to the reactor.

A wide variety of chemical compounds can be used to synthesize an active Ziegler-Natta catalyst formulation. The following describes various chemical compounds that may be combined to produce an active Ziegler-Natta catalyst formulation. Those skilled in the art will understand that the embodiments in this disclosure are not limited to the specific chemical compound disclosed.

An active Ziegler-Natta catalyst formulation may be formed from: a magnesium compound, a chloride compound, a metal compound, an alkyl aluminum co-catalyst and an aluminum alkyl. In this disclosure, for example in Table 4A, the term "component (v)" is equivalent to the magnesium compound, the term "component (vi)" is equivalent to the chloride compound, the term "component (vii)" is equivalent to the metal compound, the term "component (viii)" is equivalent to the alkyl aluminum co-catalyst and the term "component (ix)" is equivalent to the aluminum alkyl. As will be appreciated by those skilled in the art, Ziegler-Natta catalyst formulations may contain additional components; a non-limiting example of an additional component is an electron donor, e.g. amines or ethers.

A non-limiting example of an active in-line Ziegler-Natta catalyst formulation can be prepared as follows. In the first step, a solution of a magnesium compound (component (v)) is reacted with a solution of the chloride compound (component (vi)) to form a magnesium chloride support suspended in solution. Non-limiting examples of magnesium compounds include $Mg(R^1)_2$; wherein the $R^1$ groups may be the same or different, linear, branched or cyclic hydrocarbyl radicals containing 1 to 10 carbon atoms. Non-limiting examples of chloride compounds include $R^2Cl$; wherein $R^2$ represents a hydrogen atom, or a linear, branched or cyclic hydrocarbyl radical containing 1 to 10 carbon atoms. In the first step, the solution of magnesium compound may also contain an aluminum alkyl (component (ix)). Non-limiting examples of aluminum alkyl include $Al(R^3)_3$, wherein the $R^3$ groups may be the same or different, linear, branched or cyclic hydrocarbyl radicals containing from 1 to 10 carbon atoms. In the second step a solution of the metal compound (component (vii)) is added to the solution of magnesium chloride and the metal compound is supported on the magnesium chloride. Non-limiting examples of suitable metal compounds include $M(X)_n$ or $MO(X)_n$; where M represents a metal selected from Group 4 through Group 8 of the Periodic Table, or mixtures of metals selected from Group 4 through Group 8; O represents oxygen, and; X represents chloride or bromide; n is an integer from 3 to 6 that satisfies the oxidation state of the metal. Additional non-limiting examples of suitable metal compounds include Group 4 to Group 8 metal alkyls, metal alkoxides (which may be prepared by reacting a metal alkyl with an alcohol) and mixed-ligand metal compounds that contain a mixture of halide, alkyl and alkoxide ligands. In the third step a solution of an alkyl aluminum co-catalyst (component (viii)) is added to the metal compound supported on the magnesium chloride. A wide variety of alkyl aluminum co-catalysts are suitable, as expressed by Formula (VII):

$$Al(R^4)_p(OR^5)_q(X)_r \quad \text{(VII)}$$

wherein the $R^4$ groups may be the same or different, hydrocarbyl groups having from 1 to 10 carbon atoms; the $OR^5$ groups may be the same or different, alkoxy or aryloxy groups wherein $R^5$ is a hydrocarbyl group having from 1 to 10 carbon atoms bonded to oxygen; X is chloride or bromide, and; (p+q+r)=3, with the proviso that p is greater than 0. Non-limiting examples of commonly used alkyl aluminum co-catalysts include trimethyl aluminum, triethyl aluminum, tributyl aluminum, dimethyl aluminum methoxide, diethyl aluminum ethoxide, dibutyl aluminum butoxide, dimethyl aluminum chloride or bromide, diethyl aluminum chloride or bromide, dibutyl aluminum chloride or bromide and ethyl aluminum dichloride or dibromide.

The process described in the paragraph above, to synthesize an active in-line Ziegler-Natta catalyst formulation, can be carried out in a variety of solvents; non-limiting examples of solvents include linear or branched $C_5$ to $C_{12}$ alkanes or mixtures thereof.

To produce an active in-line Ziegler-Natta catalyst formulation the quantity and mole ratios of the five components, (v) through (ix), are optimized as described below.

Additional embodiments of heterogeneous catalyst formulations include formulations where the "metal compound" is a chromium compound; non-limiting examples include silyl chromate, chromium oxide and chromocene. In some embodiments, the chromium compound is supported on a metal oxide such as silica or alumina.

Heterogeneous catalyst formulations containing chromium may also include co-catalysts; non-limiting examples of co-catalysts include trialkylaluminum, alkylaluminoxane and dialkoxyalkylaluminum compounds and the like.

Solution Polymerization Process: In-Line Heterogeneous Catalyst Formulation

The disclosed continuous solution polymerization process is improved by having one or more of: 1) at least a 70% reduced [α-olefin/ethylene] weight ratio as defined by the following formula, $$\% \text{ Reduced} \left[\frac{\alpha-\text{olefin}}{\text{ethylene}}\right] =$$

$$100 \times \left\{ \frac{\left(\frac{\alpha-\text{olefin}}{\text{ethylene}}\right)^A - \left(\frac{\alpha-\text{olefin}}{\text{ethylene}}\right)^C}{\left(\frac{\alpha-\text{olefin}}{\text{ethylene}}\right)^C} \right\} \leq -70\%$$

wherein $(\alpha\text{-olefin/ethylene})^A$ is calculated by dividing the weight of the α-olefin added to the first reactor by the weight of ethylene added to the first reactor, wherein a first ethylene interpolymer is produced having "a target density" using a first homogeneous catalyst formulation, and; $(\alpha\text{-olefin/ethylene})^C$ is calculated by dividing the weight of the α-olefin added to the first reactor by the weight of the ethylene added to the first reactor, wherein a control ethylene interpolymer having the target density is produced by replacing the first homogeneous catalyst formulation with a third homogeneous catalyst formulation, and/or; 2) the first ethylene interpolymer at least a 5% improved weight average molecular weight as defined by the following formula $$\% \text{ Improved } M_w = 100\% \times (M_w^A - M_w^C)/M_w^C \geq 5\%$$

wherein $M_w^A$ is a weight average molecular weight of the first ethylene interpolymer and $M_w^C$ is a weight average molecular weight of a comparative ethylene interpolymer; wherein said comparative ethylene interpolymer is produced in the first reactor by replacing the first homogeneous catalyst formulation with the third homogeneous catalyst formulation.

Figure 2:
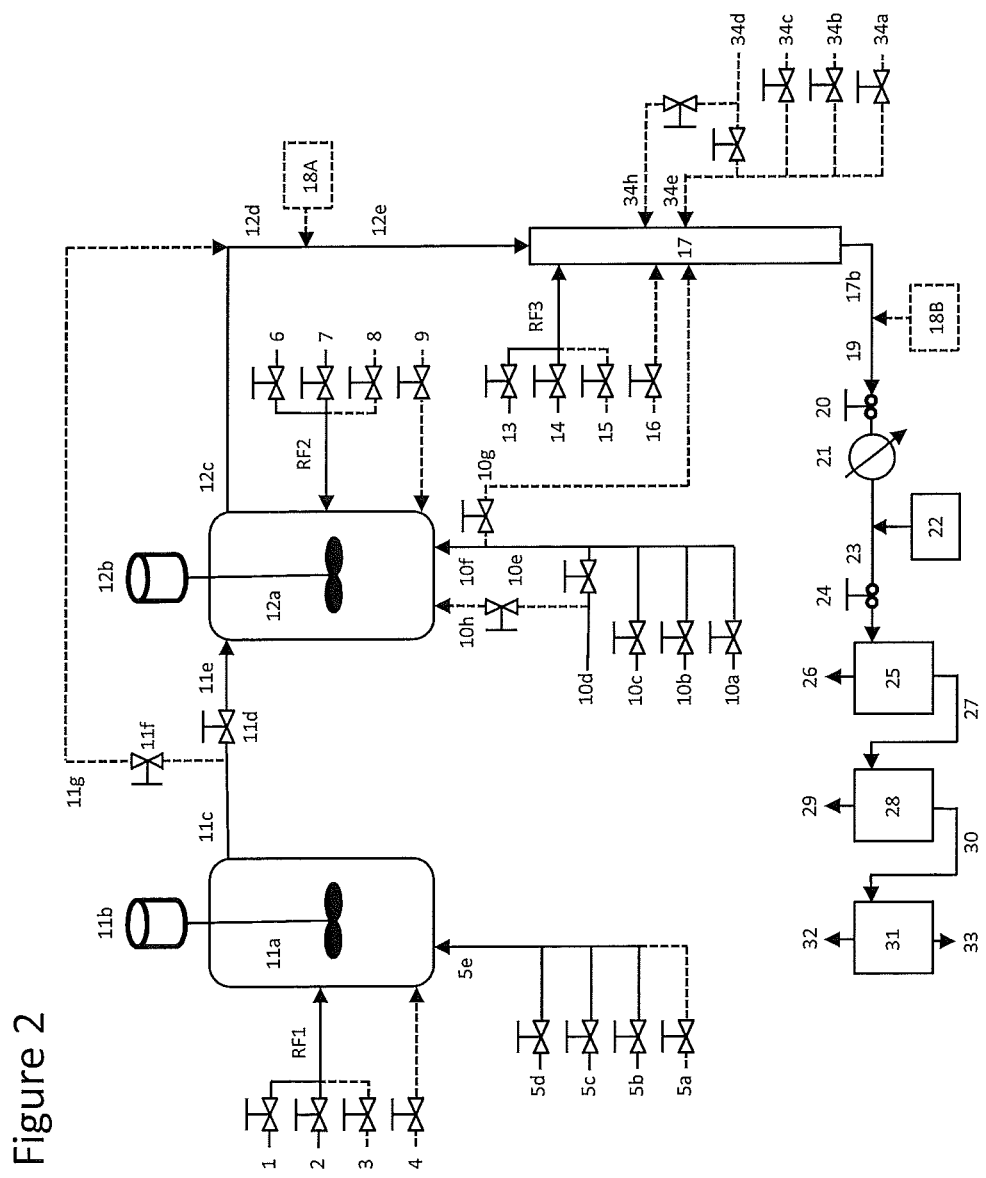
FIG. 2 illustrates a continuous solution polymerization process where a first homogeneous catalyst formulation and an in-line heterogeneous catalyst formulation is employed.

Embodiments of the improved continuous solution polymerization process are shown in FIG. 2. FIG. 2 is not to be construed as limiting, it being understood, that embodiments are not limited to the precise arrangement of, or the number of, vessels shown.

In an embodiment of the continuous solution polymerization process, process solvent, monomer(s) and a catalyst formulation are continuously fed to a reactor wherein the desired ethylene interpolymer is formed in solution. In FIG. 2, process solvent 1, ethylene 2 and optional α-olefin 3 are combined to produce reactor feed stream RF1 which flows into reactor 11a. In FIG. 2 optional streams, or optional embodiments, are denoted with dotted lines. It is not particularly important that combined reactor feed stream RF1 be formed; i.e. reactor feed streams can be combined in all possible combinations, including an embodiment where streams 1 through 3 are independently injected into reactor 11a. Optionally hydrogen may be injected into reactor 11a through stream 4; hydrogen may be added to control (reduce) the molecular weight of the first ethylene interpolymer produced in reactor 11a. Reactor 11a is continuously stirred by stirring assembly 11b which includes a motor external to the reactor and an agitator within the reactor. In the art, such a reactor is frequently called a CSTR (Continuously Stirred Tank Reactor).

A first homogeneous catalyst formulation is injected into reactor 11a through stream 5e. An embodiment of the first homogeneous catalyst formulation is a bridged metallocene catalyst formulation. The bridged metallocene catalyst formulation (described above) was employed in reactor 11a to produce all of the Examples in this disclosure. In contrast, a third homogeneous catalyst formulation was employed in reactor 11a to produce all of the Comparatives in this disclosure. As described above, one embodiment of the third homogeneous catalyst formulation was an unbridged single site catalyst formulation.

Figure 3:
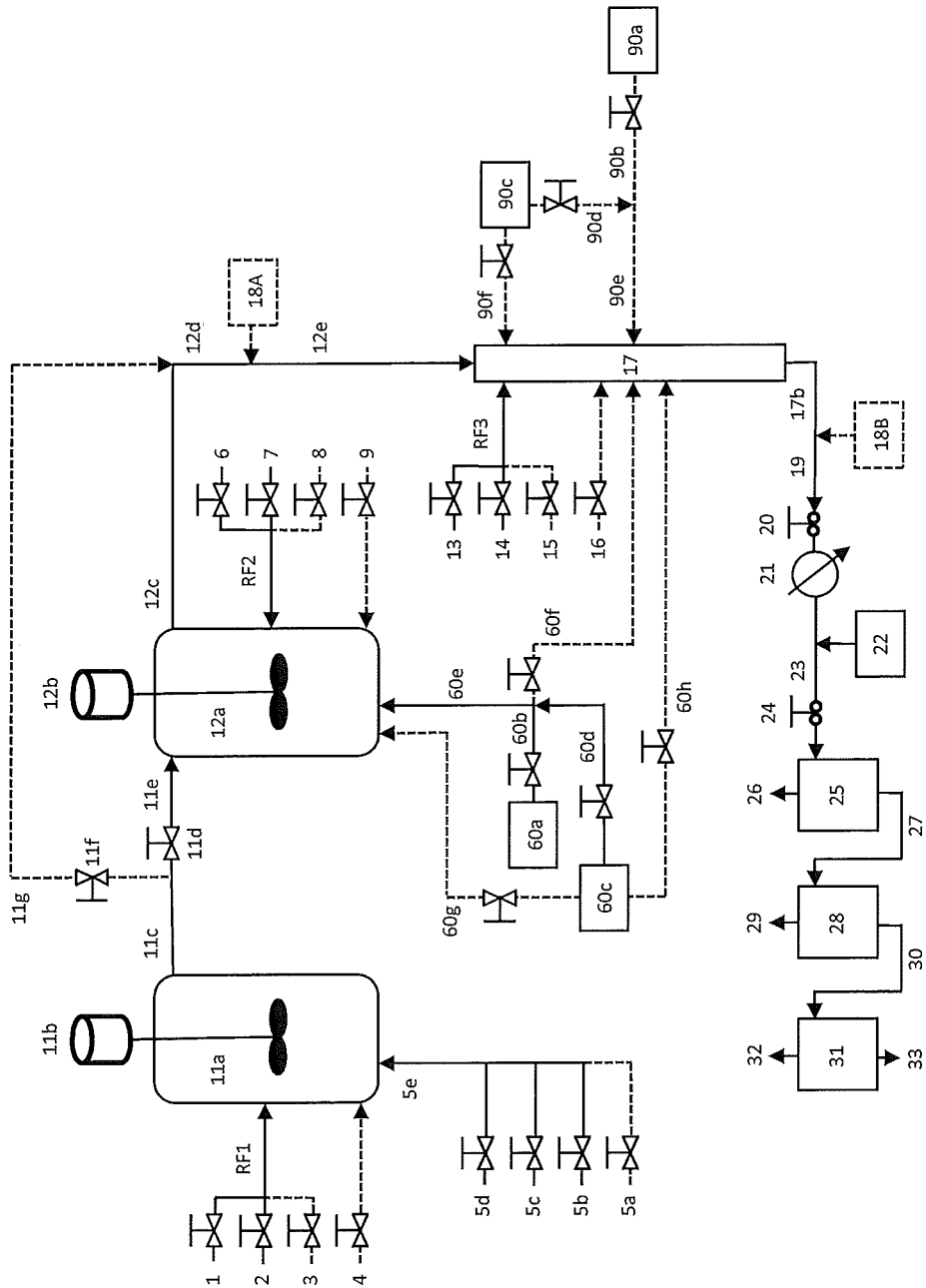
FIG. 3 illustrates a continuous solution polymerization process where a first homogeneous catalyst formulation and a batch heterogeneous catalyst formulation is employed.

Referring to FIGS. 2 and 3, the bridged metallocene catalyst formulation was prepared by combining: stream 5a, containing component P dissolved in a catalyst component solvent; stream 5b, containing component M dissolved in a catalyst component solvent; stream 5c, containing component A dissolved in a catalyst component solvent, and; stream 5d, containing component B dissolved in a catalyst component solvent. The bridged metallocene catalyst formulation was then injected into reactor 11a via process stream 5e. Any combination of the streams employed to prepare and deliver the bridged metallocene catalyst formulation may be heated or cooled, i.e. streams 5a through 5e. The "R1 catalyst inlet temperature", defined as the temperature of the solution containing the bridged metallocene catalyst formulation (stream 5e) prior to injection into reactor 11a, was controlled. In some cases the upper temperature limit on the R1 catalyst inlet temperature may be about 180° C., in other cases about 160° C. and in still other cases about 150° C., and; in some cases the lower temperature limit on the R1 catalyst inlet temperature may be about 80° C., in other cases 100° C. and in still other cases about 120° C. In still other cases the upper temperature limit on the R1 catalyst inlet temperature may be about 70° C., in other cases about 60° C. and in still other cases about 50° C., and; in some cases the lower temperature limit on the R1 catalyst inlet temperature may be about 0° C., in other cases 10° C. and in still other cases about 20° C.

Each catalyst component was dissolved in a catalyst component solvent. The catalyst component solvent used for each catalyst component may be the same or different. Catalyst component solvents are selected such that the combination of catalyst components does not produce a precipitate in any process stream; for example, precipitation of a catalyst components in stream 5e. The optimization of the catalyst formulations is described below.

Reactor 11a produces a first exit stream, stream 11c, containing the first ethylene interpolymer dissolved in process solvent, as well as unreacted ethylene, unreacted α-olefins (if present), unreacted hydrogen (if present), active first homogeneous catalyst, deactivated catalyst, residual catalyst components and other impurities (if present). Melt index ranges and density ranges of the first ethylene interpolymer produced are described below.

The continuous solution polymerization process shown in FIGS. 2 and 3 includes two embodiments where reactors 11a and 12a can be operated in series or parallel modes. In series mode 100% of stream 11c (the first exit stream) passes through flow controller 11d forming stream 11e which enters reactor 12a. In contrast, in parallel mode 100% of stream 11c passes through flow controller 11f forming stream 11g. Stream 11g by-passes reactor 12a and is combined with stream 12c (the second exit stream) forming stream 12d (the third exit stream).

Fresh reactor feed streams are injected into reactor 12a; process solvent 6, ethylene 7 and optional α-olefin 8 are combined to produce reactor feed stream RF2. It is not important that stream RF2 is formed; i.e. reactor feed streams can be combined in all possible combinations, including independently injecting each stream into the reactor. Optionally hydrogen may be injected into reactor 12a through stream 9 to control (reduce) the molecular weight of the second ethylene interpolymer. Reactor 12a is continuously stirred by stirring assembly 12b which includes a motor external to the reactor and an agitator within the reactor.

A first heterogeneous catalyst formulation was injected in reactor 12a through stream 10f, one embodiment of the first heterogeneous catalyst formulation is a first in-line Ziegler-Natta catalyst formulation, and a second ethylene interpolymer was formed in reactor 12a. The components that comprise the first in-line Ziegler-Natta catalyst formulation is introduced through streams 10a, 10b, 10c and 10d. A first heterogeneous catalyst assembly, defined by the conduits and flow controllers associated with streams 10a-10h, is operated as described below. The first heterogeneous catalyst assembly produces a highly active first in-line Ziegler-Natta catalyst formulation by optimizing the following molar ratios: (aluminum alkyl)/(magnesium compound) or (ix)/(v); (chloride compound)/(magnesium compound) or (vi)/(v); (alkyl aluminum co-catalyst)/(metal compound) or (viii)/(vii), and; (aluminum alkyl)/(metal compound) or (ix)/(vii); as well as the time these compounds have to react and equilibrate.

Stream 10a (stream S1 in claims) contains a binary blend of a magnesium compound, component (v) and an aluminum alkyl, component (ix), in process solvent. The upper limit on the (aluminum alkyl)/(magnesium compound) molar ratio in stream 10a may be about 70, in some cases about 50 and is other cases about 30. The lower limit on the (aluminum alkyl)/(magnesium compound) molar ratio may be about 3.0, in some cases about 5.0 and in other cases about 10. Stream 10b (stream S2 in claims) contains a solution of a chloride compound, component (vi), in process solvent. Stream 10b is combined with stream 10a and the intermixing of streams 10a and 10b produces a magnesium chloride catalyst support. To produce a highly active first in-line Ziegler-Natta catalyst (highly active in olefin polymerization), the (chloride compound)/(magnesium compound) molar ratio is optimized. The upper limit on the (chloride compound)/(magnesium compound) molar ratio may be about 4, in some cases about 3.5 and is other cases about 3.0. The lower limit on the (chloride compound)/(magnesium compound) molar ratio may be about 1.0, in some cases about 1.5 and in other cases about 1.9. The time between the addition of the chloride compound and the addition of the metal compound (component (vii)) via stream 10c (stream S3 in claims) is controlled; hereinafter HUT-1 (the first Hold-Up-Time). HUT-1 is the time for streams 10a (stream S1 in claims) and 10b (stream S2 in claims) to equilibrate and form a magnesium chloride support. The upper limit on HUT-1 may be about 70 seconds, in some cases about 60 seconds and is other cases about 50 seconds. The lower limit on HUT-1 may be about 5 seconds, in some cases about 10 seconds and in other cases about 20 seconds. HUT-1 is controlled by adjusting the length of the conduit between stream 10b injection port and stream 10c injection port, as well as controlling the flow rates of streams 10a and 10b. The time between the addition of component (vii) and the addition of the alkyl aluminum co-catalyst, component (viii), via stream 10d (stream S4 in claims) is controlled; hereinafter HUT-2 (the second Hold-Up-Time). HUT-2 is the time for the magnesium chloride support and stream 10c to react and equilibrate. The upper limit on HUT-2 may be about 50 seconds, in some cases about 35 seconds and is other cases about 25 seconds. The lower limit on HUT-2 may be about 2 seconds, in some cases about 6 seconds and in other cases about 10 seconds. HUT-2 is controlled by adjusting the length of the conduit between stream 10c injection port and stream 10d injection port, as well as controlling the flow rates of streams 10a, 10b and 10c. The quantity of the alkyl aluminum co-catalyst added is optimized to produce an efficient catalyst; this is accomplished by adjusting the (alkyl aluminum co-catalyst)/(metal compound) molar ratio, or (viii)/(vii) molar ratio. The upper limit on the (alkyl aluminum co-catalyst)/(metal compound) molar ratio may be about 10, in some cases about 7.5 and is other cases about 6.0. The lower limit on the (alkyl aluminum co-catalyst)/(metal compound) molar ratio may be 0, in some cases about 1.0 and in other cases about 2.0. In addition, the time between the addition of the alkyl aluminum co-catalyst (stream S4 in claims) and the injection of the in-line Ziegler-Natta catalyst formulation into reactor 12a is controlled; hereinafter HUT-3 (the third Hold-Up-Time). HUT-3 is the time for stream 10d to intermix and equilibrate to form the first in-line Ziegler Natta catalyst formulation. The upper limit on HUT-3 may be about 15 seconds, in some cases about 10 seconds and is other cases about 8 seconds. The lower limit on HUT-3 may be about 0.5 seconds, in some cases about 1 seconds and in other cases about 2 seconds. HUT-3 is controlled by adjusting the length of the conduit between stream 10d injection port and the catalyst injection port in reactor 12a, and by controlling the flow rates of streams 10a through 10d. As shown in FIG. 2, optionally, 100% of stream 10d, the alkyl aluminum co-catalyst, may be injected directly into reactor 12a via stream 10h. Optionally, a portion of stream 10d may be injected directly into reactor 12a via stream 10h and the remaining portion of stream 10d injected into reactor 12a via stream 10f.

As previously indicated, an equivalent term for reactor 12a is "R2". The quantity of the first in-line heterogeneous catalyst formulation added to R2 is expressed as the parts-per-million (ppm) of metal compound (component (vii)) in the reactor solution, hereinafter "R2 (vii) (ppm)". The upper limit on R2 (vii) (ppm) may be about 10 ppm, in some cases about 8 ppm and in other cases about 6 ppm. The lower limit on R2 (vii) (ppm) in some cases may be about 0.5 ppm, in other cases about 1 ppm and in still other cases about 2 ppm. The (aluminum alkyl)/(metal compound) molar ratio in reactor 12a, or the (ix)/(vii) molar ratio, is also controlled. The upper limit on the (aluminum alkyl)/(metal compound) molar ratio in the reactor may be about 2, in some cases about 1.5 and is other cases about 1.0. The lower limit on the (aluminum alkyl)/(metal compound) molar ratio may be about 0.05, in some cases about 0.075 and in other cases about 0.1.

Any combination of the streams employed to prepare and deliver the first in-line heterogeneous catalyst formulation to R2 may be heated or cooled, i.e. streams 10a through 10h (including stream 10g (optional R3 delivery) which is discussed below); in some cases the upper temperature limit of streams 10a through 10g may be about 90° C., in other cases about 80° C. and in still other cases about 70° C. and; in some cases the lower temperature limit may be about 20° C.; in other cases about 35° C. and in still other cases about 50° C.

Injection of the first heterogeneous catalyst formulation into reactor 12a produces a second ethylene interpolymer and a second exit stream 12c.

If reactors 11a and 12a are operated in a series mode, the second exit stream 12c contains the second ethylene interpolymer and the first ethylene interpolymer dissolved in process solvent; as well as unreacted ethylene, unreacted α-olefins (if present), unreacted hydrogen (if present), active catalysts, deactivated catalysts, catalyst components and other impurities (if present). Optionally the second exit stream 12c is deactivated by adding a catalyst deactivator A from catalyst deactivator tank 18A forming a deactivated solution A, stream 12e; in this case, FIG. 2 defaults to a dual reactor solution process. If the second exit stream 12c is not deactivated the second exit stream enters tubular reactor 17. Catalyst deactivator A is discussed below.

If reactors 11a and 12a are operated in parallel mode, the second exit stream 12c contains the second ethylene interpolymer dissolved in process solvent. The second exit stream 12c is combined with stream 11g forming a third exit stream 12d, the latter contains the second ethylene interpolymer and the first ethylene interpolymer dissolved in process solvent; as well as unreacted ethylene, unreacted α-olefins (if present), unreacted hydrogen (if present), active catalyst, deactivated catalyst, catalyst components and other impurities (if present). Optionally the third exit stream 12d is deactivated by adding catalyst deactivator A from catalyst deactivator tank 18A forming deactivated solution A, stream 12e; in this case, FIG. 2 defaults to a dual reactor solution process. If the third exit stream 12d is not deactivated the third exit stream 12d enters tubular reactor 17.

The term "tubular reactor" is meant to convey its conventional meaning, namely a simple tube; wherein the length/diameter (L/D) ratio is at least 10/1. Optionally, one or more of the following reactor feed streams may be injected into tubular reactor 17; process solvent 13, ethylene 14 and α-olefin 15. As shown in FIG. 2, streams 13, 14 and 15 may be combined forming reactor feed stream RF3 and the latter is injected into reactor 17. It is not particularly important that stream RF3 be formed; i.e. reactor feed streams can be combined in all possible combinations. Optionally hydrogen may be injected into reactor 17 through stream 16. Optionally, the first in-line Ziegler-Natta catalyst formulation may be injected into reactor 17 via catalyst stream 10g; i.e. a portion of this catalyst formulation enters reactor 12a through stream 10f and the remaining portion enters reactor 17 through stream 10g.

FIG. 2 shows an additional embodiment where reactor 17 is supplied with a second heterogeneous catalyst formulation produced in a second heterogeneous catalyst assembly. The second heterogeneous catalyst assembly refers to the combination of conduits and flow controllers that include streams 34a-34e and 34h. The chemical composition of the first and second heterogeneous catalyst formulations may be the same, or different. In the case of a Ziegler-Natta catalyst, the second heterogeneous catalyst assembly produces a second in-line Ziegler-Natta catalyst formulation. For example, the catalyst components ((v) through (ix)), mole ratios and hold-up-times may differ in the first and second heterogeneous catalyst assemblies. Relative to the first heterogeneous catalyst assembly, the second heterogeneous catalyst assembly is operated in a similar manner, i.e. the second heterogeneous catalyst assembly generates a high activity catalyst by optimizing hold-up-times and the following molar ratios: (aluminum alkyl)/(magnesium compound), (chloride compound)/(magnesium compound), (alkyl aluminum co-catalyst/(metal compound, and (aluminum alkyl)/(metal compound). To be clear: stream 34a contains a binary blend of magnesium compound (component (v)) and aluminum alkyl (component (ix)) in process solvent; stream 34b contains a chloride compound (component (vi)) in process solvent; stream 34c contains a metal compound (component (vii)) in process solvent, and; stream 34d contains an alkyl aluminum co-catalyst (component (viii)) in process solvent. Once prepared, the second in-line Ziegler-Natta catalyst is injected into reactor 17 through stream 34e; optionally, additional alkyl aluminum co-catalyst is injected into reactor 17 through stream 34h. As shown in FIG. 2, optionally, 100% of stream 34d, the alkyl aluminum co-catalyst, may be injected directly into reactor 17 via stream 34h. Optionally, a portion of stream 34d may be injected directly into reactor 17 via stream 34h and the remaining portion of stream 34d injected into reactor 17 via stream 34e. In FIG. 2, the first or the second heterogeneous catalyst assembly supplies 100% of the catalyst to reactor 17. Any combination of the streams that comprise the second heterogeneous catalyst assembly may be heated or cooled, i.e. streams 34a-34e and 34h; in some cases the upper temperature limit of streams 34a-34e and 34h may be about 90° C., in other cases about 80° C. and in still other cases about 70° C. and; in some cases the lower temperature limit may be about 20° C.; in other cases about 35° C. and in still other cases about 50° C. Although not shown in FIG. 2 an additional embodiment includes the injection of the first homogeneous catalyst formulation into tubular reactor 17. One option to accomplish this embodiment would be to split stream 5e, i.e. a portion of stream 5e is injected into reactor 11a and the remaining portion is injected into reactor 17 (not shown in FIG. 2). Another option (not shown in FIG. 2) would be to construct a second homogeneous catalyst assembly, i.e. a replicate of conduits and flow controllers 5a through 5e that injects an essentially equivalent first homogeneous catalyst formulation (e.g. containing component A) directly into reactor 17.

An additional embodiment (not shown in FIG. 2) includes the use of the second homogeneous catalyst assembly to inject a fifth homogenous catalyst formulation into tubular reactor 17. The fifth homogeneous catalyst formulation may be the first homogeneous catalyst formulation, the third homogeneous catalyst formulation or a fourth homogeneous catalyst formulation.

In reactor 17 a third ethylene interpolymer may, or may not, form. A third ethylene interpolymer will not form if catalyst deactivator A is added upstream of reactor 17 via catalyst deactivator tank 18A. A third ethylene interpolymer will be formed if catalyst deactivator B is added downstream of reactor 17 via catalyst deactivator tank 18B.

The optional third ethylene interpolymer produced in reactor 17 may be formed using a variety of operational modes; with the proviso that catalyst deactivator A is not added upstream of reactor 17. Non-limiting examples of operational modes include: (a) residual ethylene, residual optional α-olefin and residual active catalyst entering reactor 17 react to form the optional third ethylene interpolymer, or; (b) fresh process solvent 13, fresh ethylene 14 and optionally fresh α-olefin 15 are added to reactor 17 and the residual active catalyst entering reactor 17 forms the optional third ethylene interpolymer, or; (c) the in-line Ziegler-Natta catalyst formulation is added to reactor 17 via stream 10g or the second in-line Ziegler-Natta catalyst formulation is added to reactor 17 via stream 34e to polymerize residual ethylene and residual optional α-olefin to form the optional third ethylene interpolymer (optionally, 100% of the alkyl aluminum co-catalyst may be added to reactor 17 via stream 34h, or a portion of the alkyl aluminum co-catalyst may be added to reactor 17 via stream 10g or 34h and the remaining portion added via stream 34h), and/or; (d) fresh process solvent 13, ethylene 14, optional α-olefin 15 and a fifth homogeneous catalyst formulation (not shown in FIG. 2) are added to reactor 17 to form the optional third ethylene interpolymer. Optionally fresh hydrogen 16 may be added to reduce the molecular weight of the optional third optional ethylene interpolymer.

In series mode, Reactor 17 produces a third exit stream 17b containing the first ethylene interpolymer, the second ethylene interpolymer and optionally a third ethylene interpolymer. As shown in FIG. 2, catalyst deactivator B may be added to the third exit stream 17b via catalyst deactivator tank 18B producing a deactivated solution B, stream 19; with the proviso that catalyst deactivator B is not added if catalyst deactivator A was added upstream of reactor 17. Deactivated solution B may also contain unreacted ethylene, unreacted optional α-olefin, unreacted optional hydrogen and impurities if present. As indicated above, if catalyst deactivator A was added, deactivated solution A (stream 12e) exits tubular reactor 17 as shown in FIG. 2.

In parallel mode operation, reactor 17 produces a fourth exit stream 17b containing the first ethylene interpolymer, the second ethylene interpolymer and optionally a third ethylene interpolymer. As indicated above, in parallel mode, stream 12d is the third exit stream. As shown in FIG. 2, in parallel mode, catalyst deactivator B is added to the fourth exit stream 17b via catalyst deactivator tank 18B producing a deactivated solution B, stream 19; with the proviso that catalyst deactivator B is not added if catalyst deactivator A was added upstream of reactor 17.

In FIG. 2, deactivated solution A (stream 12e) or B (stream 19) passes through pressure let down device 20, heat exchanger 21 and a passivator is added via tank 22 forming a passivated solution 23; the passivator is described below. The passivated solution passes through pressure let down device 24 and enters a first vapor/liquid separator 25. Hereinafter, "V/L" is equivalent to vapor/liquid. Two streams are formed in the first V/L separator: a first bottom stream 27 comprising a solution that is rich in ethylene interpolymers and also contains residual ethylene, residual optional α-olefins and catalyst residues, and; a first gaseous overhead stream 26 comprising ethylene, process solvent, optional α-olefins, optional hydrogen, oligomers and light-end impurities if present.

The first bottom stream enters a second V/L separator 28. In the second V/L separator two streams are formed: a second bottom stream 30 comprising a solution that is richer in ethylene interpolymer and leaner in process solvent relative to the first bottom stream 27, and; a second gaseous overhead stream 29 comprising process solvent, optional α-olefins, ethylene, oligomers and light-end impurities if present.

The second bottom stream 30 flows into a third V/L separator 31. In the third V/L separator two streams are formed: a product stream 33 comprising an ethylene interpolymer product, deactivated catalyst residues and less than 5 weight % of residual process solvent, and; a third gaseous overhead stream 32 comprised essentially of process solvent, optional α-olefins and light-end impurities if present. Product stream 33 proceeds to polymer recovery operations. Non-limiting examples of polymer recovery operations include one or more gear pump, single screw extruder or twin screw extruder that forces the molten ethylene interpolymer product through a pelletizer. A devolatilizing extruder may be used to remove small amounts of residual process solvent and optional α-olefin, if present. Once pelletized the solidified ethylene interpolymer product is typically dried and transported to a product silo.

The first, second and third gaseous overhead streams shown in FIG. 2 (streams 26, 29 and 32, respectively) are sent to a distillation column where solvent, ethylene and optional α-olefin are separated for recycling, or; the first, second and third gaseous overhead streams are recycled to the reactors, or; a portion of the first, second and third gaseous overhead streams are recycled to the reactors and the remaining portion is sent to a distillation column.

Solution Polymerization Process: Batch Heterogeneous Catalyst Formulation

Additional embodiments of the improved continuous solution polymerization process are shown in FIG. 3. Again, FIG. 3 is not to be construed as limiting, it being understood, that embodiments are not limited to the precise arrangement of, or the number of, vessels shown.

In FIG. 3, a first batch heterogeneous catalyst assembly (vessels and streams 60a through 60h) and an optional second batch heterogeneous catalyst assembly (vessels and streams 90a through 90f) are shown. For the sake of clarity and avoid any confusion, many of the vessels and streams shown in FIG. 3 are equivalent to the respective vessel and stream shown in FIG. 2; equivalence is indicated through the use of a consistent vessel or stream label, i.e. number. For the avoidance of doubt, referring to FIG. 3, process solvent is injected into CSTR reactor 11a, CSTR reactor 12a and tubular reactor 17 via streams 1, 6 and 13. Ethylene is injected into reactors 11a, 12a and 17 via streams 2, 7 and 14. Optional α-olefin is injected into reactors 11a, 12a and 17 via streams 3, 8 and 15. Optional hydrogen is injected into reactors 11a, 12a and 17 via streams 4, 9 and 16. A first homogeneous catalyst formulation is injected into reactor 11a, producing the first ethylene interpolymer. Homogeneous catalyst component streams (5a through 5e) were described above. A batch Ziegler-Natta catalyst formulation or a batch Ziegler-Natta procatalyst is injected into reactor 12a via stream 60e and the second ethylene interpolymer is formed. Reactors 11a and 12a shown in FIG. 3 may be operated in series or parallel modes, as described in FIG. 2 above.

Processes to prepare batch heterogeneous procatalysts and batch Ziegler-Natta procatalysts are well known to those skilled in the art. A non-limiting formulation useful in the disclosed polymerization process may be prepared as follows. A batch Ziegler-Natta procatalyst may be prepared by sequentially added the following components to a stirred mixing vessel: (a) a solution of a magnesium compound (an equivalent term for the magnesium compound is "component (v)"); (b) a solution of a chloride compound (an equivalent term for the chloride compound is "component (vi)"; (c) optionally a solution of an aluminum alkyl halide, and; (d) a solution of a metal compound (an equivalent term for the metal compound is "component (vii)").

Suitable, non-limiting examples of aluminum alkyl halides are defined by the formula $(R^6)_v AlX_{3-v}$; wherein the $R^6$ groups may be the same or different hydrocarbyl group having from 1 to 10 carbon atoms, X represents chloride or bromide, and; v is 1 or 2. Suitable, non-limiting examples of the magnesium compound, the chloride compound and the metal compound were described earlier in this disclosure. Suitable solvents within which to prepare the procatalyst include linear or branched $C_5$ to $C_{12}$ alkanes or mixtures thereof. Individual mixing times and mixing temperatures may be used in each of steps (a) through (d). The upper limit on mixing temperatures for steps (a) through (d) in some case may be 160° C., in other cases 130° C. and in still other cases 100° C. The lower limit on mixing temperatures for steps (a) through (d) in some cases may be 10° C., in other cases 20° C. and in still other cases 30° C. The upper limit on mixing time for steps (a) through (d) in some case may be 6 hours, in other cases 3 hours and in still other cases 1 hour. The lower limit on mixing times for steps (a) through (d) in some cases may be 1 minute, in other cases 10 minutes and in still other cases 30 minutes.

Batch Ziegler-Natta procatalyst can have various catalyst component mole ratios. The upper limit on the (chloride compound)/(magnesium compound) molar ratio in some cases may be about 3, in other cases about 2.7 and is still other cases about 2.5; the lower limit in some cases may be about 2.0, in other cases about 2.1 and in still other cases about 2.2. The upper limit on the (magnesium compound)/(metal compound) molar ratio in some cases may be about 10, in other cases about 9 and in still other cases about 8; the lower limit in some cases may be about 5, in other cases about 6 and in still other cases about 7. The upper limit on the (aluminum alkyl halide)/(magnesium compound) molar ratio in some cases may be about 0.5, in other cases about 0.4 and in still other cases about 0.3; the lower limit in some cases may be 0, in other cases about 0.1 and in still other cases about 0.2. An active batch Ziegler-Natta catalyst formulation is formed when the procatalyst is combined with an alkyl aluminum co-catalyst. Suitable co-catalysts were described earlier in this disclosure. The procatalyst may be activated external to the reactor or in the reactor; in the latter case, the procatalyst and an appropriate amount of alkyl aluminum co-catalyst are independently injected R2 and optionally R3.

Once prepared the batch Ziegler-Natta procatalyst is pumped to procatalyst storage tank 60a shown in FIG. 3. Tank 60a may, or may not, be agitated. Storage tank 60c contains an alkyl aluminum co-catalyst; non-limiting examples of suitable alkyl aluminum co-catalysts were described earlier in this disclosure. A batch Ziegler Natta catalyst formulation stream 60e, that is efficient in converting olefins to polyolefins, is formed by combining batch Ziegler Natta procatalyst stream 60b with alkyl aluminum co-catalyst stream 60d. Stream 60e is injected into reactor 12a where the second ethylene interpolymer is formed. Operationally, the following options may be employed: (a) 100% of the alkyl aluminum co-catalyst may be injected into reactor 12a through stream 60g, i.e. the batch Ziegler-Natta procatalyst is injected into reactor 12a through stream 60e, or; (b) a portion of the alkyl aluminum co-catalyst is injected into reactor 12a via stream 60g and the remaining portion passes through stream 60d where it combines with stream 60b forming the batch Ziegler-Natta catalyst formulation which is injected into reactor 12a via stream 60e.

Additional optional embodiments, where a batch heterogeneous catalyst formulation is employed, are shown in FIG. 3 where: (a) a batch Ziegler-Natta procatalyst is injected into tubular reactor 17 through stream 60f, or; (b) a batch Ziegler-Natta catalyst formulation is injected into tubular reactor 17 through stream 60f. In the case of option (a), 100% of the alkyl aluminum co-catalyst is injected directly into reactor 17 via stream 60h. An additional embodiment exists where a portion of the alkyl aluminum co-catalyst flows through stream 60f and the remaining portion flows through stream 60h. Any combination of tanks or streams 60a through 60h may be heated or cooled.

FIG. 3 includes additional embodiments where a second batch heterogeneous catalyst assembly, which is defined by vessels and streams 90a through 90f, may be used to optionally inject a second batch Ziegler-Natta catalyst formulation or a second batch Ziegler-Natta procatalyst into reactor 17. Once prepared the second batch Ziegler-Natta procatalyst is pumped to procatalyst storage tank 90a shown in FIG. 3. Tank 90a may, or may not, be agitated. Storage tank 90c contains an alkyl aluminum co-catalyst. A batch Ziegler Natta catalyst formulation stream 90e, that is efficient in converting olefins to polyolefins, is formed by combining the second batch Ziegler Natta procatalyst stream 90b (stream S6 in claims) with alkyl aluminum co-catalyst stream 90d (optionally stream S4 in claims). Stream 90e is optionally injected into reactor 17, wherein an optional third ethylene interpolymer may be formed. FIG. 3 includes additional embodiments where: (a) the batch Ziegler-Natta procatalyst is injected directly into reactor 17 through stream 90e and the procatalyst is activated inside reactor 17 by injecting 100% of the aluminum co-catalyst directly into reactor 17 via stream 90f, or; (b) a portion of the aluminum co-catalyst may flow through stream 90e with the remaining portion flowing through stream 90f. Any combination of tanks or streams 90a through 90f may be heated or cooled.

Although not shown in FIG. 3 an additional embodiment includes the injection of the first homogeneous catalyst formulation into tubular reactor 17. One option to accomplish this embodiment would be to split stream 5e, i.e. a portion of stream 5e is injected into reactor 11a and the remaining portion is injected into reactor 17 (piping not shown in FIG. 3). Another option (not shown in FIG. 3) would be to construct a second homogeneous catalyst assembly that injects an essentially equivalent first homogeneous catalyst formulation (e.g. containing component A) directly into reactor 17.

An additional embodiment (not shown in FIG. 3) includes the use of a second homogeneous catalyst assembly to inject a third or fifth homogenous catalyst formulation into tubular reactor 17. The fifth homogeneous catalyst formulation may be the first homogeneous catalyst formulation, the third homogeneous catalyst formulation or a fourth homogeneous catalyst formulation.

The time between the addition of the alkyl aluminum co-catalyst and the injection of the batch Ziegler-Natta catalyst formulation into reactor 12a is controlled; hereinafter HUT-4 (the fourth Hold-Up-Time). Referring to FIG. 3, HUT-4 is the time for stream 60d (stream S4 in claims) to intermix and equilibrate with stream 60b (batch Ziegler-Natta procatalyst) to form the batch Ziegler Natta catalyst formulation prior to injection into reactor 12a via in stream 60e. Optionally, HUT-4 is the time for stream 60d to intermix and equilibrate with stream 60b to from the batch Ziegler-Natta catalyst formulation prior to injection into the optional third reactor 17 via stream 60f, or; HUT-4 is the time for stream 90d to intermix and equilibrate with stream 90b to form the batch Ziegler-Natta catalyst formulation prior to injection into reactor 17 via stream 90e. The upper limit on HUT-4 may be about 300 seconds, in some cases about 200 seconds and in other cases about 100 seconds. The lower limit on HUT-4 may be about 0.1 seconds, in some cases about 1 seconds and in other cases about 10 seconds.

The quantity of batch Ziegler-Natta procatalyst produced and/or the size of the procatalyst storage tanks 60a or 90a is not particularly important with respect to this disclosure. However, a larger quantity of procatalyst produced allows one to operate the continuous solution polymerization plant for a longer period of time (prior to a refreshing the procatalyst): the upper limit on this time in some cases may be about 3 months, in other cases for about 2 months and in still other cases for about 1 month; the lower limit on this time in some cases may be about 1 day, in other cases about 1 week and in still other cases about 2 weeks.

The quantity of batch Ziegler-Natta procatalyst or batch Ziegler-Natta catalyst formulation added to reactor 12a is expressed as "R2 (vii) (ppm)", i.e. the parts-per-million (ppm) of metal compound (component (vii)) in the reactor solution. The upper limit on R2 (vii) (ppm) may be about 10 ppm, in some cases about 8 ppm and in other cases about 6 ppm. The lower limit on R2 (vii) (ppm) may be about 0.5 ppm, in some cases about 1 ppm and in other cases about 2 ppm. The quantity of the alkyl aluminum co-catalyst added to reactor 12a is optimized to produce an efficient catalyst; this is accomplished by adjusting the (alkyl aluminum co-catalyst)/(metal compound) molar ratio. The upper limit on the (alkyl aluminum co-catalyst)/(metal compound) molar ratio may be about 10, in some cases about 8.0 and is other cases about 6.0. The lower limit on the (alkyl aluminum co-catalyst)/(metal compound) molar ratio may be 0.5, in some cases about 0.75 and in other cases about 1.

Referring to FIG. 3, where the heterogeneous catalyst formulation is a batch Ziegler-Natta catalyst formulation, a third ethylene interpolymer may, or may not, form. A third ethylene interpolymer will not form if catalyst deactivator A is added upstream of reactor 17 via catalyst deactivator tank 18A. A third ethylene interpolymer will be formed if catalyst deactivator B is added downstream of reactor 17 via catalyst deactivator tank 18B.

The optional third ethylene interpolymer produced in reactor 17 may be formed using a variety of operational modes; with the proviso that catalyst deactivator A is not added upstream of reactor 17. Non-limiting examples of operational modes include: (*a*) residual ethylene, residual optional α-olefin and residual active catalyst entering reactor 17 react to form the optional third ethylene interpolymer, or; (b) fresh process solvent 13, fresh ethylene 14 and optionally fresh α-olefin 15 are added to reactor 17 and the residual active catalyst entering reactor 17 forms the optional third ethylene interpolymer, or; (c) the first batch Ziegler-Natta catalyst (or procatalyst) formulation is added to reactor 17 via stream 10g or the second batch Ziegler-Natta catalyst (or procatalyst) formulation is added to reactor 17 via stream 34e to polymerize residual ethylene and residual optional α-olefin to form the optional third ethylene interpolymer, and/or; (d) fresh process solvent 13, ethylene 14, optional α-olefin 15 and a fifth homogeneous catalyst formulation (not shown in FIG. 3) are added to reactor 17 to form the optional third ethylene interpolymer; where the fifth homogeneous catalyst formulation may be the first homogeneous catalyst formulation, the third homogeneous catalyst or the fourth homogeneous catalyst formulation. In this disclosure, the fourth homogeneous catalyst formulation contains a bulky metal-ligand complex that is not a member of the chemical genera defined by Formula (I) or Formula (II). Optionally fresh hydrogen 16 may be added to reduce the molecular weight of the optional third optional ethylene interpolymer.

As shown in FIG. 3, the first batch Ziegler-Natta catalyst formulation may be deactivated upstream of reactor 17 by adding catalyst deactivator A via deactivator tank 18A to form a deactivated solution A (stream 12e), or; the first batch Ziegler-Natta catalyst formulation and optionally the second batch Ziegler-Natta catalyst formulation may be deactivated downstream of reactor 17 by adding catalyst deactivator B via deactivator tank 18B to form a deactivated solution B (stream 19), or; the first batch Ziegler-Natta catalyst formulation and optionally the fifth homogeneous catalyst formulation may be deactivated downstream of reactor 17 by adding catalyst deactivator B to form deactivated solution B.

Deactivated solution A or B then pass through pressure let down device 20, heat exchange 21 and a passivator may be added via tank 22 forming passivated solution 23. The remaining vessels (24, 25, 28 and 31) and streams (26, 27, 29, 39, 32 and 33) and process conditions have been described previously. The ethylene interpolymer product stream 33 proceeds to polymer recovery. The first, second and third gaseous overhead streams shown in FIG. 3 (streams 26, 29 and 32, respectively) are sent to a distillation column where solvent, ethylene and optional α-olefin are separated for later use, or; the first, second and third gaseous overhead streams are recycled to the reactors, or; a portion of the first, second and third gaseous overhead streams are recycled to the reactors and the remaining portion is sent to a distillation column.

COMPARATIVES

In this disclosure Comparative ethylene interpolymer samples were produced by replacing the first homogeneous catalyst formulation (used in the first reactor (R1)) with a third homogeneous catalyst formulation. One embodiment of the first homogeneous catalyst formulation was a bridged metallocene catalyst formulation containing component A (represented by Formula (I)) and one embodiment of the third homogeneous catalyst formulation was an unbridged single site catalyst formulation containing component C (represented by Formula (II)), as fully described above.

To be more clear, referring to FIGS. 2 and 3, the third homogeneous catalyst formulation or the unbridged single site catalyst formulation was prepared by combining: stream 5a, containing component P dissolved in a catalyst component solvent; stream 5b, containing component M dissolved in a catalyst component solvent; stream 5c, containing component C dissolved in a catalyst component solvent, and; stream 5d, containing component B dissolved in a catalyst component solvent. The third homogeneous catalyst formulation was then injected into reactor 11a via process stream 5e producing a comparative first ethylene interpolymer in reactor 11a. The "R1 catalyst inlet temperature" was controlled. In the case of the unbridged singe site catalyst formulation the upper temperature limit on the R1 catalyst inlet temperature may be about 70° C., in other cases about 60° C. and in still other cases about 50° C., and; in some cases the lower temperature limit on the R1 catalyst inlet temperature may be about 0° C., in other cases about 10° C. and in still other cases about 20° C. The same catalyst component solvents were used to prepare both the first and third homogeneous catalyst formulations.

For all Comparative ethylene interpolymer products disclosed, the in-line Ziegler-Natta catalyst formulation (described above) was injected into reactor 12a (R2), wherein the second ethylene interpolymer was formed. Comparative ethylene interpolymer products were an in-situ solution blend of: 1) the comparative first ethylene interpolymer (produced with the third homogeneous catalyst formulation); 2) the second ethylene interpolymer, and; 3) optionally the third ethylene interpolymer.

Optimization of Homogeneous Catalyst Formulations

Referring to the bridged metallocene catalyst formulation, a highly active formulation was produced by optimizing the proportion of each of the four catalyst components: component A, component M, component B and component P. The term "highly active" means the catalyst formulation is very efficient in converting olefins to polyolefins. In practice the optimization objective is to maximize the following ratio: (pounds of ethylene interpolymer product produced)/ (pounds of catalyst consumed). The quantity of the bulky ligand-metal complex, component A, added to R1 was expressed as the parts per million (ppm) of component A in the total mass of the solution in R1. The upper limit on the ppm of component A may be about 5, in some cases about 3 and is other cases about 2. The lower limit on the ppm of component A may be about 0.02, in some cases about 0.05 and in other cases about 0.1.

The proportion of catalyst component B, the ionic activator, added to R1 was optimized by controlling the (ionic activator)/(component A) molar ratio, ([B]/[A]), in the R1 solution. The upper limit on the R1 ([B]/[A]) may be about 10, in some cases about 5 and in other cases about 2. The lower limit on R1 ([B]/[A]) may be about 0.3, in some cases about 0.5 and in other cases about 1.0. The proportion of catalyst component M was optimized by controlling the (alumoxane)/(component A) molar ratio, ([M]/[A]), in the R1 solution. The alumoxane co-catalyst was generally added in a molar excess relative to component A. The upper limit on R1 ([M]/[A]), may be about 300, in some cases about 200 and is other cases about 100. The lower limit on R1 ([M]/[A]), may be about 1, in some cases about 10 and in other cases about 30. The addition of catalyst component P (the hindered phenol) to R1 is optional. If added, the proportion of component P was optimized by controlling the (hindered phenol)/(alumoxane), ([P]/[M]), molar ratio in R1. The upper limit on R1 ([P]/[M]) may be about 1, in some cases about 0.75 and in other cases about 0.5. The lower limit on R1 ([P]/[M]) may be 0.0, in some cases about 0.1 and in other cases about 0.2.

Similarly, in the case of the third homogeneous catalyst formulation (used to synthesize the Comparative Examples) a highly active formulation was produced by optimizing the proportion of each of the four catalyst components: component C, component M, component B and component P. Catalyst components M, B and P were independently selected for the third homogeneous catalyst formulation, and; catalyst components M, B and P were independently selected for the first homogeneous catalyst formulation. To be more clear, components M, B and P in the third homogeneous catalyst formulation may be the same chemical compound, or a different chemical compound, that was used to formulate the first homogeneous catalyst formulation.

The quantity of the bulky ligand metal complex, component C, added to R1 is expressed as the parts per million (ppm) of component C in the total mass of the solution in R1. The upper limit on the R1 ppm of component C may be about 5, in some cases about 3 and is other cases about 2. The lower limit on the R1 ppm of component C may be about 0.02, in some cases about 0.05 and in other cases about 0.1. The proportion of catalyst component B, the ionic activator, added to R1 was optimized by controlling the (ionic activator)/(bulky ligand-metal complex) molar ratio, ([B]/[C]), in the R1 solution. The upper limit on R1 ([B]/[C]) may be about 10, in some cases about 5 and in other cases about 2. The lower limit on R1 ([B]/[C]) may be about 0.3, in some cases about 0.5 and in other cases about 1.0. The proportion of catalyst component M was optimized by controlling the (alumoxane)/(bulky ligand-metal complex) molar ratio, ([M]/[C]), in the R1 solution. The alumoxane co-catalyst was generally added in a molar excess relative to the bulky ligand-metal complex. The upper limit on the ([M]/[C]) molar ratio may be about 1000, in some cases about 500 and is other cases about 200. The lower limit on the ([M]/[C]) molar ratio may be about 1, in some cases about 10 and in other cases about 30. The addition of catalyst component P to R1 is optional. If added, the proportion of component P was optimized by controlling the (hindered phenol)/(alumoxane) molar ratio, ([P]/[M]), in R1. The upper limit on the R1 ([P]/[M]) molar ratio may be about 1.0, in some cases about 0.75 and in other cases about 0.5. The lower limit on the R1 ([P]/[M]) molar ratio may be 0.0, in some cases about 0.1 and in other cases about 0.2.

Additional Solution Polymerization Process Parameters

In the continuous solution processes embodiments shown in FIGS. 2 and 3 a variety of solvents may be used as the process solvent; non-limiting examples include linear, branched or cyclic $C_5$ to $C_{12}$ alkanes. Non-limiting examples of α-olefins include 1-propene, 1-butene, 1-pentene, 1-hexene and 1-octene. Suitable catalyst component solvents include aliphatic and aromatic hydrocarbons. Non-limiting examples of aliphatic catalyst component solvents include linear, branched or cyclic $C_{5-12}$ aliphatic hydrocarbons, e.g. pentane, methyl pentane, hexane, heptane, octane, cyclohexane, methylcyclohexane, hydrogenated naphtha or combinations thereof. Non-limiting examples of aromatic catalyst component solvents include benzene, toluene (methylbenzene), ethylbenzene, o-xylene (1,2-dimethylbenzene), m-xylene (1,3-dimethylbenzene), p-xylene (1,4-dimethylbenzene), mixtures of xylene isomers, hemellitene (1,2,3-trimethylbenzene), pseudocumene (1,2,4-trimethylbenzene), mesitylene (1,3,5-trimethylbenzene), mixtures of trimethylbenzene isomers, prehenitene (1,2,3,4-tetramethylbenzene), durene (1,2,3,5-tetramethylbenzene), mixtures of tetramethylbenzene isomers, pentamethylbenzene, hexamethylbenzene and combinations thereof.

It is well known to individuals experienced in the art that reactor feed streams (solvent, monomer, α-olefin, hydrogen, catalyst formulation etc.) must be essentially free of catalyst deactivating poisons; non-limiting examples of poisons include trace amounts of oxygenates such as water, fatty acids, alcohols, ketones and aldehydes. Such poisons were removed from reactor feed streams using standard purification practices; non-limiting examples include molecular sieve beds, alumina beds and oxygen removal catalysts for the purification of solvents, ethylene and α-olefins, etc.

Referring to the first and second reactors in FIGS. 2 and 3 any combination of the CSTR reactor feed streams may be heated or cooled: more specifically, streams 1-4 (reactor 11a) and streams 6-9 (reactor 12a). The upper limit on reactor feed stream temperatures may be about 90° C.; in other cases, about 80° C. and in still other cases about 70° C. The lower limit on reactor feed stream temperatures may be about 0° C.; in other cases, about 10° C. and in still other cases about 20° C.

Any combination of the streams feeding the tubular reactor may be heated or cooled; specifically, streams 13-16 in FIGS. 2 and 3. In some cases, tubular reactor feed streams are tempered, i.e. the tubular reactor feed streams are heated to at least above ambient temperature. The upper temperature limit on the tubular reactor feed streams in some cases are about 200° C., in other cases about 170° C. and in still other cases about 140° C.; the lower temperature limit on the tubular reactor feed streams in some cases are about 60° C., in other cases about 90° C. and in still other cases about 120° C.; with the proviso that the temperature of the tubular reactor feed streams are lower than the temperature of the process stream that enters the tubular reactor.

In the embodiments shown in FIGS. 2 and 3 the operating temperatures of the solution polymerization reactors (vessels 11a (R1) and 12a (R2)) can vary over a wide range. For example, the upper limit on reactor temperatures in some cases may be about 300° C., in other cases about 280° C. and in still other cases about 260° C.; and the lower limit in some cases may be about 80° C., in other cases about 100° C. and in still other cases about 125° C. The second reactor, reactor 12a (R2), is operated at a higher temperature than the first reactor 11a (R1). The maximum temperature difference between these two reactors ($T^{R2}-T^{R1}$) in some cases is about 120° C., in other cases about 100° C. and in still other cases about 80° C.; the minimum ($T^{R2}-T^{R1}$) in some cases is about 1° C., in other cases about 5° C. and in still other cases about 10° C. The optional tubular reactor, reactor 17 (R3), may be operated in some cases about 100° C. higher than R2; in other cases about 60° C. higher than R2, in still other cases about 10° C. higher than R2 and in alternative cases 0° C. higher, i.e. the same temperature as R2. The temperature within optional R3 may increase along its length. The maximum temperature difference between the inlet and outlet of R3 in some cases is about 100° C., in other cases about 60° C. and in still other cases about 40° C. The minimum temperature difference between the inlet and outlet of R3 is in some cases may be 0° C., in other cases about 3° C. and in still other cases about 10° C. In some cases, R3 is operated an adiabatic fashion and in other cases R3 is heated.

The pressure in the polymerization reactors should be high enough to maintain the polymerization solution as a single phase solution and to provide the upstream pressure to force the polymer solution from the reactors through a heat exchanger and on to polymer recovery operations. Referring to the embodiments shown in FIGS. 2 and 3, the operating pressure of the solution polymerization reactors can vary over a wide range. For example, the upper limit on reactor pressure in some cases may be about 45 MPag, in other cases about 30 MPag and in still other cases about 20 MPag; and the lower limit in some cases may be about 3 MPag, in other some cases about 5 MPag and in still other cases about 7 MPag.

Referring to the embodiments shown in FIGS. 2 and 3, prior to entering the first V/L separator, the passivated solution (stream 23) may have a maximum temperature in some cases of about 300° C., in other cases about 290° C. and in still other cases about 280° C.; the minimum temperature may be in some cases about 150° C., in other cases about 200° C. and in still other cases about 220° C. Immediately prior to entering the first V/L separator the passivated solution in some cases may have a maximum pressure of about 40 MPag, in other cases about 25 MPag and in still cases about 15 MPag; the minimum pressure in some cases may be about 1.5 MPag, in other cases about 5 MPag and in still other cases about 6 MPag.

The first V/L separator (vessel 25 in FIGS. 2 and 3) may be operated over a relatively broad range of temperatures and pressures. For example, the maximum operating temperature of the first V/L separator in some cases may be about 300° C., in other cases about 285° C. and in still other cases about 270° C.; the minimum operating temperature in some cases may be about 100° C., in other cases about 140° C. and in still other cases 170° C. The maximum operating pressure of the first V/L separator in some cases may be about 20 MPag, in other cases about 10 MPag and in still other cases about 5 MPag; the minimum operating pressure in some cases may be about 1 MPag, in other cases about 2 MPag and in still other cases about 3 MPag.

The second V/L separator (vessel 28 in FIGS. 2 and 3) may be operated over a relatively broad range of temperatures and pressures. For example, the maximum operating temperature of the second V/L separator in some cases may be about 300° C., in other cases about 250° C. and in still other cases about 200° C.; the minimum operating temperature in some cases may be about 100° C., in other cases about 125° C. and in still other cases about 150° C. The maximum operating pressure of the second V/L separator in some cases may be about 1000 kPag, in other cases about 900 kPag and in still other cases about 800 kPag; the minimum operating pressure in some cases may be about 10 kPag, in other cases about 20 kPag and in still other cases about 30 kPag.

The third V/L separator (vessel 31 in FIGS. 2 and 3) may be operated over a relatively broad range of temperatures and pressures. For example, the maximum operating temperature of the third V/L separator in some cases may be about 300° C., in other cases about 250° C., and in still other cases about 200° C.; the minimum operating temperature in some cases may be about 100° C., in other cases about 125° C. and in still other cases about 150° C. The maximum operating pressure of the third V/L separator in some cases may be about 500 kPag, in other cases about 150 kPag and in still other cases about 100 kPag; the minimum operating pressure in some cases may be about 1 kPag, in other cases about 10 kPag and in still other cases 25 about kPag.

Embodiments of the continuous solution polymerization process shown in FIGS. 2 and 3 show three V/L separators. However, continuous solution polymerization embodiments may include configurations comprising at least one V/L separator.

The ethylene interpolymer product produced in the continuous solution polymerization process may be recovered using conventional devolatilization systems that are well known to persons skilled in the art, non-limiting examples include flash devolatilization systems and devolatilizing extruders.

Any reactor shape or design may be used for reactor 11a (R1) and reactor 12a (R2) in FIGS. 2 and 3; non-limiting examples include unstirred or stirred spherical, cylindrical or tank-like vessels, as well as tubular reactors or recirculating loop reactors. At commercial scale the maximum volume of R1 in some cases may be about 20,000 gallons (about 75,710 L), in other cases about 10,000 gallons (about 37,850 L) and in still other cases about 5,000 gallons (about 18,930 L). At commercial scale the minimum volume of R1 in some cases may be about 100 gallons (about 379 L), in other cases about 500 gallons (about 1,893 L) and in still other cases about 1,000 gallons (about 3,785 L). At pilot plant scales reactor volumes are typically much smaller, for example the volume of R1 at pilot scale could be less than about 2 gallons (less than about 7.6 L). In this disclosure the volume of reactor R2 was expressed as a percent of the volume of reactor R1. The upper limit on the volume of R2 in some cases may be about 600% of R1, in other cases about 400% of R1 and in still other cases about 200% of R1. For clarity, if the volume of R1 is 5,000 gallons and R2 is 200% the volume of R1, then R2 has a volume of 10,000 gallons. The lower limit on the volume of R2 in some cases may be about 50% of R1, in other cases about 100% of R1 and in still other cases about 150% of R1. In the case of continuously stirred tank reactors the stirring rate can vary over a wide range; in some cases from about 10 rpm to about 2000 rpm, in other cases from about 100 to about 1500 rpm and in still other cases from about 200 to about 1300 rpm. In this disclosure the volume of R3, the tubular reactor, was expressed as a percent of the volume of reactor R2. The upper limit on the volume of R3 in some cases may be about 500% of R2, in other cases about 300% of R2 and instill other cases about 100% of R2. The lower limit on the volume of R3 in some cases may be about 3% of R2, in other cases about 10% of R2 and in still other cases about 50% of R2.

The "average reactor residence time", a commonly used parameter in the chemical engineering art, is defined by the first moment of the reactor residence time distribution; the reactor residence time distribution is a probability distribution function that describes the amount of time that a fluid element spends inside the reactor. The average reactor residence time can vary widely depending on process flow rates and reactor mixing, design and capacity. The upper limit on the average reactor residence time of the solution in R1 in some cases may be about 600 seconds, in other cases about 360 seconds and in still other cases about 180 seconds. The lower limit on the average reactor residence time of the solution in R1 in some cases may be about 10 seconds, in other cases about 20 seconds and in still other cases about 40 seconds. The upper limit on the average reactor residence time of the solution in R2 in some cases may be about 720 seconds, in other cases about 480 seconds and in still other cases about 240 seconds. The lower limit on the average reactor residence time of the solution in R2 in some cases may be about 10 seconds, in other cases about 30 seconds and in still other cases about 60 seconds. The upper limit on the average reactor residence time of the solution in R3 in some cases may be about 600 seconds, in other cases about 360 seconds and in still other cases about 180 seconds. The lower limit on the average reactor residence time of the solution in R3 in some cases may be about 1 second, in other cases about 5 seconds and in still other cases about 10 seconds.

Optionally, additional reactors (e.g. CSTRs, loops or tubes, etc.) could be added to the continuous solution polymerization process embodiments shown in FIGS. 2 and 3. In this disclosure, the number of reactors was not particularly important; with the proviso that the continuous solution polymerization process comprises at least two reactors that employ at least a first homogeneous catalyst formulation and at least one heterogeneous catalyst formulation.

In operating the continuous solution polymerization process embodiments shown in FIGS. 2 and 3 the total amount of ethylene supplied to the process can be portioned or split between the three reactors R1, R2 and R3. This operational variable was referred to as the Ethylene Split (ES), i.e. "$ES^{R1}$", "$ES^{R2}$" and "$ES^{R3}$" refer to the weight percent of ethylene injected in R1, R2 and R3, respectively; with the proviso that $ES^{R1}+ES^{R2}+ES^{R3}=100\%$. This was accomplished by adjusting the ethylene flow rates in the following streams: stream 2 (R1), stream 7 (R2) and stream 14 (R3). The upper limit on $ES^{R1}$ in some cases is about 60%, in other cases about 55% and in still other cases about 50%; the lower limit on $ES^{R1}$ in some cases is about 5%, in other cases about 8% and in still other cases about 10%. The upper limit on $ES^{R2}$ in some cases is about 95%, in other cases about 92% and in still other cases about 90%; the lower limit on $ES^{R2}$ in some cases is about 20%, in other cases about 30% and in still other cases about 40%. The upper limit on $ES^{R3}$ in some cases is about 30%, in other cases about 25% and in still other cases about 20%; the lower limit on $ES^{R3}$ in some cases is 0%, in other cases about 5% and in still other cases about 10%.

In operating the continuous solution polymerization process embodiments shown in FIGS. 2 and 3 the ethylene concentration in each reactor was also controlled. The ethylene concentration in reactor 1, hereinafter $EC^{R1}$, is defined as the weight of ethylene in reactor 1 divided by the total weight of everything added to reactor 1; $EC^{R2}$ and $EC^{R3}$ are defined similarly. Ethylene concentrations in the reactors ($EC^{R1}$ or $EC^{R2}$ or $EC^{R3}$) in some cases may vary from about 7 weight percent (wt. %) to about 25 wt. %, in other cases from about 8 wt. % to about 20 wt. % and in still other cases from about 9 wt. % to about 17 wt. %.

In operating the continuous solution polymerization process embodiments shown in FIGS. 2 and 3 the total amount of ethylene converted in each reactor was monitored. The term "$Q^{R1}$" refers to the percent of the ethylene added to R1 that was converted into an ethylene interpolymer by the catalyst formulation. Similarly $Q^{R2}$ and $Q^{R3}$ represent the percent of the ethylene added to R2 and R3 that was converted into ethylene interpolymer, in the respective reactor. Ethylene conversions can vary significantly depending on a variety of process conditions, e.g. catalyst concentration, catalyst formulation, impurities and poisons. The upper limit on both $Q^{R1}$ and $Q^{R2}$ in some cases is about 99%, in other cases about 95% and in still other cases about 90%; the lower limit on both $Q^{R1}$ and $Q^{R2}$ in some cases is about 65%, in other cases about 70% and in still other cases about 75%. The upper limit on $Q^{R3}$ in some cases is about 99%, in other cases about 95% and in still other cases about 90%; the lower limit on $Q^{R3}$ in some cases is 0%, in other cases about 5% and in still other cases about 10%. The term "$Q^T$" represents the total or overall ethylene conversion across the entire continuous solution polymerization plant; i.e. $Q^T=100\times$[weight of ethylene in the interpolymer product]/ ([weight of ethylene in the interpolymer product]+[weight of unreacted ethylene]). The upper limit on $Q^T$ in some cases is about 99%, in other cases about 95% and in still other cases about 90%; the lower limit on $Q^T$ in some cases is about 75%, in other cases about 80% and in still other cases about 85%.

Optionally, α-olefin may be added to the continuous solution polymerization process. If added, α-olefin may be proportioned or split between R1, R2 and R3. This operational variable was referred to as the Comonomer Split (CS), i.e. "$CS^{R1}$", "$CS^{R2}$" and "$CS^{R3}$" refer to the weight percent of α-olefin comonomer that is injected in R1, R2 and R3, respectively; with the proviso that $CS^{R1}+CS^{R2}+CS^{R3}=100\%$. This is accomplished by adjusting α-olefin flow rates in the following streams: stream 3 (R1), stream 8 (R2) and stream 15 (R3). The upper limit on $CS^{R1}$ in some cases is 100% (i.e. 100% of the α-olefin is injected into R1), in other cases about 95% and in still other cases about 90%. The lower limit on $CS^{R1}$ in some cases is 0% (ethylene homopolymer produced in R1), in other cases about 5% and in still other cases about 10%. The upper limit on $CS^{R2}$ in some cases is about 100% (i.e. 100% of the α-olefin is injected into reactor 2), in other cases about 95% and in still other cases about 90%. The lower limit on $CS^{R2}$ in some cases is 0%, in other cases about 5% and in still other cases about 10%. The upper limit on $CS^{R3}$ in some cases is 100%, in other cases about 95% and in still other cases about 90%. The lower limit on $CS^{R3}$ in some cases is 0%, in other cases about 5% and in still other cases about 10%.

First Ethylene Interpolymer

The first ethylene interpolymer was synthesized using the first homogeneous catalyst formulation. One embodiment of the first homogeneous catalyst formulation was a bridged metallocene catalyst formulation. Referring to the embodiments shown in FIGS. 2 and 3, if the optional α-olefin was not added to reactor 1 (R1), then the ethylene interpolymer produced in R1 was an ethylene homopolymer. If an α-olefin is added, the following weight ratio was one parameter to control the density of the first ethylene interpolymer: $((\alpha\text{-olefin})/(\text{ethylene}))^{R1}$. The upper limit on $((\alpha\text{-olefin})/(\text{ethylene}))^{R1}$ may be about 3; in other cases about 2 and in still other cases about 1. The lower limit on $((\alpha\text{-olefin})/(\text{ethylene}))^{R1}$ may be 0; in other cases about 0.25 and in still other cases about 0.5. Hereinafter, the symbol "6" refers to the density of the first ethylene interpolymer produced in R1. The upper limit on 6 may be about 0.975 g/cm³; in some cases, about 0.965 g/cm³ and; in other cases about 0.955 g/cm³. The lower limit on 6 may be about 0.855 g/cm³, in some cases about 0.865 g/cm³, and, in other cases, about 0.875 g/cm³.

Methods to determine the $CDBI_{50}$ (Composition Distribution Branching Index) of an ethylene interpolymer are well known to those skilled in the art. The $CDBI_{50}$, expressed as a percent, was defined as the percent of the ethylene interpolymer whose comonomer composition is within 50% of the median comonomer composition. It is also well known to those skilled in the art that the $CDBI_{50}$ of ethylene interpolymers produced with homogeneous catalyst formulations are higher relative to the $CDBI_{50}$ of α-olefin containing ethylene interpolymers produced with heterogeneous catalyst formulations. The upper limit on the $CDBI_{50}$ of the first ethylene interpolymer (produced with a homogeneous catalyst formulation) may be about 98%, in other cases about 95% and in still other cases about 90%. The lower limit on the $CDBI_{50}$ of the first ethylene interpolymer may be about 70%, in other cases about 75% and in still other cases about 80%.

As is well known to those skilled in the art the $M_w/M_n$ of ethylene interpolymers produced with homogeneous catalyst formulations are lower relative to ethylene interpolymers produced with heterogeneous catalyst formulations. Thus, in the embodiments disclosed, the first ethylene interpolymer had a lower $M_w/M_n$ relative to the second ethylene interpolymer; where the second ethylene interpolymer was produced with a heterogeneous catalyst formulation. The upper limit on the $M_w/M_n$ of the first ethylene interpolymer may be about 2.8, in other cases about 2.5 and in still other cases about 2.2. The lower limit on the $M_w/M_n$ the first ethylene interpolymer may be about 1.7, in other cases about 1.8 and in still other cases about 1.9.

The first ethylene interpolymer, produced with the bridged metallocene catalyst formulation, contains long chain branching characterized by the LCBF disclosed herein. The upper limit on the LCBF of the first ethylene interpolymer may be about 0.5, in other cases about 0.4 and in still other cases about 0.3 (dimensionless). The lower limit on the LCBF of the first ethylene interpolymer may be about 0.001, in other cases about 0.0015 and in still other cases about 0.002 (dimensionless).

The first ethylene interpolymer contained catalyst residues that reflect the chemical composition of the first homogeneous catalyst formulation. Those skilled in the art will understand that catalyst residues are typically quantified by the parts per million of metal in the first ethylene interpolymer, where metal originates from the metal in catalyst component A (Formula (I)); hereinafter this metal will be referred to "metal A". As recited earlier in this disclosure, non-limiting examples of metal A include Group 4 metals, titanium, zirconium and hafnium. The upper limit on the ppm of metal A in the first ethylene interpolymer may be about 3.0 ppm, in other cases about 2.0 ppm and in still other cases about 1.5 ppm. The lower limit on the ppm of metal A in the first ethylene interpolymer may be about 0.03 ppm, in other cases about 0.09 ppm and in still other cases about 0.15 ppm.

The amount of hydrogen added to R1 can vary over a wide range allowing the continuous solution process to produce first ethylene interpolymers that differ greatly in melt index, hereinafter $I_2^1$ (melt index was measured at 190° C. using a 2.16 kg load following the procedures outlined in ASTM D1238). This was accomplished by adjusting the hydrogen flow rate in stream 4 (as shown in FIGS. 2 and 3). The quantity of hydrogen added to R1 was expressed as the parts-per-million (ppm) of hydrogen in R1 relative to the total mass in reactor R1; hereinafter $H_2^{R1}$ (ppm). In some cases $H_2^{R1}$ (ppm) ranges from about 100 ppm to 0 ppm, in other cases from about 50 ppm to 0 ppm, in alternative cases from about 20 ppm to 0 ppm and in still other cases from about 2 ppm to 0 ppm. The upper limit on 121 may be about 200 dg/min, in some cases about 100 dg/min; in other cases, about 50 dg/min, and, in still other cases, about 1 dg/min. The lower limit on 121 may be about 0.01 dg/min, in some cases about 0.05 dg/min; in other cases, about 0.1 dg/min, and, in still other cases about 0.5 dg/min.

The upper limit on the weight percent (wt. %) of the first ethylene interpolymer in the ethylene interpolymer product may be about 60 wt. %, in other cases about 55 wt. % and in still other cases about 50 wt. %. The lower limit on the wt. % of the first ethylene interpolymer in the ethylene interpolymer product may be about 5 wt. %; in other cases, about 8 wt. % and in still other cases about 10 wt. %.

Second Ethylene Interpolymer

Referring to the embodiments shown in FIG. 2, if optional α-olefin was not added to reactor 12a (R2) either through fresh α-olefin stream 8 or carried over from reactor 11a (R1) in stream 11e (in series mode), then the ethylene interpolymer produced in reactor 12a (R2) was an ethylene homopolymer. If an optional α-olefin is present in R2, the following weight ratio was one parameter to control the density of the second ethylene interpolymer produced in R2: $((\alpha\text{-olefin})/(\text{ethylene}))^{R2}$. The upper limit on $((\alpha\text{-olefin})/(\text{ethylene}))^{R2}$ may be about 3; in other cases about 2 and in still other cases about 1. The lower limit on $((\alpha\text{-olefin})/(\text{ethylene}))^{R2}$ may be 0; in other cases about 0.25 and in still other cases about 0.5. Hereinafter, the symbol "$\sigma^2$" refers to the density of the ethylene interpolymer produced in R2. The upper limit on $\sigma^2$ may be about 0.975 g/cm³; in some cases, about 0.965 g/cm³ and; in other cases about 0.955 g/cm³. Depending on the heterogeneous catalyst formulation used, the lower limit on 62 may be about 0.89 g/cm³, in some cases about 0.90 g/cm³, and, in other cases, about 0.91 g/cm³. The ranges disclosed in this paragraph also apply to the embodiments shown in FIG. 3.

A heterogeneous catalyst formulation was used to produce the second ethylene interpolymer. If the second ethylene interpolymer contains an α-olefin, the $CDBI_{50}$ of the second ethylene interpolymer was lower relative to the $CDBI_{50}$ of the first ethylene interpolymer that was produced with the first homogeneous catalyst formulation. In an embodiment of this disclosure, the upper limit on the $CDBI_{50}$ of the second ethylene interpolymer (that contains an α-olefin) may be about 70%, in other cases about 65% and in still other cases about 60%. In an embodiment of this disclosure, the lower limit on the $CDBI_{50}$ of the second ethylene interpolymer (that contains an α-olefin) may be about 45%, in other cases about 50% and in still other cases about 55%. If an α-olefin is not added to the continuous solution polymerization process the second ethylene interpolymer was an ethylene homopolymer. In the case of a homopolymer, which does not contain α-olefin, one can still measure a $CDBI_{50}$ using TREF. In the case of a homopolymer, the upper limit on the $CDBI_{50}$ of the second ethylene interpolymer may be about 98%, in other cases about 96% and in still other cases about 95%, and; the lower limit on the $CDBI_{50}$ may be about 88%, in other cases about 89% and in still other cases about 90%. It is well known to those skilled in the art that as the α-olefin content in the second ethylene interpolymer approaches zero, there is a smooth transition between the recited $CDBI_{50}$ limits for the second ethylene interpolymers (that contain an α-olefin) and the recited $CDBI_{50}$ limits for the second ethylene interpolymers that are ethylene homopolymers.

The $M_w/M_n$ of second ethylene interpolymer was higher than the $M_w/M_n$ of the first ethylene interpolymer. The upper limit on the $M_w/M_n$ of the second ethylene interpolymer may be about 4.4, in other cases about 4.2 and in still other cases about 4.0. The lower limit on the $M_w/M_n$ of the second ethylene interpolymer may be about 2.2. $M_w/M_n$'s of 2.2 were observed when the melt index of the second ethylene interpolymer is high, or when the melt index of the ethylene interpolymer product is high, e.g. greater than 10 g/10 minutes. In other cases, the lower limit on the $M_w/M_n$ of the second ethylene interpolymer may be about 2.4 and in still other cases about 2.6.

The second ethylene interpolymer, produced with the first heterogeneous catalyst formulation, was characterized by an undetectable level of long chain branching, i.e. LCBF of <0.001 (dimensionless).

The second ethylene interpolymer contains catalyst residues that reflect the chemical composition of the first or second heterogeneous catalyst formulation. The first heterogeneous catalyst formulation contains catalytic 'metal Z1'. The second heterogeneous catalyst formulation contains catalytic 'metal Z2'. The efficiency of the first heterogeneous catalyst formulation can be quantified by measuring the parts per million of metal Z1 or metal Z2 in the second ethylene interpolymer, where metal Z1 originates from the first component (vii) in the first heterogeneous catalyst formulation or metal Z2 originates from the second component (vii) in the second heterogeneous catalyst formulation. Non-limiting examples of metal Z1 and metal Z2 include metals selected from Group 4 through Group 8 of the Periodic Table, or mixtures of metals selected from Group 4 through Group 8. The upper limit on the ppm of metal Z1 or metal Z2 in the second ethylene interpolymer may be about 12 ppm, in other cases about 10 ppm and in still other cases about 8 ppm. The lower limit on the ppm of metal Z1 or metal Z2 in the second ethylene interpolymer may be about 0.5 ppm, in other cases about 1 ppm and in still other cases about 3 ppm.

Referring to the embodiments shown in FIGS. 2 and 3, the amount of hydrogen added to R2 can vary over a wide range which allows the continuous solution process to produce second ethylene interpolymers that differ greatly in melt index, hereinafter $I_2^2$. This is accomplished by adjusting the hydrogen flow rate in stream 9. The quantity of hydrogen added was expressed as the parts-per-million (ppm) of hydrogen in R2 relative to the total mass in reactor R2; hereinafter $H_2^{R2}$ (ppm). In some cases, $H_2^{R2}$ (ppm) ranges from about 50 ppm to 0 ppm, in some cases from about 25 ppm to 0 ppm, in other cases from about 10 to 0 and in still other cases from about 2 ppm to 0 ppm. The upper limit on $I_2^2$ may be about 1000 dg/min; in some cases about 750 dg/min; in other cases about 500 dg/min, and; in still other cases about 200 dg/min. The lower limit on $I_2^2$ may be about 0.3 dg/min, in some cases about 0.4 dg/min, in other cases about 0.5 dg/min, and, in still other cases, about 0.6 dg/min.

The upper limit on the weight percent (wt. %) of the second ethylene interpolymer in the ethylene interpolymer product may be about 95 wt. %, in other cases about 92 wt. % and in still other cases about 90 wt. %. The lower limit on the wt. % of the second ethylene interpolymer in the ethylene interpolymer product may be about 20 wt. %; in other cases, about 30 wt. % and in still other cases about 40 wt. %.

Third Ethylene Interpolymer

Optionally, the disclosed ethylene interpolymer products contain a third ethylene interpolymer. Referring to the embodiments shown in FIG. 2 a third ethylene interpolymer was not produced in reactor 17 (R3) if catalyst deactivator A was added upstream of reactor 17 via catalyst deactivator tank 18A. If catalyst deactivator A was not added and optional α-olefin was not added to reactor 17 either through fresh α-olefin stream 15 or carried over from reactor 12a (R2) in stream 12c (series mode) or stream 12d (parallel mode) then the ethylene interpolymer produced in reactor 17 was an ethylene homopolymer. If catalyst deactivator A was not added and optional α-olefin was present in R3, the following weight ratio was one parameter that determined the density of the third ethylene interpolymer: $((\alpha\text{-olefin})/(\text{ethylene}))^{R3}$. The upper limit on $((\alpha\text{-olefin})/(\text{ethylene}))^{R3}$ may be about 3; in other cases about 2 and in still other cases about 1. The lower limit on $((\alpha\text{-olefin})/(\text{ethylene}))^{R3}$ may be 0; in other cases about 0.25 and in still other cases about 0.5. Hereinafter, the symbol "$\sigma^3$" refers to the density of the ethylene interpolymer produced in R3. The upper limit on $\sigma^3$ may be about 0.975 g/cm$^3$; in some cases, about 0.965 g/cm$^3$ and, in other cases, about 0.955 g/cm$^3$. Depending on the catalyst formulations used in R3, the lower limit on $\sigma^3$ may be about 0.855 g/cm$^3$, in some cases about 0.865 g/cm$^3$ and, in other cases about 0.875 g/cm$^3$. The ranges disclosed in this paragraph also apply to the embodiments shown in FIG. 3.

Optionally, one or more of the following homogeneous or heterogeneous catalyst formulations may be injected into R3: the first homogeneous catalyst formulation, the first heterogeneous catalyst formulation, the second homogeneous catalyst formulation, the third homogeneous catalyst formulation or the fifth homogeneous catalyst formulation. If the first homogeneous catalyst formulation is employed, comprising the bridged metallocene catalyst formulation, the third ethylene interpolymer contains metal A. The upper limit on the ppm of metal A in the third ethylene interpolymer may be about 3.0 ppm, in other cases about 2.0 ppm and in still other cases about 1.5 ppm. The lower limit on the ppm of metal A in the third ethylene interpolymer may be about 0.03 ppm, in other cases about 0.09 ppm and in still other cases about 0.15 ppm. If the first heterogeneous catalyst formulation is employed, the third ethylene interpolymer contains metal Z1. The upper limit on the ppm of metal Z1 in the third ethylene interpolymer may be about 12 ppm, in other cases about 10 ppm and in still other cases about 8 ppm. The lower limit on the ppm of metal Z1 in the third ethylene interpolymer may be about 0.5 ppm, in other cases about 1 ppm and in still other cases about 3 ppm. If the second heterogeneous catalyst formulation is employed, the third ethylene interpolymer contains metal Z2. The upper limit on the ppm of metal Z2 in the third ethylene interpolymer may be about 12 ppm, in other cases about 10 ppm and in still other cases about 8 ppm. The lower limit on the ppm of metal Z2 in the third ethylene interpolymer may be about 0.5 ppm, in other cases about 1 ppm and in still other cases about 3 ppm. If the third homogeneous catalyst formulation is employed, comprising the unbridged single site catalyst formulation, the third ethylene interpolymer contains metal C. The upper limit on the ppm of metal C in the third ethylene interpolymer may be about 3.0 ppm, in other cases about 2.0 ppm and in still other cases about 1.5 ppm. The lower limit on the ppm of metal C in the third ethylene interpolymer may be about 0.03 ppm, in other cases about 0.09 ppm and in still other cases about 0.15 ppm. If the fifth homogeneous catalyst formulation is employed, comprising a bulky ligand-metal complex that is not a member of the genera defined by Formulas (I) or (II) the third ethylene interpolymer contains metal D. The upper limit on the ppm of metal D in the third ethylene interpolymer may be about 3.0 ppm, in other cases about 2.0 ppm and in still other cases about 1.5 ppm. The lower limit on the ppm of metal D in the third ethylene interpolymer may be about 0.03 ppm, in other cases about 0.09 ppm and in still other cases about 0.15 ppm.

The upper limit on the CDBI$_{50}$ of the optional third ethylene interpolymer (containing an α-olefin) may be about 98%, in other cases about 95% and in still other cases about 90%. The lower limit on the CDBI$_{50}$ of the optional third ethylene interpolymer may be about 35%, in other cases about 40% and in still other cases about 45%.

The upper limit on the $M_w/M_n$ of the optional third ethylene interpolymer may be about 5.0, in other cases about 4.8 and in still other cases about 4.5. The lower limit on the $M_w/M_n$ of the optional third ethylene interpolymer may be about 1.7, in other cases about 1.8 and in still other cases about 1.9.

Referring to the embodiments shown in FIGS. 2 and 3, optional hydrogen may be added to the tubular reactor (R3) via stream 16. The amount of hydrogen added to R3 may vary over a wide range. Adjusting the amount of hydrogen in R3, hereinafter $H_2^{R3}$ (ppm), allows the continuous solution process to produce optional third ethylene interpolymers that differ widely in melt index, hereinafter $I_2^3$. The amount of optional hydrogen added to R3 ranges from about 50 ppm to 0 ppm, in some cases from about 25 ppm to 0 ppm, in other cases from about 10 to 0 and in still other cases from about 2 ppm to 0 ppm. The upper limit on $I2^3$ may be about 2000 dg/min; in some cases about 1500 dg/min; in other cases about 1000 dg/min, and; in still other cases about 500 dg/min. The lower limit on $I2^3$ may be about 0.5 dg/min, in some cases about 0.6 dg/min, in other cases about 0.7 dg/min, and; in still other cases about 0.8 dg/min.

The upper limit on the weight percent (wt. %) of the optional third ethylene interpolymer in the ethylene interpolymer product may be about 30 wt. %, in other cases about 25 wt. % and in still other cases about 20 wt. %. The lower limit on the wt. % of the optional third ethylene interpolymer in the ethylene interpolymer product may be 0 wt. %; in other cases, about 5 wt. % and in still other cases about 10 wt. %.

Ethylene Interpolymer Product

The upper limit on the density of the ethylene interpolymer product ($\rho^f$) may be about 0.975 g/cm$^3$; in some cases, about 0.965 g/cm$^3$ and, in other cases about 0.955 g/cm$^3$. The lower limit on the density of the ethylene interpolymer product may be about 0.862 g/cm$^3$, in some cases about 0.872 g/cm$^3$, and, in other cases about 0.882 g/cm$^3$.

The upper limit on the CDBI$_{50}$ of the ethylene interpolymer product may be about 97%, in other cases about 90% and in still other cases about 85%. An ethylene interpolymer product with a CDBI$_{50}$ of 97% may result if an α-olefin is not added to the continuous solution polymerization process; in this case, the ethylene interpolymer product is an ethylene homopolymer. The lower limit on the CDBI$_{50}$ of an ethylene interpolymer product may be about 20%, in other cases about 40% and in still other cases about 60%.

The upper limit on the $M_w/M_n$ of the ethylene interpolymer product may be about 25, in other cases about 15 and in still other cases about 9. The lower limit on the $M_w/M_n$ of the ethylene interpolymer product may be 2.0, in other cases about 2.2 and in still other cases about 2.4.

The catalyst residues in the ethylene interpolymer product reflect the chemical compositions of the first homogeneous catalyst formulation employed in R1; the first heterogeneous catalyst formulation employed in R2, and; optionally one or more catalyst formulations employed in R3. Catalyst residues were quantified by measuring the parts per million of catalytic metal in the ethylene interpolymer products using Neutron Activation Analysis (N.A.A.). As shown in Table 5, the ethylene interpolymer product Example 3 contained 0.541 ppm hafnium and 4.24 ppm titanium. As shown in Table 4A, Example 3 was produced with reactors 1 and 2 operating in parallel mode, a hafnium (Hf) containing bridged metallocene catalyst formulation was injected into reactor 1 and a titanium (Ti) containing first in-line Ziegler-Natta catalyst formulation was injected into reactor 2 (catalysts were not injected into reactor 3). Further, in Example 3, Hf originated from CpF-2 (the diphenylmethylene (cyclopentadienyl) (2,7-di-t-butylfuorenyl) hafnium dimethyl species [(2,7-tBu$_2$Flu)Ph$_2$C(Cp)HfMe$_2$] of component A (Formula (I))) and Ti originated from the TiCl$_4$ species of component (vii). Example 3 had a residual catalyst Hf/Ti ratio of 0.128 (0.541 ppm Hf/4.24 ppm Ti).

As shown in Table 5, Comparative 1 contained 0.0 ppm hafnium and 6.10 ppm titanium, thus a residual catalyst Hf/Ti ratio of 0.0. As shown in Table 4A, Comparative 1 was produced with reactors 1 and 2 operating in series mode, an unbridged single site catalyst formulation (Ti containing) was injected into reactor 1 and a first in-line Ziegler-Natta catalyst formulation (Ti containing) was injected into reactor 2 (catalysts were not injected into reactor 3). In Comparative 1 the Ti sources were: PIC-1 (the cyclopentadienyl tri (tertiary butyl) phosphinimine titanium dichloride species [Cp[(t-Bu)$_3$PN]TiCl$_2$] of component C (Formula (II))) and the TiCl$_4$ species of component (vii).

As shown in Table 5, ethylene interpolymer product Example 4 contained 0.502 ppm Hf and 8.45 ppm Ti and the residual catalyst Hf/Ti ratio was 0.059. As shown in Table 4A, Example 4 was produced with reactors 1 and 2 operating in series mode, a Hf containing (CpF-1) bridged metallocene catalyst formulation was injected into reactor 1 and a Ti containing (TiCl$_4$) first in-line Ziegler-Natta catalyst formulation was injected into reactor 2 (catalysts were not injected into reactor 3).

Comparative 10 contained 0.0 ppm of Hf and 6.8 ppm Ti and the residual catalyst Hf/Ti ratio was 0.0. Comparative 10 was produced using the unbridged single site catalyst formulation in reactor 1 and the first in-line Ziegler-Natta catalyst formulation in reactor 2. Comparative 10 was a commercially available solution process ethylene/1-octene polymer produced by NOVA Chemicals Company (Calgary, Alberta, Canada) coded SURPASS® SPs116-C02.

The upper limit on the ppm of metal A in the ethylene interpolymer product was determined by maximizing the weight fraction (i.e. 0.60) of the first ethylene interpolymer, minimizing the weight fraction (i.e. 0.20) of the second ethylene interpolymer and the remaining weight fraction (i.e. 0.20) was the third ethylene interpolymer produced with catalytic metal A. Specifically, the upper limit on the ppm of metal A in the ethylene interpolymer product was 2.4 ppm: i.e. ((0.6×3 ppm)+(0.2×3 ppm)); where 3 ppm is the upper limit on the ppm of metal A in the first and third ethylene interpolymers. In other cases, the upper limit on the ppm of metal A in the ethylene interpolymer product was 2 ppm and in still other cases 1.5 ppm. The lower limit on the ppm of metal A in the ethylene interpolymer product was determined by minimizing the weight fraction (i.e. 0.05) of the first ethylene interpolymer and maximizing the weight fraction (i.e. 0.95) of the second ethylene interpolymer. Specifically, the lower limit on the ppm of metal A in the ethylene interpolymer product was 0.0015 ppm: i.e. (0.05×0.03 ppm), where 0.03 ppm was the lower limit of metal A in the first ethylene interpolymer. In other cases, the lower limit on the ppm of metal A in the ethylene interpolymer product was 0.0025 ppm and in still other cases 0.0035 ppm.

The upper limit on the ppm of metal Z1 in the ethylene interpolymer product was determined by maximizing the weight fraction (i.e. 0.95) of the second ethylene interpolymer, i.e. 11.4 ppm (0.95×12 ppm), where 12 ppm was the upper limit on the ppm of metal Z1 in the second ethylene interpolymer. In other cases, the upper limit on the amount of metal Z1 in the ethylene interpolymer product was 10 ppm and in still other cases 8 ppm. The lower limit on the ppm of metal Z1 in the ethylene interpolymer product was determined by minimizing the weight fraction (i.e. 0.20) of the second ethylene interpolymer, i.e. 0.1 ppm (0.20×0.5 ppm), where 0.5 ppm was the lower limit on the ppm of metal Z1 in the second ethylene interpolymer. In other cases, the lower limit on the ppm of metal Z1 in the ethylene interpolymer product was 0.15 ppm and in still other cases 0.2 ppm.

The upper limit on the ppm of metal Z2 in the ethylene interpolymer product was determined by maximizing the weight fraction (i.e. 0.30) of the third ethylene interpolymer, i.e. 3.6 ppm (0.30×12 ppm), where 12 ppm was the upper limit on the ppm of metal Z2 in the third ethylene interpolymer. In other cases, the upper limit on amount of metal Z2 in the ethylene interpolymer product was 3 ppm and in still other cases 2.4 ppm.

The lower limit on the ppm of metal Z2 in the ethylene interpolymer product was determined by minimizing the weight fraction (i.e. 0.0) of the third ethylene interpolymer, i.e. 0.0 ppm (0.0×0.5 ppm), where 0.5 ppm was the lower limit on the ppm of metal Z2 in the third ethylene interpolymer. In other cases where the ethylene interpolymer product contains a small fraction of the third ethylene interpolymer the lower limit on ppm of metal Z1 in the ethylene interpolymer product may be 0.025 ppm and in other cases 0.05 ppm, i.e. 5 and 10% of the third ethylene interpolymer, respectively.

The upper limit on the ppm of metal C, or metal D, in the ethylene interpolymer product was determined by maximizing the weight fraction (i.e. 0.30) of the third ethylene interpolymer, i.e. 0.9 ppm (0.3×3 ppm), where 3 ppm is the upper limit on the ppm of metal C, or metal D, in the third ethylene interpolymer. In other cases, the upper limit on the ppm of metal C, or metal D, in the ethylene interpolymer product was 0.7 ppm and in still other cases 0.5 ppm. The lower limit on the ppm of metal C, or metal D, in the ethylene interpolymer product was determined by minimizing the weight fraction (i.e. 0.0) of the third ethylene interpolymer, i.e. 0.0 ppm (0.0×0.03 ppm), where 0.03 ppm was the lower limit on the ppm of metal C, or metal D, in the third ethylene interpolymer. In other cases when the ethylene interpolymer product contains a small fraction of the third ethylene interpolymer the lower limit on the ppm of metal C, or metal D, in the ethylene interpolymer product may be 0.0015 ppm or 0.003 ppm, i.e. 5 and 10% of the third ethylene interpolymer, respectively.

The hafnium to titanium ratio (Hf/Ti) in the ethylene interpolymer product may range from 24 to 0.00013, as determined by Neutron Activation Analysis. A Hf/Ti ratio of 24 may result in the case of an ethylene interpolymer product containing 80 weight % of the a first and a third ethylene interpolymer containing 3 ppm of Hf (upper limit) and 20 weight % of a second ethylene interpolymer containing 0.5 ppm of Ti (lower limit). A Hf/Ti ratio of 0.00013 may result in the case of an ethylene interpolymer product containing 5 weight % of a first ethylene interpolymer containing 0.03 ppm of Hf (lower limit) and 95 weight % of a second ethylene interpolymer containing 12 ppm of Ti (upper limit).

The upper limit on the total amount of catalytic metal (metals A and Z1 and optionally metals Z2, C and D) in the ethylene interpolymer product may be 11.6 ppm, in other cases 10 ppm and in still other cases 8 ppm. The lower limit on the total amount of catalytic metal in the ethylene interpolymer product may be 0.12 ppm, in other cases 0.15 ppm and in still other cases 0.2 ppm.

Embodiments of the ethylene interpolymer products disclosed herein have lower catalyst residues relative the polyethylene polymers described in U.S. Pat. No. 6,277,931. Higher catalyst residues in U.S. Pat. No. 6,277,931 increase the complexity of the continuous solution polymerization process; an example of increased complexity includes additional purification steps to remove catalyst residues from the polymer. In contrast, in the present disclosure, catalyst residues are not removed.

The upper limit on melt index of the ethylene interpolymer product may be about 500 dg/min, in some cases about 400 dg/min; in other cases, about 300 dg/min, and, in still other cases about 200 dg/min. The lower limit on the melt index of the ethylene interpolymer product may be about 0.3 dg/min, in some cases about 0.4 dg/min; in other cases about 0.5 dg/min, and; in still other cases about 0.6 dg/min.

Catalyst Deactivation

In the continuous polymerization processes described in this disclosure, polymerization is terminated by adding a catalyst deactivator. Embodiments in FIGS. 2 and 3 show catalyst deactivation occurring either: (a) upstream of the tubular reactor by adding a catalyst deactivator A from catalyst deactivator tank 18A, or; (b) downstream of the tubular reactor by adding a catalyst deactivator B from catalyst deactivator tank 18B. Catalyst deactivator tanks 18A and 18B may contain neat (100%) catalyst deactivator, a solution of catalyst deactivator in a solvent, or a slurry of catalyst deactivator in a solvent. The chemical composition of catalyst deactivator A and B may be the same, or different. Non-limiting examples of suitable solvents include linear or branched $C_5$ to $C_{12}$ alkanes. In this disclosure, how the catalyst deactivator is added is not particularly important. Once added, the catalyst deactivator substantially stops the polymerization reaction by changing active catalyst species to inactive forms. Suitable deactivators are well known in the art, non-limiting examples include: amines (e.g. U.S. Pat. No. 4,803,259 to Zboril et al.); alkali or alkaline earth metal salts of carboxylic acid (e.g. U.S. Pat. No. 4,105,609 to Machan et al.); water (e.g. U.S. Pat. No. 4,731,438 to Bernier et al.); hydrotalcites, alcohols and carboxylic acids (e.g. U.S. Pat. No. 4,379,882 to Miyata); or a combination thereof (U.S. Pat. No. 6,180,730 to Sibtain et al.). In this disclosure the quantify of catalyst deactivator added was determined by the following catalyst deactivator molar ratio: 0.3≤(catalyst deactivator)/((total catalytic metal)+(alkyl aluminum co-catalyst)+(aluminum alkyl)) 2.0; where the catalytic metal is the total moles of (metal A+metal Z1+any optional catalytic metals added the third reactor). The upper limit on the catalyst deactivator molar ratio may be about 2, in some cases about 1.5 and in other cases about 0.75. The lower limit on the catalyst deactivator molar ratio may be about 0.3, in some cases about 0.35 and in still other cases about 0.4. In general, the catalyst deactivator is added in a minimal amount such that the catalyst is deactivated and the polymerization reaction is quenched.

Solution Passivation

Referring to the embodiments shown in FIGS. 2 and 3; prior to entering the first V/L separator, a passivator or acid scavenger is added to deactivated solution A or B to form a passivated solution, i.e. passivated solution stream 23. Passivator tank 22 may contain neat (100%) passivator, a solution of passivator in a solvent, or a slurry of passivator in a solvent. Non-limiting examples of suitable solvents include linear or branched $C_5$ to $C_{12}$ alkanes. In this disclosure, how the passivator is added is not particularly important. Suitable passivators are well known in the art, non-limiting examples include alkali or alkaline earth metal salts of carboxylic acids or hydrotalcites. The quantity of passivator added can vary over a wide range. In this disclosure the quantity of passivator added was determined by the total moles of chloride compounds added to the solution process, i.e. the chloride compound "compound (vi)" plus the metal compound "compound (vii)". Optionally, a first and second chloride compound and a first and second metal compound may be used, i.e. to form the first and second heterogeneous catalyst formulations; in this case the amount of passivator added is determined by the total moles of all chloride containing compounds. The upper limit on the (passivator)/(total chlorides) molar ratio may be 15, in some cases 13 and in other cases 11. The lower limit on the (passivator)/(total chlorides) molar ratio may be about 5, in some cases about 7 and in still other cases about 9. In general, the passivator is added in the minimal amount to substantially passivate the deactivated solution.

Flexible Manufactured Articles

The ethylene interpolymer products disclosed herein may be converted into flexible manufactured articles such as monolayer or multilayer films. Non-limiting examples of processes to prepare such films include blown film processes, double bubble processes, triple bubble processes, cast film processes, tenter frame processes and machine direction orientation (MDO) processes.

In the blown film extrusion process an extruder heats, melts, mixes and conveys a thermoplastic, or a thermoplastic blend. Once molten, the thermoplastic is forced through an annular die to produce a thermoplastic tube. In the case of co-extrusion, multiple extruders are employed to produce a multilayer thermoplastic tube. The temperature of the extrusion process is primarily determined by the thermoplastic or thermoplastic blend being processed, for example the melting temperature or glass transition temperature of the thermoplastic and the desired viscosity of the melt. In the case of polyolefins, typical extrusion temperatures are from 330° F. to 550° F. (166° C. to 288° C.). Upon exit from the annular die, the thermoplastic tube is inflated with air, cooled, solidified and pulled through a pair of nip rollers. Due to air inflation, the tube increases in diameter forming a bubble of desired size. Due to the pulling action of the nip rollers the bubble is stretched in the machine direction. Thus, the bubble is stretched in two directions: the transverse direction (TD) where the inflating air increases the diameter of the bubble; and the machine direction (MD) where the nip rollers stretch the bubble. As a result, the physical properties of blown films are typically anisotropic, i.e. the physical properties differ in the MD and TD directions; for example, film tear strength and tensile properties typically differ in the MD and TD. In some prior art documents, the terms "cross direction" or "CD" is used; these terms are equivalent to the terms "transverse direction" or "TD" used in this disclosure. In the blown film process, air is also blown on the external bubble circumference to cool the thermoplastic as it exits the annular die. The final width of the film is determined by controlling the inflating air or the internal bubble pressure; in other words, increasing or decreasing bubble diameter. Film thickness is controlled primarily by increasing or decreasing the speed of the nip rollers to control the drawdown rate. After exiting the nip rollers, the bubble or tube is collapsed and may be slit in the machine direction thus creating sheeting. Each sheet may be wound into a roll of film. Each roll may be further slit to create film of the desired width. Each roll of film is further processed into a variety of consumer products as described below.

The cast film process is similar in that a single or multiple extruder(s) may be used; however, the various thermoplastic materials are metered into a flat die and extruded into a monolayer or multilayer sheet, rather than a tube. In the cast film process the extruded sheet is solidified on a chill roll.

In the double bubble process, a first blown film bubble is formed and cooled, then the first bubble is heated and re-inflated forming a second blown film bubble, which is subsequently cooled. The ethylene interpolymer products, disclosed herein, are also suitable for the triple bubble blown process. Additional film converting processes, suitable for the disclosed ethylene interpolymer products, include processes that involve a Machine Direction Orientation (MDO) step; for example, blowing a film, quenching the film and then subjecting the film tube or film sheet to a MDO process at any stretch ratio. Additionally, the ethylene interpolymer product films disclosed herein are suitable for use in tenter frame processes as well as other processes that introduce biaxial orientation.

Depending on the end-use application, the disclosed ethylene interpolymer products may be converted into films that span a wide range of thicknesses. Non-limiting examples include, food packaging films where thicknesses may range from about 0.5 mil (13 µm) to about 4 mil (102 µm), and; in heavy duty sack applications film thickness may range from about 2 mil (51 µm) to about 10 mil (254 µm).

The monolayer, in monolayer films, may contain more than one ethylene interpolymer product and/or one or more additional polymer; non-limiting examples of additional polymers include ethylene polymers and propylene polymers. The lower limit on the weight percent of the ethylene interpolymer product in a monolayer film may be about 3 wt. %, in other cases about 10 wt. % and in still other cases about 30 wt. %. The upper limit on the weight percent of the ethylene interpolymer product in the monolayer film may be 100 wt. %, in other cases about 90 wt. % and in still other cases about 70 wt. %.

The ethylene interpolymer products disclosed herein may also be used in one or more layers of a multilayer film; non-limiting examples of multilayer films include three, five, seven, nine, eleven or more layers. The disclosed ethylene interpolymer products are also suitable for use in processes that employ micro-layering dies and/or feedblocks, such processes can produce films having many layers, non-limiting examples include from 10 to 10,000 layers. The thickness of a specific layer (containing the ethylene interpolymer product) within a multilayer film may be about 5%, in other cases about 15% and in still other cases about 30% of the total multilayer film thickness. In other embodiments, the thickness of a specific layer (containing the ethylene interpolymer product) within a multilayer film may be about 95%, in other cases about 80% and in still other cases about 65% of the total multilayer film thickness. Each individual layer of a multilayer film may contain more than one ethylene interpolymer product and/or additional thermoplastics.

Additional embodiments include laminations and coatings, wherein mono or multilayer films containing the disclosed ethylene interpolymer products are extrusion laminated or adhesively laminated or extrusion coated. In extrusion lamination or adhesive lamination, two or more substrates are bonded together with a thermoplastic or an adhesive, respectively. In extrusion coating, a thermoplastic is applied to the surface of a substrate. These processes are well known to those experienced in the art. Frequently, adhesive lamination or extrusion lamination are used to bond dissimilar materials, non-limiting examples include the bonding of a paper web to a thermoplastic web, or the bonding of an aluminum foil containing web to a thermoplastic web, or the bonding of two thermoplastic webs that are chemically incompatible, e.g. the bonding of an ethylene interpolymer product containing web to a polyester or polyamide web. Prior to lamination, the web containing the disclosed ethylene interpolymer product(s) may be monolayer or multilayer. Prior to lamination the individual webs may be surface treated to improve the bonding, a non-limiting example of a surface treatment is corona treating. A primary web or film may be laminated on its upper surface, its lower surface, or both its upper and lower surfaces with a secondary web. A secondary web and a tertiary web could be laminated to the primary web; wherein the secondary and tertiary webs differ in chemical composition. As non-limiting examples, secondary or tertiary webs may include polyamide, polyester and polypropylene, or webs containing barrier resin layers such as EVOH. Such webs may also contain a vapor deposited barrier layer; for example, a thin silicon oxide ($SiO_x$) or aluminum oxide ($AlO_x$) layer. Multilayer webs (or films) may contain three, five, seven, nine, eleven or more layers.

The ethylene interpolymer products disclosed herein can be used in a wide range of manufactured articles comprising one or more films (monolayer or multilayer). Non-limiting examples of such manufactured articles include: food packaging films (fresh and frozen foods, liquids and granular foods), stand-up pouches, retortable packaging and bag-in-box packaging; barrier films (oxygen, moisture, aroma, oil, etc.) and modified atmosphere packaging; light and heavy duty shrink films and wraps, collation shrink film, pallet shrink film, shrink bags, shrink bundling and shrink shrouds; light and heavy duty stretch films, hand stretch wrap, machine stretch wrap and stretch hood films; high clarity films; heavy-duty sacks; household wrap, overwrap films and sandwich bags; industrial and institutional films, trash bags, can liners, magazine overwrap, newspaper bags, mail bags, sacks and envelopes, bubble wrap, carpet film, furniture bags, garment bags, coin bags, auto panel films; medical applications such as gowns, draping and surgical garb; construction films and sheeting, asphalt films, insulation bags, masking film, landscaping film and bags; geomembrane liners for municipal waste disposal and mining applications; batch inclusion bags; agricultural films, mulch film and green house films; in-store packaging, self-service bags, boutique bags, grocery bags, carry-out sacks and t-shirt bags; oriented films, machine direction oriented (MDO) films, biaxially oriented films and functional film layers in oriented polypropylene (OPP) films, e.g. sealant and/or toughness layers. Additional manufactured articles comprising one or more films containing at least one ethylene interpolymer product include laminates and/or multilayer films; sealants and tie layers in multilayer films and composites; laminations with paper; aluminum foil laminates or laminates containing vacuum deposited aluminum; polyamide laminates; polyester laminates; extrusion coated laminates, and; hot-melt adhesive formulations. The manufactured articles summarized in this paragraph contain at least one film (monolayer or multilayer) comprising at least one embodiment of the disclosed ethylene interpolymer products.

Desired film physical properties (monolayer or multilayer) typically depend on the application of interest. Non-limiting examples of desirable film properties include: optical properties (gloss, haze and clarity), dart impact, Elmendorf tear, modulus (1% and 2% secant modulus), tensile properties (yield strength, break strength, elongation at break, toughness, etc.), heat sealing properties (heat seal initiation temperature, SIT, and hot tack). Specific hot tack and heat sealing properties are desired in high speed vertical and horizontal form-fill-seal processes that load and seal a commercial product (liquid, solid, paste, part, etc.) inside a pouch-like package.

In addition to desired film physical properties, it is desired that the disclosed ethylene interpolymer products are easy to process on film lines. Those skilled in the art frequently use the term "processability" to differentiate polymers with improved processability, relative to polymers with inferior processability. A commonly used measure to quantify processability is extrusion pressure; more specifically, a polymer with improved processability has a lower extrusion pressure (on a blown film or a cast film extrusion line) relative to a polymer with inferior processability.

The films used in the manufactured articles described in this section may optionally include, depending on its intended use, additives and adjuvants. Non-limiting examples of additives and adjuvants include, anti-blocking agents, antioxidants, heat stabilizers, slip agents, processing aids, anti-static additives, colorants, dyes, filler materials, light stabilizers, light absorbers, lubricants, pigments, plasticizers, nucleating agents and combinations thereof.

Rigid Manufactured Articles

The processes disclosed herein are also capable of making ethylene interpolymer products that have a useful combination of desirable physical properties in rigid manufactured articles. Non-limiting examples of rigid articles include: deli containers, margarine tubs, drink cups and produce trays; household and industrial containers, cups, bottles, pails, crates, tanks, drums, bumpers, lids, industrial bulk containers, industrial vessels, material handling containers, bottle cap liners, bottle caps, living hinge closures; toys, playground equipment, recreational equipment, boats, marine and safety equipment; wire and cable applications such as power cables, communication cables and conduits; flexible tubing and hoses; pipe applications including both pressure pipe and non-pressure pipe markets, e.g. natural gas distribution, water mains, interior plumbing, storm sewer, sanitary sewer, corrugated pipes and conduit; foamed articles manufactured from foamed sheet or bun foam; military packaging (equipment and ready meals); personal care packaging, diapers and sanitary products; cosmetic, pharmaceutical and medical packaging, and; truck bed liners, pallets and automotive dunnage. The rigid manufactured articles summarized in this paragraph contain one or more of the ethylene interpolymer products disclosed herein or a blend of at least one of the ethylene interpolymer products disclosed herein with at least one other thermoplastic.

Such rigid manufactured articles may be fabricated using the following non-limiting processes: injection molding, compression molding, blow molding, rotomolding, profile extrusion, pipe extrusion, sheet thermoforming and foaming processes employing chemical or physical blowing agents.

The desired physical properties of rigid manufactured articles depend on the application of interest. Non-limiting examples of desired properties include: flexural modulus (1% and 2% secant modulus); tensile toughness; environmental stress crack resistance (ESCR); slow crack growth resistance (PENT); abrasion resistance; shore hardness; deflection temperature under load; VICAT softening point; IZOD impact strength; ARM impact resistance; Charpy impact resistance, and; color (whiteness and/or yellowness index).

The rigid manufactured articles described in this section may optionally include, depending on its intended use, additives and adjuvants. Non-limiting examples of additives and adjuvants include, antioxidants, slip agents, processing aids, anti-static additives, colorants, dyes, filler materials, heat stabilizers, light stabilizers, light absorbers, lubricants, pigments, plasticizers, nucleating agents and combinations thereof.

Testing Methods

Prior to testing, each specimen was conditioned for at least 24 hours at 23±2° C. and 50±10% relative humidity and subsequent testing was conducted at 23±2° C. and 50±10% relative humidity. Herein, the term "ASTM conditions" refers to a laboratory that is maintained at 23±2° C. and 50±10% relative humidity; and specimens to be tested were conditioned for at least 24 hours in this laboratory prior to testing. ASTM refers to the American Society for Testing and Materials.

Density

Ethylene interpolymer product densities were determined using ASTM D792-13 (Nov. 1, 2013).

Melt Index

Ethylene interpolymer product melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively. Herein, the term "stress exponent" or its acronym "S.Ex.", is defined by the following relationship:

$$S.Ex.=\log(I_6/I_2)/\log(6480/2160)$$

wherein $I_6$ and $I_2$ are the melt flow rates measured at 190° C. using 6.48 kg and 2.16 kg loads, respectively.

Conventional Size Exclusion Chromatography (SEC)

Ethylene interpolymer product samples (polymer) solutions (1 to 3 mg/mL) were prepared by heating the polymer in 1,2,4-trichlorobenzene (TCB) and rotating on a wheel for 4 hours at 150° C. in an oven. An antioxidant (2,6-di-tert-butyl-4-methylphenol (BHT)) was added to the mixture in order to stabilize the polymer against oxidative degradation. The BHT concentration was 250 ppm. Polymer solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect GPC columns from oxidative degradation. The sample injection volume was 200 μL. The GPC columns were calibrated with narrow distribution polystyrene standards. The polystyrene molecular weights were converted to polyethylene molecular weights using the Mark-Houwink equation, as described in the ASTM standard test method D6474-12 (December 2012). The GPC raw data were processed with the Cirrus GPC software, to produce molar mass averages ($M_n$, $M_w$, $M_z$) and molar mass distribution (e.g. Polydispersity, $M_w/M_n$). In the polyethylene art, a commonly used term that is equivalent to SEC is GPC, i.e. Gel Permeation Chromatography.

Triple Detection Size Exclusion Chromatography (3D-SEC)

Ethylene interpolymer product samples (polymer) solutions (1 to 3 mg/mL) were prepared by heating the polymer in 1,2,4-trichlorobenzene (TCB) and rotating on a wheel for 4 hours at 150° C. in an oven. An antioxidant (2,6-di-tert-butyl-4-methylphenol (BHT)) was added to the mixture in order to stabilize the polymer against oxidative degradation. The BHT concentration was 250 ppm. Sample solutions were chromatographed at 140° C. on a PL 220 high-temperature chromatography unit equipped with a differential refractive index (DRI) detector, a dual-angle light scattering detector (15 and 90 degree) and a differential viscometer. The SEC columns used were either four Shodex columns (HT803, HT804, HT805 and HT806), or four PL Mixed ALS or BLS columns. TCB was the mobile phase with a flow rate of 1.0 mL/minute, BHT was added to the mobile phase at a concentration of 250 ppm to protect SEC columns from oxidative degradation. The sample injection volume was 200 µL. The SEC raw data were processed with the Cirrus GPC software, to produce absolute molar masses and intrinsic viscosity ([η]). The term "absolute" molar mass was used to distinguish 3D-SEC determined absolute molar masses from the molar masses determined by conventional SEC. The viscosity average molar mass ($M_v$) determined by 3D-SEC was used in the calculations to determine the Long Chain Branching Factor (LCBF).

GPC-FTIR

Ethylene interpolymer product (polymer) solutions (2 to 4 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a Waters GPC 150C chromatography unit equipped with four Shodex columns (HT803, HT804, HT805 and HT806) using TCB as the mobile phase with a flow rate of 1.0 mL/minute, with a FTIR spectrometer and a heated FTIR flow through cell coupled with the chromatography unit through a heated transfer line as the detection system. BHT was added to the mobile phase at a concentration of 250 ppm to protect SEC columns from oxidative degradation. The sample injection volume was 300 µL. The raw FTIR spectra were processed with OPUS FTIR software and the polymer concentration and methyl content were calculated in real time with the Chemometric Software (PLS technique) associated with the OPUS. Then the polymer concentration and methyl content were acquired and baseline-corrected with the Cirrus GPC software. The SEC columns were calibrated with narrow distribution polystyrene standards. The polystyrene molecular weights were converted to polyethylene molecular weights using the Mark-Houwink equation, as described in the ASTM standard test method D6474. The comonomer content was calculated based on the polymer concentration and methyl content predicted by the PLS technique as described in Paul J. DesLauriers, Polymer 43, pages 159-170 (2002); herein incorporated by reference.

The GPC-FTIR method measures total methyl content, which includes the methyl groups located at the ends of each macromolecular chain, i.e. methyl end groups. Thus, the raw GPC-FTIR data must be corrected by subtracting the contribution from methyl end groups. To be more clear, the raw GPC-FTIR data overestimates the amount of short chain branching (SCB) and this overestimation increases as molecular weight (M) decreases. In this disclosure, raw GPC-FTIR data was corrected using the 2-methyl correction. At a given molecular weight (M), the number of methyl end groups (NE) was calculated using the following equation; NE=28000/M, and NE (M dependent) was subtracted from the raw GPC-FTIR data to produce the SCB/1000 C (2-Methyl Corrected) GPC-FTIR data.

Composition Distribution Branching Index (CDBI)

The "Composition Distribution Branching Index", hereinafter CDBI, of the disclosed Examples and Comparative Examples were measured using a CRYSTAF/TREF 200+ unit equipped with an IR detector, hereinafter the CTREF. The acronym "TREF" refers to Temperature Rising Elution Fractionation. The CTREF was supplied by PolymerChAR S.A. (Valencia Technology Park, Gustave Eiffel, 8, Paterna, E-46980 Valencia, Spain). The CTREF was operated in the TREF mode, which generates the chemical composition of the polymer sample as a function of elution temperature, the Co/Ho ratio (Copolymer/Homopolymer ratio) and the CDBI (the Composition Distribution Breadth Index), i.e. $CDBI_{50}$ and $CDBI_{25}$. A polymer sample (80 to 100 mg) was placed into the reactor vessel of the CTREF. The reactor vessel was filled with 35 ml of 1,2,4-trichlorobenzene (TCB) and the polymer was dissolved by heating the solution to 150° C. for 2 hours. An aliquot (1.5 mL) of the solution was then loaded into the CTREF column which was packed with stainless steel beads. The column, loaded with sample, was allowed to stabilize at 110° C. for 45 minutes. The polymer was then crystallized from solution, within the column, by dropping the temperature to 30° C. at a cooling rate of 0.09° C./minute. The column was then equilibrated for 30 minutes at 30° C. The crystallized polymer was then eluted from the column with TCB flowing through the column at 0.75 mL/minute, while the column was slowly heated from 30° C. to 120° C. at a heating rate of 0.25° C./minute. The raw CTREF data were processed using Polymer ChAR software, an Excel spreadsheet and CTREF software developed in-house. $CDBI_{50}$ was defined as the percent of polymer whose composition is within 50% of the median comonomer composition; $CDBI_{50}$ was calculated from the composition distribution cure and the normalized cumulative integral of the composition distribution curve, as described in U.S. Pat. No. 5,376,439. Those skilled in the art will understand that a calibration curve is required to convert a CTREF elution temperature to comonomer content, i.e. the amount of comonomer in the ethylene/α-olefin polymer fraction that elutes at a specific temperature. The generation of such calibration curves are described in the prior art, e.g. Wild, et al., J. Polym. Sci., Part B, Polym. Phys., Vol. 20 (3), pages 441-455: hereby fully incorporated by reference. $CDBI_{25}$ as calculated in a similar manner; $CDBI_{25}$ is defined as the percent of polymer whose composition is with 25% of the median comonomer composition. At the end of each sample run, the CTREF column was cleaned for 30 minutes; specifically, with the CTREF column temperature at 160° C., TCB flowed (0.5 mL/minute) through the column for 30 minutes. CTREF deconvolutions were performed to determine the amount of branching (BrF (#C6/1000 C)) and density of the first ethylene interpolymer using the following equations: BrF (#C6/1000 C)=74.29−0.7598 ($T^P_{CTREF}$), where $T^P_{CTREF}$ is the peak elution temperature of the first ethylene interpolymer in the CTREF chromatogram, and BrF (#C6/1000 C)=9341.8 $(\rho^1)^2$−17766 $(\rho^1)$+8446.8, where $\rho^1$ was the density of the first ethylene interpolymer. The BrF (#C6/1000 C) and density of the second ethylene interpolymer was determined using blending rules, given the overall BrF (#C6/1000 C) and density of the ethylene interpolymer product. The BrF (#C6/1000 C) and density of the second and third ethylene interpolymer was assumed to be the same.

Neutron Activation (Elemental Analysis)

Neutron Activation Analysis, hereinafter N.A.A., was used to determine catalyst residues in ethylene interpolymer products as follows. A radiation vial (composed of ultrapure polyethylene, 7 mL internal volume) was filled with an ethylene interpolymer product sample and the sample weight was recorded. Using a pneumatic transfer system the sample was placed inside a SLOWPOKE™ nuclear reactor (Atomic Energy of Canada Limited, Ottawa, Ontario, Canada) and irradiated for 30 to 600 seconds for short half-life elements (e.g., Ti, V, Al, Mg, and Cl) or 3 to 5 hours for long half-life elements (e.g. Zr, Hf, Cr, Fe and Ni). The average thermal neutron flux within the reactor was $5×10^{11}$/cm$^2$/s. After irradiation, samples were withdrawn from the reactor and aged, allowing the radioactivity to decay; short half-life elements were aged for 300 seconds or long half-life elements were aged for several days. After aging, the gamma-ray spectrum of the sample was recorded using a germanium semiconductor gamma-ray detector (Ortec model GEM55185, Advanced Measurement Technology Inc., Oak Ridge, Tenn., USA) and a multichannel analyzer (Ortec model DSPEC Pro). The amount of each element in the sample was calculated from the gamma-ray spectrum and recorded in parts per million relative to the total weight of the ethylene interpolymer product sample. The N.A.A. system was calibrated with Specpure standards (1000 ppm solutions of the desired element (greater than 99% pure)). One mL of solutions (elements of interest) were pipetted onto a 15 mm×800 mm rectangular paper filter and air dried. The filter paper was then placed in a 1.4 mL polyethylene irradiation vial and analyzed by the N.A.A. system. Standards are used to determine the sensitivity of the N.A.A. procedure (in counts/μg).

Unsaturation

The quantity of unsaturated groups, i.e. double bonds, in an ethylene interpolymer product was determined according to ASTM D3124-98 (vinylidene unsaturation, published March 2011) and ASTM D6248-98 (vinyl and trans unsaturation, published July 2012). An ethylene interpolymer product sample was: a) first subjected to a carbon disulfide extraction to remove additives that may interfere with the analysis; b) the sample (pellet, film or granular form) was pressed into a plaque of uniform thickness (0.5 mm), and; c) the plaque was analyzed by FTIR.

Comonomer Content: Fourier Transform Infrared (FTIR) Spectroscopy

The quantity of comonomer in an ethylene interpolymer product was determine by FTIR and reported as the Short Chain Branching (SCB) content having dimensions of $CH_3$#/1000 C (number of methyl branches per 1000 carbon atoms). This test was completed according to ASTM D6645-01 (2001), employing a compression molded polymer plaque and a Thermo-Nicolet 750 Magna-IR Spectrophotometer. The polymer plaque was prepared using a compression molding device (Wabash-Genesis Series press) according to ASTM D4703-16 (April 2016).

Dynamic Mechanical Analysis (DMA)

Oscillatory shear measurements under small strain amplitudes were carried out to obtain linear viscoelastic functions at 190° C. under $N_2$ atmosphere, at a strain amplitude of 10% and over a frequency range of 0.02-126 rad/s at 5 points per decade. Frequency sweep experiments were performed with a TA Instruments DHR3 stress-controlled rheometer using cone-plate geometry with a cone angle of 5°, a truncation of 137 μm and a diameter of 25 mm. In this experiment a sinusoidal strain wave was applied and the stress response was analyzed in terms of linear viscoelastic functions. The zero shear rate viscosity ($\eta_0$) based on the DMA frequency sweep results was predicted by Ellis model (see R. B. Bird et al. "Dynamics of Polymer Liquids. Volume 1: Fluid Mechanics" Wiley-Interscience Publications (1987) p. 228) or Carreau-Yasuda model (see K. Yasuda (1979) PhD Thesis, IT Cambridge). In this disclosure, the LCBF (Long Chain Branching Factor) was determined using the DMA determined $\eta_0$.

Creep Test

Creep measurements were performed by an Anton Paar MCR 501 rheometer at 190° C. using 25 mm parallel plate geometry under $N_2$ atmosphere. In this experiment, a compression molded circular plaque with a thickness of 1.8 mm was placed between the pre-heated upper and lower measurement fixtures and allowed to come to thermal equilibrium. The upper plate was then lowered to 50 μm above the testing gap size of 1.5 mm. At this point, the excess material was trimmed off and the upper fixture was lowered to the measurement gap size. A waiting time of 10 min after sample loading and trimming was applied to avoid residual stresses causing the strain to drift. In the creep experiment, the shear stress was increased instantly from 0 to 20 Pa and the strain was recorded versus time. The sample continued to deform under the constant shear stress and eventually reached a steady rate of straining. Creep data was reported in terms of creep compliance (J(t)) which has the units of reciprocal modulus. The inverse of J(t) slope in the steady creeping regime was used to calculate the zero shear rate viscosity based on the linear regression of the data points in the last 10% time window of the creep experiment.

In order to determine if the sample was degraded during the creep test, frequency sweep experiments under small strain amplitude (10%) were performed before and after creep stage over a frequency range of 0.1-100 rad/s. The difference between the magnitude of complex viscosity at 0.1 rad/s before and after the creep stage was used as an indicator of thermal degradation. The difference should be less than 5% to consider the creep determined zero shear rate viscosity acceptable.

Creep experiments confirmed that Reference Line, shown in FIG. 1, for linear ethylene interpolymers was also valid if the creep determined $\eta_0$ was used rather than the DMA determined $\eta_0$. In this disclosure, the LCBF (Long Chain Branching Factor) was determined using the DMA determined $\eta_0$. To be absolutely clear, the zero shear viscosity (ZSV [poise]) data reported in Tables 1A, 2 and 3 were measured using DMA.

$^{13}$C Nuclear Magnetic Resonance (NMR)

Between 0.21 and 0.30 g of polymer sample was weighed into 10 mm NMR tubes. The sample was then dissolved with deuterated ortho-dichlorobenzene (ODCB-d4) and heated to 125° C.; a heat gun was used to assist the mixing process. $^{13}$C NMR spectra (24000 scans per spectra) were collected on a Bruker AVANCE III HD 400 MHz NMR spectrometer fitted with a 10 mm PABBO probehead maintained at 125° C. Chemical shifts were referenced to the polymer backbone resonance, which was assigned a value of 30.0 ppm. $^{13}$C spectra were processed using exponential multiplication with a line broadening (LB) factor of 1.0 Hz. They were also processed using Gaussian multiplication with LB=−0.5 Hz and GB=0.2 to enhance resolution.

Short chain branching was calculated using the isolated method, where the integral area of peaks unique to that branch length are compared to the total integral (standard practice for branches up to and including C5). Quantitative data for the C1, C2, C3, C4, (C6+LCB) and the Saturated Termini (Sat. Term.) carbons was presented in Table 12, all values reported per 1000 total carbon atoms, data accuracy was ±0.03 branches/1000 C. Any values of 0.03 branches/ 1000 C or less were assumed beyond the ability to quantify and were marked with a 'D' to indicate that a peak was detected but not quantifiable in Table 12.

Figure 4:
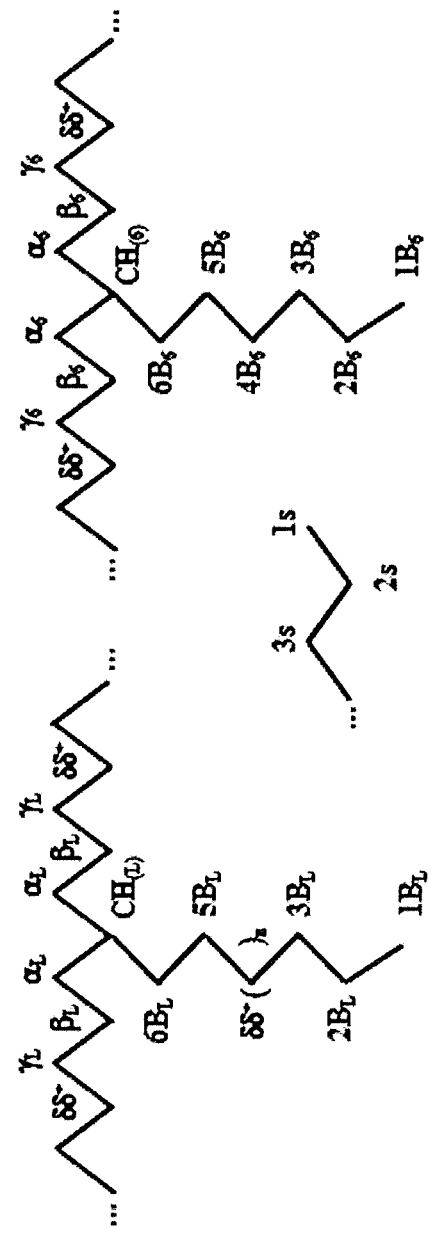
FIG. 4 illustrates the nomenclature used to identify various carbon atoms that give rise to signals in $^{13}C$ NMR spectra.

FIG. 4 illustrates a long chain branched macromolecule on the left and a C6 branched macromolecule on the right and the nomenclature used to identify each carbon atom. Branchpoint carbons peaks ($CH_{(L)}$ and $CH_{(6)}$, 38.2 ppm), as well as the $1B_L/1B_6$, $2B_L/2B_6$ and $3B_L/3B_6$ carbon peaks (at 14.1, 22.9, and 32.2 ppm, respectively) are close together in the spectrum. Additionally, the ends of a LCB are functionally equivalent to the ends of macromolecular chains. In ethylene-octene copolymers there was separation between the $2B_6$ and $3B_6$ peaks and the 2 s & 3 s peaks in the chain termini. With the goal of deconvoluting the $C_6$ and LCB contributions to the branchpoint peak (38.2 ppm), the spectra were reprocessed using a Gaussian function (as opposed to an exponential function), specifically LB=−0.5 and GB=0.2. The net effect of this reprocessing was to 'trade off' some signal/noise (S/N) for additional resolution without negatively impacting peak integration, i.e. quantification of the respective carbons. Using this technique, the values for C6, LCB and saturated termini were obtained using the following method: 1) the values for (C6+LCB) peak at 38.2 ppm and the two (LCB+sat. term.) peaks at 32.2 and 22.9 ppm were calculated from the 'standard' spectrum; 2) these three peak regions in the Gaussian reprocessed spectra (i.e. 38.2, 32.2 and 22.9 ppm) were integrated to obtain a ratio for each carbon within the respective peak; 3) these ratios were converted to a value per 1000 carbons by normalizing by the respective integrated area measured in step 1); 4) the saturated termini was the average of that from 2 s & 3 s peaks; 5) the C6 value was estimated from the integrals of the small peaks on the far left of these three regions, and; 6) the LCB value was estimated from the peak at 38.2 ppm.

Film Dart Impact

Film dart impact strength was determined using ASTM D1709-09 Method A (May 1, 2009). In this disclosure the dart impact test employed a 1.5 inch (38 mm) diameter hemispherical headed dart.

Film Puncture

Film "puncture", the energy (J/mm) required to break the film was determined using ASTM D5748-95 (originally adopted in 1995, reapproved in 2012).

Film Lubricated Puncture

The "lubricated puncture" test was performed as follows: the energy (J/mm) to puncture a film sample was determined using a 0.75-inch (1.9-cm) diameter pear-shaped fluorocarbon coated probe travelling at 10-inch per minute (25.4-cm/minute). ASTM conditions were employed. Prior to testing the specimens, the probe head was manually lubricated with Muko Lubricating Jelly to reduce friction. Muko Lubricating Jelly is a water-soluble personal lubricant available from Cardinal Health Inc., 1000 Tesma Way, Vaughan, ON L4K 5R8 Canada. The probe was mounted in an Instron Model 5 SL Universal Testing Machine and a 1000-N load cell as used. Film samples (1.0 mil (25 μm) thick, 5.5 inch (14 cm) wide and 6 inch (15 cm) long) were mounted in the Instron and punctured.

Film Tensile

The following film tensile properties were determined using ASTM D882-12 (Aug. 1, 2012): tensile break strength (MPa), elongation at break (%), tensile yield strength (MPa), tensile elongation at yield (%) and film toughness or total energy to break (ft·lb/in$^3$). Tensile properties were measured in the both the machine direction (MD) and the transverse direction (TD) of the blown films.

Film Secant Modulus

The secant modulus is a measure of film stiffness. The secant modulus is the slope of a line drawn between two points on the stress-strain curve, i.e. the secant line. The first point on the stress-strain curve is the origin, i.e. the point that corresponds to the origin (the point of zero percent strain and zero stress), and; the second point on the stress-strain curve is the point that corresponds to a strain of 1%; given these two points the 1% secant modulus is calculated and is expressed in terms of force per unit area (MPa). The 2% secant modulus is calculated similarly. This method is used to calculated film modulus because the stress-strain relationship of polyethylene does not follow Hook's law; i.e. the stress-strain behavior of polyethylene is non-linear due to its viscoelastic nature. Secant moduli were measured using a conventional Instron tensile tester equipped with a 200 lbf load cell. Strips of monolayer film samples were cut for testing with following dimensions: 14 inch long, 1 inch wide and 1 mil thick; ensuring that there were no nicks or cuts on the edges of the samples. Film samples were cut in both the machine direction (MD) and the transverse direction (TD) and tested. ASTM conditions were used to condition the samples. The thickness of each film was accurately measured with a hand-held micrometer and entered along with the sample name into the Instron software. Samples were loaded in the Instron with a grip separation of 10 inch and pulled at a rate of 1 inch/min generating the strain-strain curve. The 1% and 2% secant modulus were calculated using the Instron software.

Film Puncture-Propagation Tear

Puncture-propagation tear resistance of blown film was determined using ASTM D2582-09 (May 1, 2009). This test measures the resistance of a blown film to snagging, or more precisely, to dynamic puncture and propagation of that puncture resulting in a tear. Puncture-propagation tear resistance was measured in the machine direction (MD) and the transverse direction (TD) of the blown films.

Film Elmendorf Tear

Film tear performance was determined by ASTM D1922-09 (May 1, 2009); an equivalent term for tear is "Elmendorf tear". Film tear was measured in both the machine direction (MD) and the transverse direction (TD) of the blown films.

Film Opticals

Film optical properties were measured as follows: Haze, ASTM D1003-13 (Nov. 15, 2013), and; Gloss ASTM D2457-13 (Apr. 1, 2013).

Film Dynatup Impact

Instrumented impact testing was carried out on a machine called a Dynatup Impact Tester purchased from Illinois Test Works Inc., Santa Barbara, Calif., USA; those skilled in the art frequently call this test the Dynatup impact test. Testing was completed according to the following procedure. Test samples are prepared by cutting about 5 inches (12.7 cm)

wide and about 6 inches (15.2 cm) long strips from a roll of blown film; film was about 1 mil thick. Prior to testing, the thickness of each sample was accurately measured with a handheld micrometer and recorded. ASTM conditions were employed. Test samples were mounted in the 9250 Dynatup Impact drop tower/test machine using the pneumatic clamp. Dynatup tup #1, 0.5 inch (1.3 cm) diameter, was attached to the crosshead using the Allen bolt supplied. Prior to testing, the crosshead is raised to a height such that the film impact velocity is 10.9±0.1 ft/s. A weight was added to the crosshead such that: 1) the crosshead slowdown, or tup slowdown, was no more than 20% from the beginning of the test to the point of peak load and 2) the tup must penetrate through the specimen. If the tup does not penetrate through the film, additional weight is added to the crosshead to increase the striking velocity. During each test the Dynatup Impulse Data Acquisition System Software collected the experimental data (load (lb) versus time). At least 5 film samples are tested and the software reports the following average values: "Dynatup Maximum (Max) Load (lb)", the highest load measured during the impact test; "Dynatup Total Energy (ft·lb)", the area under the load curve from the start of the test to the end of the test (puncture of the sample), and; "Dynatup Total Energy at Max Load (ft·lb)", the area under the load curve from the start of the test to the maximum load point.

Film Hot Tack

In this disclosure, the "Hot Tack Test" was performed as follows, using ASTM conditions. Hot tack data was generated using a J&B Hot Tack Tester which is commercially available from Jbi Hot Tack, Geloeslaan 30, B-3630 Maamechelen, Belgium. In the hot tack test, the strength of a polyolefin to polyolefin seal is measured immediately after heat sealing two film samples together (the two film samples were cut from the same roll of 2.0 mil (51-µm) thick film), i.e. when the polyolefin macromolecules that comprise the film are in a semi-molten state. This test simulates the heat sealing of polyethylene films on high speed automatic packaging machines, e.g., vertical or horizontal form, fill and seal equipment. The following parameters were used in the J&B Hot Tack Test: film specimen width, 1 inch (25.4 mm); film sealing time, 0.5 second; film sealing pressure, 0.27 N/mm$^2$; delay time, 0.5 second; film peel speed, 7.9 in/second (200 mm/second); testing temperature range, 203° F. to 293° F. (95° C. to 145° C.); temperature increments, 9° F. (5° C.); and five film samples were tested at each temperature increment to calculate average values at each temperature. The following data was recorded for the disclosed Example films and Comparative Example films: the "Tack Onset @ 1.0 N (° C.)", the temperature at which a hot tack force of 1N was observed (average of 5-film samples); "Max Hot tack Strength (N)", the maximum hot tack force observed (average of 5-film samples) over the testing temperature range, and; "Temperature—Max. Hot tack (° C.)", the temperature at which the maximum hot tack force was observed.

Film Heat Seal Strength

In this disclosure, the "Heat Seal Strength Test" was performed as follows. ASTM conditions were employed. Heat seal data was generated using a conventional Instron Tensile Tester. In this test, two film samples are sealed over a range of temperatures (the two film samples were cut from the same roll of 2.0 mil (51-µm) thick film). The following parameters were used in the Heat Seal Strength Test: film specimen width, 1 inch (25.4 mm); film sealing time, 0.5 second; film sealing pressure, 40 psi (0.28 N/mm$^2$); temperature range, 212° F. to 302° F. (100° C. to 150° C.) and temperature increment, 9° F. (5° C.). After aging for at least 24 hours at ASTM conditions, seal strength was determined using the following tensile parameters: pull (crosshead) speed, 12 inch/min (2.54 cm/min); direction of pull, 90° to seal, and; 5 samples of film were tested at each temperature increment. The Seal Initiation Temperature, hereinafter S.I.T., is defined as the temperature required to form a commercially viable seal; a commercially viable seal has a seal strength of 2.0 lb per inch of seal (8.8 N per 25.4 mm of seal).

Film Hexane Extractables

Hexane extractables was determined according to the Code of Federal Registration 21 CFR § 177.1520 Para (c) 3.1 and 3.2; wherein the quantity of hexane extractable material in a film is determined gravimetrically. Elaborating, 2.5 grams of 3.5 mil (89 µm) monolayer film was placed in a stainless steel basket, the film and basket were weighed ($w^i$), while in the basket the film was: extracted with n-hexane at 49.5° C. for two hours; dried at 80° C. in a vacuum oven for 2 hours; cooled in a desiccator for 30 minutes, and; weighed ($w^f$). The percent loss in weight is the percent hexane extractables ($w^{C6}$): $w^{C6} = 100 \times (w^i - w^f)/w^i$.

EXAMPLES

Pilot Plant Polymerizations

The following examples are presented for the purpose of illustrating selected embodiments of this disclosure, it being understood that, the examples presented hereinafter do not limit the claims presented.

Disclosed embodiments of the ethylene interpolymer products were prepared in a continuous solution pilot plant operated in both series mode and parallel mode as fully described below. Comparative ethylene interpolymer products were also prepared in the same pilot plant.

Series Polymerization

Series mode Examples (Example 1, 2, 4) of ethylene interpolymer products and series mode Comparatives 1 and 2 shown in Tables 4A through 4C were produced using an R1 pressure from about 14 MPa to about 18 MPa; R2 was operated at a lower pressure to facilitate continuous flow from R1 to R2. In series mode the first exit stream from R1 flows directly into R2. Both CSTR's were agitated to give conditions in which the reactor contents were well mixed. The process was operated continuously by feeding fresh process solvent, ethylene, 1-octene and hydrogen to the reactors. Methylpentane was used as the process solvent (a commercial blend of methylpentane isomers). The volume of the first CSTR reactor (R1) was 3.2 gallons (12 L), the volume of the second CSTR reactor (R2) was 5.8 gallons (22 L) and the volume of the tubular reactor (R3) was 0.58 gallons (2.2 L).

The following components were used to prepare the first homogeneous catalyst formulation, a bridged metallocene catalyst formulation comprising: a component A, either diphenylmethylene(cyclopentadienyl)(2,7-di-t-butylfuorenyl)hafnium dichloride [(2,7-tBu$_2$Flu)Ph$_2$C(Cp)HfCl$_2$] (abbreviated CpF-1) or diphenylmethylene-(cyclopentadienyl) (2,7-di-t-butylfuorenyl)hafnium dimethyl, [(2,7-tBu$_2$Flu) Ph$_2$C(Cp)HfMe$_2$] (abbreviated CpF-2); component M, methylaluminoxane (MMAO-07); component B, trityl tetrakis(pentafluoro-phenyl)borate, and; component P, 2,6-di-tert-butyl-4-ethylphenol. As shown in Table 4A, CpF-1 was used to produce Example 1 and CpF-2 was used to produce Examples 2-4. To prepare the bridged metallocene catalyst formulation the following catalyst component solvents were used: methylpentane for components M and P, and xylene for component A and B.

Comparative ethylene interpolymer products were prepare using the third homogeneous catalyst formulation. In Comparative ethylene interpolymer products the third homogeneous catalyst formulation replaces the first homogeneous catalyst formulation. One embodiment of the third homogeneous catalyst formulation was an unbridged single site catalyst formulation comprising: component C, either cyclopentadienyl tri(tertiary butyl)phosphinimine titanium dichloride [Cp[(t-Bu)$_3$PN]TiCl$_2$] (abbreviated PIC-1) or cyclopentadienyl tri(isopropyl)phosphinimine titanium dichloride [Cp[(isopropyl)$_3$PN]TiCl$_2$] (abbreviated PIC-2); component M, methylaluminoxane (MMAO-07); component B, trityl tetrakis(pentafluoro-phenyl)borate, and; component P, 2,6-di-tert-butyl-4-ethylphenol. As shown in Table 4A, PIC-1 was used to produce Comparative 1 and PIC-2 was used to produce Comparative 2. To prepare the unbridged single site catalyst formulation the following catalyst component solvents were used: methylpentane for components M and P, and; xylene for component A and B.

The quantity of CpF-1 or CpF-2 added to reactor 1 (R1) is shown in Table 4A, e.g. "R1 catalyst (ppm)" was 0.872 ppm of CpF-1 in the case of Example 1. The efficiency of the first homogeneous catalyst formulation was optimized by adjusting the mole ratios of the catalyst components and the R1 catalyst inlet temperature. As shown in Table 4A, the mole ratios optimized were: ([M]/[A]), i.e. [(MMAO-07)/(CpF-1)]; ([P]/[M]), i.e. [(2,6-di-tert-butyl-4-ethylphenol)/(MMAO-07)], and; ([B]/[A]), i.e. [(trityl tetrakis(pentafluoro-phenyl)borate)/(CpF-1)]. To be more clear, in Example 1 (Table 4A), the mole ratios in R1 were: ([M]/[A])=74; ([P]/[M])=0.2, and; ([B]/[A])=1.2. As shown in Table 4C, the catalyst inlet temperature of the bridged metallocene catalyst formulation was about 143° C. in the case of CpF-1, and; about 21 to about 31° C. in the case of CpF-2.

In the Comparatives the quantity of PIC-1 or PIC-2 added to reactor 1 (R1) is shown in Table 4A, e.g. "R1 catalyst (ppm)" was 0.10 ppm of PIC-1 in the case of Comparative 1. The efficiency of the third homogeneous catalyst formulation was optimized by adjusting the mole ratios of the catalyst components and the R1 catalyst inlet temperature. As shown in Table 4A, the mole ratios optimized were: ([M]/[C]), i.e. (MMAO-07)/(PIC-1); ([P]/[M]), i.e. (2,6-di-tert-butyl-4-ethylphenol)/-(MMAO-07), and; ([B]/[C]), i.e. (trityl tetrakis(pentafluoro-phenyl)borate)/(PIC-1). To be more clear, as shown in Table 4A, in Comparative 1 the mole ratios in R1 were: ([M]/[C])=100; ([P]/[M])=0.0, and; ([B]/[C])=1.1. As shown in Table 4C, the catalyst inlet temperature of the unbridged single site catalyst formulation was about 21 to about 30° C.

In both Examples and Comparatives, a first heterogeneous catalyst formulation was injected into the second reactor (R2), specifically a first in-line Ziegler-Natta catalyst formulation. The first in-line Ziegler-Natta catalyst formulation was prepared using the following components: component (v), butyl ethyl magnesium; component (vi), tertiary butyl chloride; component (vii), titanium tetrachloride; component (viii), diethyl aluminum ethoxide, and; component (ix), triethyl aluminum. Methylpentane was used as the catalyst component solvent. The first in-line Ziegler-Natta catalyst formulation was prepared using the following steps. In step one, a solution of triethylaluminum and dibutylmagnesium, having a ((dibutylmagnesium)/-((triethylaluminum)) molar ratio of 20 was combined with a solution of tertiary butyl chloride and allowed to react for about 30 seconds (HUT-1); in step two, a solution of titanium tetrachloride was added to the mixture formed in step one and allowed to react for about 14 seconds (HUT-2), and; in step three, the mixture formed in step two was allowed to reactor for an additional 3 seconds (HUT-3) prior to injection into R2. The in-line Ziegler-Natta catalyst formulation was formed in R2 by injecting a solution of diethyl aluminum ethoxide into R2. The quantity of titanium tetrachloride added to reactor 2 (R2) is shown in Table 4A, i.e. "R2 (vii) (ppm)"; to be more clear, in Example 1 the solution in R2 contained 7.28 ppm of TiCl$_4$. The efficiency of the first in-line Ziegler-Natta catalyst formulation was optimized by adjusting the mole ratios of the catalyst components, specifically: ([vi]/[v]), i.e. (tertiary butyl chloride)/(butyl ethyl magnesium); ([viii]/[vii]), i.e. (diethyl aluminum ethoxide)/(titanium tetrachloride), and; ([ix]/[vii]), i.e. (triethyl aluminum)/(titanium tetrachloride). To be more clear, in Example 1 (Table 4A) the mole ratios in R2 were: ([vi]/[v])=1.87; ([viii]/[vii])=1.35, and; ([ix]/[vii])=0.35. Referring to FIG. 2, in both Examples and Comparatives, 100% of the diethyl aluminum ethoxide in stream 10d, component (viii), was added to reactor 12a via stream 10h.

Average residence time of the solvent in a reactor is primarily influenced by the amount of solvent flowing through each reactor and the total amount of solvent flowing through the solution process, the following are representative or typical values for the Examples and Comparatives shown in Tables 4A-4C: average reactor residence times were: about 61 seconds in R1, about 73 seconds in R2, about 7.3 seconds for an R3 volume of 0.58 gallons (2.2 L).

Polymerization in the continuous solution polymerization process was terminated by adding a catalyst deactivator to the third exit stream exiting the tubular reactor (R3). The catalyst deactivator used was octanoic acid (caprylic acid), commercially available from P&G Chemicals, Cincinnati, Ohio, U.S.A. The catalyst deactivator was added such that the moles of fatty acid added were 50% of the total molar amount of hafnium, titanium and aluminum added to the polymerization process; to be clear, the moles of octanoic acid added=0.5×(moles hafnium+moles titanium+moles aluminum); this mole ratio was consistently used in both Examples and Comparatives.

A two-stage devolitizing process was employed to recover the ethylene interpolymer product from the process solvent, i.e. two vapor/liquid separators were used and the second bottom stream (from the second V/L separator) was passed through a gear pump/pelletizer combination. DHT-4V (hydrotalcite), supplied by Kyowa Chemical Industry Co. LTD, Tokyo, Japan was used as a passivator, or acid scavenger, in the continuous solution process. A slurry of DHT-4V in process solvent was added prior to the first V/L separator. The molar amount of DHT-4V added was 10-fold higher than the molar amount of tertiary butyl chloride and titanium tetrachloride added to the solution process.

Prior to pelletization the ethylene interpolymer product was stabilized by adding 500 ppm of Irganox 1076 (a primary antioxidant) and 500 ppm of Irgafos 168 (a secondary antioxidant), based on weight of the ethylene interpolymer product. Antioxidants were dissolved in process solvent and added between the first and second V/L separators.

Tables 4A-4C disclose additional process parameters, e.g. ethylene and 1-octene splits between the reactors, and reactor temperatures and ethylene conversions, etc. In Tables 4A-4C the targeted ethylene interpolymer product was about 1.0 melt index ($I_2$) (as measured according to ASTM D1239, 2.16 kg load, 190° C.) and about 0.917 g/cm³ (as measured according to ASTM D792).

Parallel Polymerization

The pilot plant described above was reconfigured to operate in parallel mode. In parallel mode the first exit stream (exiting the first reactor) by-passes the second reactor and the first exit stream is combined with the second exit stream (exiting the second reactor) downstream of the second reactor. To be more clear, FIG. 2 illustrates parallel mode operation where: the first exit stream 11g (dotted line) by-passes the second reactor 12a, streams 11g and 12c (second exit stream from reactor 12a) are combined to form a third exit stream 12d, and; the third exit stream flows into the tubular reactor 17. As shown in Tables 4A through 4C, Example 3 is one embodiment of an ethylene interpolymer product synthesized using the parallel mode of operation. Catalyst optimization and additional process parameters for Example 3, e.g. ethylene and 1-octene splits between the reactors, and reactor temperatures and ethylene conversions, etc., are summarized in Tables 4A-4C.

Given the continuous solution polymerization conditions shown in Table 4A through Table 4C, the resulting ethylene interpolymer products produced are summarized in Table 5. Table 5 also includes the following commercially available products: Comparative 10 and Comparative 11 are commercially available solution process ethylene/1-octene polymers produced by NOVA Chemicals Company (Calgary, Alberta, Canada) SURPASS© SPs116-C03 and SURPASS@ VPsK914-A01, respectively, both of these products were produced using the unbridged single site catalyst formulation in reactor 1 and the in-line Ziegler-Natta catalyst formulation in reactor 2. As shown in Table 5, Neutron Activation Analysis results disclose catalyst residues in Examples 3-4 and Comparatives 1, 2, 10 and 11.

Figure 5:
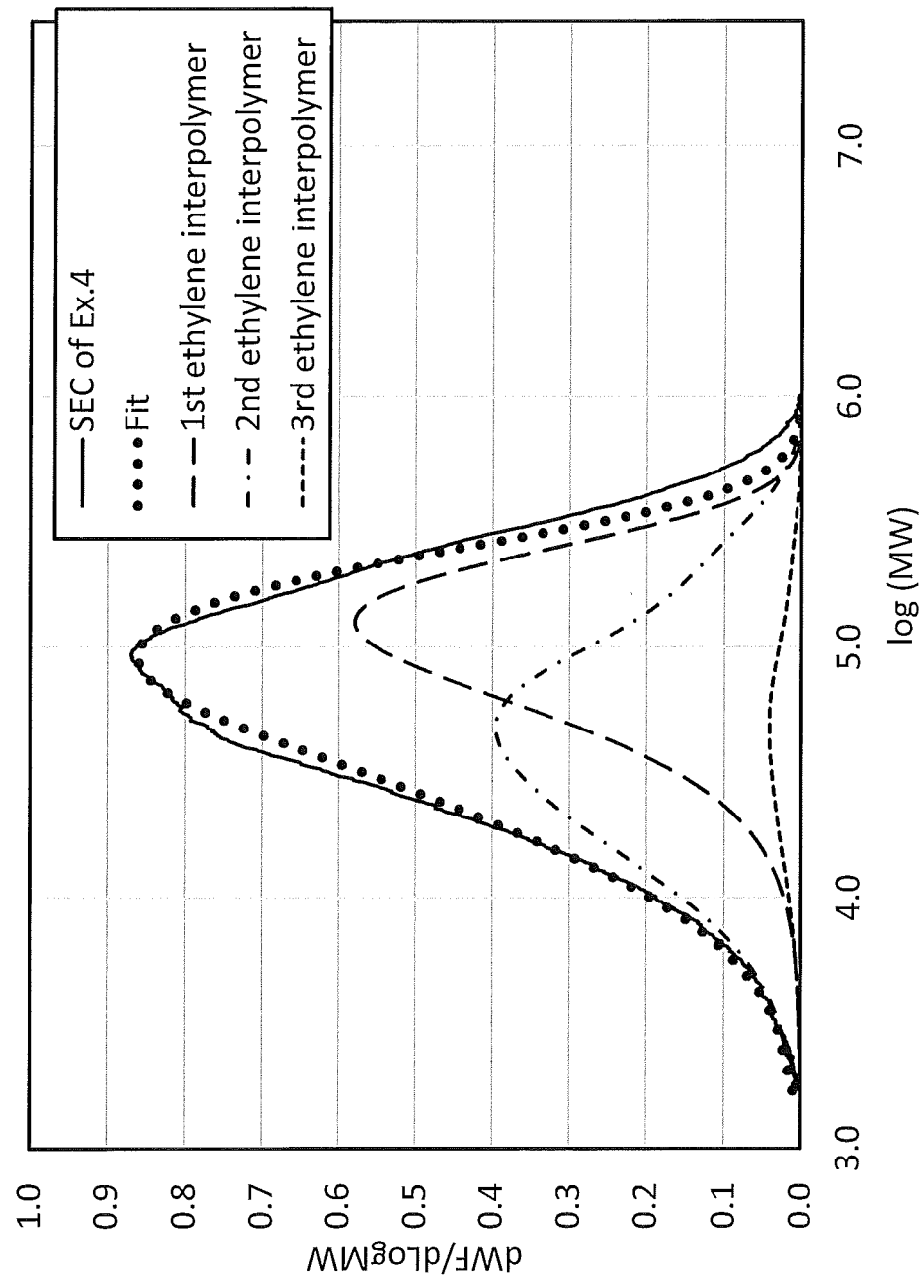
FIG. 5 deconvolution of ethylene interpolymer product Example 4 into a first, second and third ethylene interpolymer.

Table 6 compares physical attributes of Example 4 with Comparative 1. The weight fractions, molecular weights ($M_n$, $M_w$ and $M_w/M_n$), branching (#C6/1000 C), $CDBI_{50}$, density, melt index and long chain branching factor (LDBF) of the first ethylene interpolymer, second ethylene interpolymer, third ethylene interpolymer and the ethylene interpolymer product are disclosed. Results in Table 6 were generated by deconvoluting the SEC and CTREF curves of Example 4 and Comparative 1 into their respective components. Graphically, FIG. 5 illustrates the deconvolution of the experimentally measured SEC of Example 4 into three components, i.e. the first, second and third ethylene interpolymer. In Example 4 the first ethylene interpolymer having a density of 0.8943 g/cm³ was produced using an $((1\text{-octene})/(\text{ethylene}))^{R1}$ weight ratio of 0.41. In contrast, in Comparative 1 the first ethylene interpolymer density having a density of 0.9112 g/cm³ was produced using an $((1\text{-octene})/\text{-}(\text{ethylene}))^{R1}$ weight ratio of 0.66. Even though Example 4 was produced with a 40% lower octene/ethylene ratio, relative to Comparative 1, the first ethylene interpolymer in Example 2 was of lower density. Both of these trends shown by Example 4 employing the bridged metallocene catalyst formulation, i.e. a lower (octene/ethylene) ratio and a lower density are advantageous, relative to Comparative 1 employing the unbridged single site catalyst formulation. Table 6 also discloses a $\Delta\rho$, $(\rho^2-\rho^1)$ or [(the density of the second ethylene interpolymer)−(the density of the first ethylene interpolymer)], was higher in Example 4 relative to Comparative 1. Specifically, $\Delta\rho$ was 0.0481 and 0.0087 g/cm³ for Example 4 and Comparative 1, respectively. Higher $\Delta\rho$'s are advantageous in several end-use applications. In FIG. 5: the molecular weight distribution of the first ethylene interpolymer was assumed to similar to a Flory distribution; the molecular weight distribution of the second ethylene interpolymer (produced with the multi-site in-line Ziegler-Natta catalyst formulation), having a $M_w/M_n$ of 3.09, was fit using four Flory distributions; the molecular weight distribution of the third ethylene interpolymer was assumed to be the same as the second ethylene interpolymer. The weight percent of the third ethylene interpolymer was assumed to be 5%.

As shown in Table 6, the weight average molecular weights ($M_w$) of the first ethylene interpolymers in Example 4 and Comparative 1 were 126,051 and 137,984, respectively. The lower $M_w$ of the first ethylene interpolymer in Example 4 reflects the fact that reactor 1 contained 5.35 ppm of hydrogen; in contrast, in Comparative 1 the first ethylene interpolymer was synthesized using 0.6 ppm of hydrogen in reactor 1. Those of ordinary experience are cognizant of the fact that hydrogen is used to control $M_w$ (or melt index) in olefin polymerization, i.e. hydrogen is very effective in terminating propagating macromolecules. Further, given Table 6, those of ordinary experience would have recognized the higher molecular weight capability of the bridged metallocene catalyst relative to the unbridged single site catalyst. Elaborating, relative to Comparative 1, the amount of hydrogen used to synthesize the first ethylene interpolymer in Example 4 was an order of magnitude higher, and yet the $M_w$'s differed by only 8.6%. In addition, Example 4 was produced at a higher reactor temperature (141° C.), relative to Comparative 1 (135° C.). These trends of higher hydrogen concentration and higher reactor temperature for the bridged metallocene catalyst formulation, relative to the unbridged single site catalyst formulation, demonstrate the higher molecular weight capability of the former.

Blown Films: Ethylene Interpolymer Products

Monolayer blown films were produced on a Gloucester extruder, 2.5 inch (6.45 cm) barrel diameter, 24/1 L/D (barrel Length/barrel Diameter) equipped with: a barrier screw; a low pressure 4 inch (10.16 cm) diameter die with a 35 mil (0.089 cm) die gap, and; a Western Polymer Air ring. Blown films, 1.0 mil (25 μm) thick, were produced at a constant output rate of 100 lb/hr (45.4 kg/hr) by adjusting extruder screw speed, and; the frost line height was maintained at about 16 inch (40.64 cm) by adjusting the cooling air. Blown film processing conditions for Examples 3 and 4 and Comparatives 10 and 11 are disclosed in Table 7. Monolayer blown film was also produced at 2.0 mil (51 μm) and 3.5 mil (89 μm) to determine the seal initiation temperature (SIT) and hexane extractables, respectively. Processing aid, encapsulated in a polyethylene masterbatch, was added to all resins prior to film extrusion; the processing aid added was Dynamar FX 5920A (commercially available from The 3M Company, St. Paul, Minn., USA).

As shown in Table 7, in blown film processes, Examples 3 and 4 have improved processability relative to Comparative 10 and 11, i.e. lower extrusion pressures and lower extruder current draw. This improvement in processability was evident even though Examples 3 and 4, had lower to equivalent melt indexes, relative to Comparative 10 and 11. Improved processability is desirable to the film converter because improved processability means higher production rates, e.g. an increase in the pounds of film produced per hour, or feet (meters) of film produced per hour.

As shown in Table 8A, relative to Comparative 10 and 11, blown films produced from Examples 3 and 4 can be advantageously used in any film application where improved film hexane extractables are desired, e.g. in food packaging applications. The hexane extractables of a blown film prepared from Example 3 were: 48% lower relative to Comparative 10, and 44% lower relative to Comparative 11. The hexane extractables of a blown film prepared from Example 4 were: 62% lower relative to Comparative 10, and 59% lower relative to Comparative 11.

As shown in Table 8A, the seal initiation temperature (SIT) of the film prepared from Example 3 (parallel solution process) was 83.0° C.; which was improved (i.e. lower by 14%) relative to Comparative 10's SIT of 96.9° C. Relative to Comparative 11, having an SIT of 88.1° C., the film produced from Example 3 was 6% improved (lower in SIT). Lower SIT's are desirable in food packaging applications, e.g. high speed vertical form-fill-seal food packaging lines.

As shown in Table 8A, the machine direction Elmendorf tear strength of the film prepared from Example 3 (parallel solution process) was 321 g; i.e. improved relative to Comparative 10 and 11's Elmendorf film tear strength of 270 and 277 g, respectively; percent improvements were 19 and 16%, respectively. Higher Elmendorf tear strengths are desirable in a myriad of film applications, for example consumer food bags and packages has industrial shipping bags and liners. Similarly, the transverse direction Elmendorf tear strength of the film prepared from Example 3 (parallel solution process) was 670 g; i.e. improved relative to Comparative 10 and 11's transverse direction Elmendorf film tear strengths of 541 and 533 g, respectively; percent improvements were 24 and 26%, respectively.

As shown in Table 8B, relative to Comparative 10 and 11, blown films produced from Examples 3 and 4 can be advantageously used in film application where higher film moduli are desired. One of the desirable features of higher film moduli is the ability to reduce film thickness, reducing film thickness contributes to source reduction, sustainability and reduces overall costs. The machine direction 1% secant modulus of Example 3 (222 MPa) was 39% improved (higher) relative to Comparative 10 (160 MPa) and 54% improved relative to Comparative 11 (144 MPa), and; the transverse direction 1% secant modulus of Example 3 (251 MPa) was 52% and 72% improved relative to Comparative 10 (165 MPa) and Comparative 11 (146 MPa), respectively. Similarly, the machine direction 1% secant modulus of Example 4 (207 MPa) was 29% improved (higher) relative to Comparative 10 and 44% improved relative to Comparative 11 and; the transverse direction 1% secant modulus of Example 4 (236) was 43% and 62% improved relative to Comparative 10 and 11, respectively. This same trend was also evident in the 2% secant modulus. Specifically, the machine direction 2% secant modulus of Example 3 (187 MPa) was 34% improved (higher) relative to Comparative 10 (140 MPa) and 52% improved relative to Comparative 11 (123 MPa), and; the transverse direction 2% secant modulus of Example 3 (210 MPa) was 48% and 69% improved relative to Comparative 10 (142 MPa) and Comparative 11 (124 MPa), respectively. Similarly, the machine direction 2% secant modulus of Example 4 (174 MPa) as 24% improved (higher) relative to Comparative 10 and 41% improved relative to Comparative 11 and; the transverse direction 2% secant modulus of Example 4 (199 MPa) was 40% and 60% improved relative to Comparative 10 and 11, respectively.

Table 8B also shows improved (higher) tensile yield strength for Example 3 and 4 films, relative to Comparative 10 and 11 films. Higher yield strengths reduce the tendency of a loaded package to yielding, deform or distort under its own weight. The machine direction tensile yield strength of a blown film prepared from Example 3 was 10.0 MPa, which was 19% improved (higher) relative to Comparative 10 (8.4 MPa) and 30% higher relative to Comparative 11 (7.7 MPa), and the transverse direction tensile yield strength was 26% and 48% improved relative to Comparative (8.6 MPa) and Comparative 11 (7.3 MPa), respectively. The machine direction tensile yield strength of a blown film prepared from Example 4 was 9.8 MPa, which was 17% improved (higher) relative to Comparative 10 and 27% higher relative to Comparative 11, and the transverse direction tensile yield strength was 24% and 47% improved relative to Comparative 10 and 11, respectively.

Continuous Polymerization Unit (CPU)

Comparison Of Catalyst Formulations In One Reactor

Small scale continuous solution polymerizations were conducted on a Continuous Polymerization Unit, hereinafter CPU. The purpose of these experiments were to directly compare the performance of the bridged metallocene catalyst formulation (containing component A, CpF-1) with the unbridged single site catalyst formulation (containing component C, PIC-1) in one polymerization reactor.

The single reactor of the CPU was a 71.5 mL continuously stirred CSTR, polymerizations were conducted at 130° C., 160° C. or 190° C. and the reactor pressure was about 10.5 MPa. The CPU included a 20 mL upstream mixing chamber that was operated at a temperature that was 5° C. lower than the downstream polymerization reactor. The upstream mixing chamber was used to pre-heat the ethylene, optional α-olefin and a portion of the process solvent. Catalyst feeds and the remaining solvent were added directly to the polymerization reactor as a continuous process. The total flow rate to the polymerization reactor was held constant at 27 mL/minute. The components of the bridged metallocene catalyst formulation (component A, component M, component B and component P) were added directly to the polymerization reactor to maintain the continuous polymerization process. More specifically: component A and component B were premixed in xylene and injected directly into the reactor, and component M and optionally component P were premixed in process solvent and injected directly into the reactor. In the comparative experiments, the components of the unbridged single site catalyst formulation (component C, component M, component B and component P) were added directly to the polymerization reactor to maintain the continuous polymerization process. More specifically: component C and component B were premixed in xylene and injected directly into the reactor, and component M and optionally component P were premixed in process solvent and injected directly into the reactor. In the examples, the component A employed was CpF-1 [(2,7-tBu$_2$Flu)Ph$_2$C(Cp)HfCl$_2$]. In the comparatives, the component C employed was PIC-1 ([Cp[(t-Bu)$_3$PN]TiCl$_2$]). Components M, B and P were methylaluminoxane (MMAO-07), trityl tetrakis(pentafluoro-phenyl)borate, and 2,6-di-tert-butyl-4-ethylphenol, respectively. Upon injection, the catalyst was activated in situ (in the polymerization reactor) in the presence of ethylene and optional α-olefin comonomer. Component M was added such that the mole ratio of ([M]/[A]) or ([M]/[C]) was about 80; component B was added such that the mole ratio of ([M]/[A]) or ([M]/[C]) was about 1.0, and; component P was added such that the mole ratio of ([P]/[M]) was about 0.4.

Ethylene was supplied to the reactor by a calibrated thermal mass flow meter and was dissolved in the reaction solvent prior to the polymerization reactor. Optional comonomer (1-octene) was premixed with ethylene before entering the polymerization reactor, the (1-octene)/(ethylene) weight ratio varied from 0 to about 6.0. Ethylene was fed to the reactor such that the ethylene concentration in the reactor varied from about 7 to about 15 weight %; where weight % is the weight of ethylene divided by the total weight of the reactor contents. The internal reaction temperature was monitored by a thermocouple in the polymerization medium and was controlled at the target set point to ±0.5° C. Solvent, monomer, and comonomer streams were all purified by the CPU systems prior to entering the reactor.

The ethylene conversion, $Q^{CPU}$ i.e. the fraction of ethylene converted was determined by an online gas chromatograph (GC) and polymerization activity, $K_p^{CPU}$ having dimensions of [L/(mmol-min)] was defined as:

$$K_p^{CPU} = Q^{CPU}\left(\frac{1 - Q^{CPU}}{[\text{catalyst}] \times HUT^{CPU}}\right)$$

where $HUT^{CPU}$ was a reciprocal space velocity (Hold Up Time) in the polymerization reactor having dimensions of minutes (min), and [catalyst] was the concentration of catalyst in the polymerization reactor expressed in mmol/L of titanium or hafnium. In some CPU experiments, $Q^{CPU}$ was held constant at about 90% and the $HUT^{CPU}$ was held constant at about 2.5 minutes. In other CPU experiments, $Q^{CPU}$ was varied from about 75 to about 95%. Downstream of the reactor the pressure was reduced to atmospheric pressure. The polymer product was recovered as a slurry in the process solvent and subsequently dried by evaporation in a vacuum oven prior to characterization.

At a polymerization temperature of 130° C., the CPU conditions were adjusted to synthesize ethylene interpolymers at approximately constant melt index and density; specifically, a first ethylene interpolymer synthesized with the bridged metallocene catalyst formulation and a comparative ethylene interpolymer produced with the unbridged single site catalyst formulation. As shown by each row in Table 9A, at a reactor temperature of 130° C., the bridged metallocene catalyst formulation produced an improved (higher) SEC weight average molecular weight ($M_w^A$), relative to the comparative unbridged single site catalyst formulation ($M_w^C$). The percent improvement in $M_w$ was at least 5% as calculated using the following formula:

% Improved $M_w = 100\% \times (M_w^A - M_w^C)/M_w^C$

Similarly, at a polymerization temperature of 160° C., each row of Table 9B shows that the bridged metallocene catalyst formulation produced an improved (higher) SEC weight average molecular weight ($M_w^A$), relative to the comparative unbridged single site catalyst formulation ($M_w^C$). The percent improvement in $M_w$ was at least 10%.

As shown in Table 10A, at a polymerization temperature of 130° C., the (α-olefin/ethylene) weight ratio in the reactor had to be adjusted such that ethylene interpolymers were produced having a target density. More specifically, (α-olefin/ethylene)$^A$ was required to synthesize a first ethylene interpolymer, having a target density, using the bridged metallocene catalyst formulation. In contrast, (α-olefin/ethylene)$^C$ was required to synthesize a control ethylene interpolymer, having the target density, using the unbridged single site catalyst formulation. As shown by each row in Table 10A, at 130° C., the bridged metallocene catalyst formulation allows the operation of the continuous solution polymerization process at an improved (reduced) (α-olefin/ethylene) weight ratio, relative to the control unbridged single site catalyst formulation. The percent reduction in (α-olefin/ethylene) weight ratio was at least −70% as calculated using the following formula:

$$\% \text{ Reduced}\left[\frac{\alpha - \text{olefin}}{\text{ethylene}}\right] =$$

$$100 \times \left\{\frac{\left(\frac{\alpha - \text{olefin}}{\text{ethylene}}\right)^A - \left(\frac{\alpha - \text{olefin}}{\text{ethylene}}\right)^C}{\left(\frac{\alpha - \text{olefin}}{\text{ethylene}}\right)^C}\right\} \leq -70\%$$

Similarly, at a polymerization temperature of 160° C., each row of Table 10B shows that the bridged metallocene catalyst formulation allows the operation of the continuous solution polymerization process at an improved (reduced) (α-olefin/ethylene) weight ratio, relative to the control unbridged single site catalyst formulation. In Table 10B, the percent reduction in (α-olefin/ethylene) weight ratio was at least −70%.

CPU experiments were also conducted to collect samples of the first ethylene interpolymer, produced with the bridged metallocene catalyst formulation, for characterization, specifically, $^{13}$C NMR analysis to quantify long chain branching (LCB). Table 11 summarizes typical CPU process conditions at three reactor temperatures (130, 160 and 190° C.) and two levels of ethylene conversion (about 75 wt % and about 95 wt %). Polymer characterization data (first ethylene interpolymer produced with the bridged metallocene catalyst formulation) is summarized in Table 12. As shown in Table 12, the amount of long chain branching (LCB) in the ethylene interpolymer synthesized using the bridged metallocene catalyst formulation varied from 0.03 to 0.23 LCB per 1000 carbon atoms.

TABLE 1A

Reference resins (linear ethylene polymers) containing undetectable levels of Long Chain Branching (LCB).

| Reference Resins | Mv (g/mole) | [η] (dL/g) | $M_w/M_n$ | A | SCBD $CH_3\#/$ 1000 C | ZSV (poise) |
|---|---|---|---|---|---|---|
| Resin 1 | 1.06E+05 | 1.672 | 2.14 | 1.9772 | 10.5 | 7.81E+04 |
| Resin 2 | 1.11E+05 | 1.687 | 2.00 | 1.9772 | 11.2 | 7.94E+04 |
| Resin 3 | 1.06E+05 | 1.603 | 1.94 | 1.9772 | 15.9 | 7.28E+04 |
| Resin 4 | 1.07E+05 | 1.681 | 1.91 | 1.9772 | 11.0 | 8.23E+04 |
| Resin 5 | 7.00E+04 | 1.192 | 2.11 | 1.9772 | 13.7 | 1.66E+04 |
| Resin 6 | 9.59E+04 | 1.497 | 1.88 | 1.9772 | 12.6 | 5.73E+04 |
| Resin 7 | 1.04E+05 | 1.592 | 1.85 | 1.9772 | 12.8 | 6.60E+04 |
| Resin 8 | 5.09E+04 | 0.981 | 2.72 | 2.1626 | 0.0 | 6.42E+03 |
| Resin 9 | 5.27E+04 | 0.964 | 2.81 | 2.1626 | 0.0 | 6.42E+03 |
| Resin 10 | 1.06E+05 | 1.663 | 1.89 | 1.1398 | 13.3 | 7.69E+04 |
| Resin 11 | 1.10E+05 | 1.669 | 1.81 | 1.1398 | 19.3 | 7.31E+04 |
| Resin 12 | 1.07E+05 | 1.606 | 1.80 | 1.1398 | 27.8 | 6.99E+04 |
| Resin 13 | 6.66E+04 | 1.113 | 1.68 | 2.1626 | 17.8 | 1.39E+04 |
| Resin 14 | 6.62E+04 | 1.092 | 1.76 | 2.1626 | 21.4 | 1.45E+04 |
| Resin 15 | 6.83E+04 | 1.085 | 1.70 | 2.1626 | 25.3 | 1.44E+04 |
| Resin 16 | 7.66E+04 | 1.362 | 2.51 | 2.1626 | 4.0 | 3.24E+04 |
| Resin 17 | 6.96E+04 | 1.166 | 2.53 | 2.1626 | 13.9 | 2.09E+04 |
| Resin 18 | 6.66E+04 | 1.134 | 2.54 | 2.1626 | 13.8 | 1.86E+04 |
| Resin 19 | 5.81E+04 | 1.079 | 2.44 | 2.1626 | 5.8 | 1.10E+04 |
| Resin 20 | 7.85E+04 | 1.369 | 2.32 | 2.1626 | 3.7 | 3.34E+04 |
| Resin 21 | 6.31E+04 | 1.181 | 2.26 | 2.1626 | 4.3 | 1.61E+04 |
| Resin 22 | 7.08E+04 | 1.277 | 2.53 | 2.1626 | 3.6 | 2.58E+04 |
| Resin 23 | 9.91E+04 | 1.539 | 3.09 | 2.1626 | 14.0 | 8.94E+04 |
| Resin 24 | 1.16E+05 | 1.668 | 3.19 | 2.1626 | 13.3 | 1.32E+05 |
| Resin 25 | 1.12E+05 | 1.689 | 2.71 | 2.1626 | 12.8 | 1.38E+05 |
| Resin 26 | 1.14E+05 | 1.690 | 3.37 | 2.1626 | 8.0 | 1.48E+05 |
| Resin 27 | 9.55E+04 | 1.495 | 3.44 | 2.1626 | 13.8 | 8.91E+04 |
| Resin 28 | 1.00E+05 | 1.547 | 3.33 | 2.1626 | 14.1 | 9.61E+04 |
| Resin 29 | 1.07E+05 | 1.565 | 3.52 | 2.1626 | 13.0 | 1.12E+05 |
| Resin 30 | 1.04E+05 | 1.525 | 3.73 | 2.1626 | 13.4 | 1.10E+05 |
| Resin 31 | 1.10E+05 | 1.669 | 3.38 | 2.1626 | 8.7 | 1.26E+05 |
| Resin 32 | 1.09E+05 | 1.539 | 3.42 | 2.1626 | 13.4 | 1.07E+05 |
| Resin 33 | 8.04E+04 | 1.474 | 5.29 | 2.1626 | 1.7 | 7.60E+04 |

TABLE 1A-continued

Reference resins (linear ethylene polymers) containing undetectable levels of Long Chain Branching (LCB).

| Reference Resins | Mv (g/mole) | [η] (dL/g) | $M_w/M_n$ | A | SCBD $CH_3$#/1000 C | ZSV (poise) |
|---|---|---|---|---|---|---|
| Resin 34 | 8.12E+04 | 1.410 | 7.64 | 2.1626 | 0.9 | 9.11E+04 |
| Resin 35 | 7.56E+04 | 1.349 | 9.23 | 2.1626 | 1.0 | 9.62E+04 |
| Resin 36 | 7.34E+04 | 1.339 | 8.95 | 2.1626 | 1.1 | 1.00E+05 |
| Resin 37 | 1.01E+05 | 1.527 | 3.76 | 2.1626 | 13.3 | 1.11E+05 |

TABLE 1B

Long Chain Branching Factor (LCBF) of reference resins (linear ethylene polymers) containing undetectable levels of Long Chain Branching (LCB).

| Reference Resins | Log $ZSV_c$ (log(poise)) | Log $IV_c$ log(dL/g) | $S_h$ (dimensionless) | $S_v$ (dimensionless) | LCBF (dimensionless) |
|---|---|---|---|---|---|
| Resin 1 | 4.87E+00 | 2.46E−01 | −5.77E−02 | −1.21E−02 | 3.49E−04 |
| Resin 2 | 4.90E+00 | 2.52E−01 | −5.39E−02 | −1.13E−02 | 3.05E−04 |
| Resin 3 | 4.87E+00 | 2.41E−01 | −2.46E−02 | −5.16E−03 | 6.33E−05 |
| Resin 4 | 4.93E+00 | 2.50E−01 | −9.46E−03 | −1.99E−03 | 9.41E−06 |
| Resin 5 | 4.20E+00 | 1.07E−01 | −6.37E−02 | −1.34E−02 | 4.26E−04 |
| Resin 6 | 4.78E+00 | 2.04E−01 | 5.83E−02 | 1.22E−02 | 3.57E−04 |
| Resin 7 | 4.85E+00 | 2.31E−01 | −1.73E−03 | −3.65E−04 | 3.16E−07 |
| Resin 8 | 3.69E+00 | −8.43E−03 | −2.17E−02 | −4.55E−03 | 4.93E−05 |
| Resin 9 | 3.68E+00 | −1.58E−02 | 1.21E−04 | 2.44E−05 | 1.47E−09 |
| Resin 10 | 4.91E+00 | 2.38E−01 | 2.19E−02 | 4.60E−03 | 5.04E−05 |
| Resin 11 | 4.90E+00 | 2.48E−01 | −2.96E−02 | −6.21E−03 | 9.17E−05 |
| Resin 12 | 4.88E+00 | 2.42E−01 | −1.99E−02 | −4.19E−03 | 4.17E−05 |
| Resin 13 | 4.21E+00 | 9.14E−02 | 2.36E−02 | 4.96E−03 | 5.86E−05 |
| Resin 14 | 4.21E+00 | 9.22E−02 | 1.89E−02 | 3.97E−03 | 3.75E−05 |
| Resin 15 | 4.22E+00 | 1.00E−01 | −9.82E−03 | −2.06E−03 | 1.01E−05 |
| Resin 16 | 4.42E+00 | 1.44E−01 | −1.23E−02 | −2.59E−03 | 1.60E−05 |
| Resin 17 | 4.23E+00 | 1.01E−01 | −4.64E−03 | −9.75E−04 | 2.26E−06 |
| Resin 18 | 4.18E+00 | 8.91E−02 | 1.66E−03 | 3.47E−04 | 2.87E−07 |
| Resin 19 | 3.97E+00 | 4.73E−02 | −1.09E−02 | −2.29E−03 | 1.25E−05 |
| Resin 20 | 4.47E+00 | 1.45E−01 | 2.28E−02 | 4.78E−03 | 5.44E−05 |
| Resin 21 | 4.16E+00 | 8.23E−02 | 1.78E−02 | 3.73E−03 | 3.31E−05 |
| Resin 22 | 4.32E+00 | 1.15E−01 | 2.45E−02 | 5.14E−03 | 6.30E−05 |
| Resin 23 | 4.78E+00 | 2.22E−01 | −2.25E−02 | −4.73E−03 | 5.31E−05 |
| Resin 24 | 4.94E+00 | 2.56E−01 | −3.13E−02 | −6.57E−03 | 1.03E−04 |
| Resin 25 | 5.02E+00 | 2.59E−01 | 3.91E−02 | 8.21E−03 | 1.60E−04 |
| Resin 26 | 4.97E+00 | 2.48E−01 | 3.94E−02 | 8.27E−03 | 1.63E−04 |
| Resin 27 | 4.74E+00 | 2.09E−01 | −2.83E−03 | −5.95E−04 | 8.42E−07 |
| Resin 28 | 4.79E+00 | 2.24E−01 | −3.13E−02 | −6.57E−03 | 1.03E−04 |
| Resin 29 | 4.83E+00 | 2.28E−01 | −2.96E−03 | −6.22E−04 | 9.20E−07 |
| Resin 30 | 4.80E+00 | 2.18E−01 | 1.47E−02 | 3.08E−03 | 2.26E−05 |
| Resin 31 | 4.90E+00 | 2.44E−01 | −1.40E−02 | −2.94E−03 | 2.06E−05 |
| Resin 32 | 4.82E+00 | 2.23E−01 | 1.27E−02 | 2.66E−03 | 1.69E−05 |
| Resin 33 | 4.51E+00 | 1.72E−01 | −6.37E−02 | −1.34E−02 | 4.26E−04 |
| Resin 34 | 4.45E+00 | 1.52E−01 | −2.68E−02 | −5.62E−03 | 7.52E−05 |
| Resin 35 | 4.40E+00 | 1.33E−01 | 1.55E−02 | 3.26E−03 | 2.53E−05 |
| Resin 36 | 4.43E+00 | 1.30E−01 | 5.82E−02 | 1.22E−02 | 3.55E−04 |
| Resin 37 | 4.80E+00 | 2.17E−01 | 1.77E−02 | 3.71E−03 | 3.28E−05 |

TABLE 2

Long Chain Branching Factor (LCBF) of ethylene interpolymer product Examples 1-4 relative to Comparatives 1, 2, 10 and 11.

| | Example 1 | Example 2 | Example 3 | Example 4 | Comp. 1 | Comp. 2 | Comp. 10 | Comp. 11 |
|---|---|---|---|---|---|---|---|---|
| Mv (g/mole) | 9.64E+04 | 9.60E+04 | 1.02E+05 | 1.04E+05 | 9.84E+04 | 1.04E+05 | 9.90E+04 | 1.11E+05 |
| [η] (dL/g) | 1.432 | 1.426 | 1.410 | 1.433 | 1.515 | 1.557 | 1.494 | 1.565 |
| Mw/Mn | 3.03 | 2.40 | 2.23 | 2.99 | 3.09 | 2.59 | 3.70 | 2.51 |
| A | 2.1626 | 2.1626 | 2.1626 | 2.1626 | 2.1626 | 2.1626 | 2.1626 | 2.1626 |
| SCB ($CH_3$#/1000 C) | 15.3 | 15.8 | 19.8 | 16.7 | 14.1 | 14.7 | 15.6 | 18.1 |
| ZSV (poise) | 1.05E+05 | 1.14E+05 | 1.58E+05 | 2.47E+05 | 1.06E+05 | 1.05E+05 | 9.09E+04 | 1.03E+05 |
| Log $ZSV_c$ (log(poise)) | 4.86E+00 | 4.99E+00 | 5.16E+00 | 5.24E+00 | 4.86E+00 | 4.92E+00 | 4.72E+00 | 4.93E+00 |
| Log $IVc$ (log(dL/g)) | 1.95E−01 | 1.95E−01 | 2.02E−01 | 2.02E−01 | 2.15E−01 | 2.29E−01 | 2.14E−01 | 2.41E−01 |
| $S_h$ (dimensionless) | 1.80E−01 | 3.08E−01 | 4.42E−01 | 5.27E−01 | 8.16E−02 | 8.04E−02 | −4.61E−02 | 2.50E−02 |

TABLE 2-continued

Long Chain Branching Factor (LCBF) of ethylene interpolymer product
Examples 1-4 relative to Comparatives 1, 2, 10 and 11.

|  | Example 1 | Example 2 | Example 3 | Example 4 | Comp. 1 | Comp. 2 | Comp. 10 | Comp. 11 |
|---|---|---|---|---|---|---|---|---|
| $S_v$ (dimensionless) | 3.77E−02 | 6.46E−02 | 9.29E−02 | 1.11E−01 | 1.71E−02 | 1.69E−02 | −9.67E−03 | 5.26E−03 |
| LCBF (dimensionless) | 3.39E−03 | 9.94E−03 | 2.05E−02 | 2.91E−02 | 7.00E−04 | 6.78E−04 | 2.23E−04 | 6.58E−05 |

TABLE 3

Long Chain Branching Factor (LCBF) of Comparative ethylene
polymers: Comparatives A-C and Comparatives D-G.

|  | Comp. A | Comp. B | Comp. C | Comp. D | Comp. E | Comp. F | Comp. G |
|---|---|---|---|---|---|---|---|
| Mv (g/mole) | 8.79E+04 | 8.94E+04 | 8.70E+04 | 9.75E+04 | 1.02E+05 | 1.04E+05 | 9.76E+04 |
| [η] (dL/g) | 1.300 | 1.314 | 1.293 | 1.441 | 1.488 | 1.507 | 1.448 |
| Mw/Mn | 1.88 | 1.80 | 1.89 | 3.04 | 2.85 | 2.79 | 2.89 |
| A | 2.1626 | 2.1626 | 2.1626 | 2.1626 | 2.1626 | 2.1626 | 2.1626 |
| SCB ($CH_3$#/1000 C) | 23.2 | 23.3 | 23.4 | 14.2 | 13.7 | 14.1 | 15.1 |
| ZSV (poise) | 1.51E+05 | 1.51E+05 | 1.53E+05 | 1.56E+05 | 1.43E+05 | 1.55E+05 | 1.35E+05 |
| Log $ZSV_c$ (log(poise)) | 5.20E+00 | 5.22E+00 | 5.21E+00 | 5.03E+00 | 5.02E+00 | 5.06E+00 | 4.99E+00 |
| Log IVc (log(dL/g)) | 1.74E−01 | 1.79E−01 | 1.72E−01 | 1.95E−01 | 2.08E−01 | 2.15E−01 | 2.00E−01 |
| $S_h$ (dimensionless) | 6.22E−01 | 6.14E−01 | 6.35E−01 | 3.51E−01 | 2.76E−01 | 2.90E−01 | 2.87E−01 |
| $S_v$ (dimensionless) | 1.31E−01 | 1.29E−01 | 1.33E−01 | 7.38E−02 | 5.81E−02 | 6.09E−02 | 6.03E−02 |
| LCBF (dimensionless) | 4.06E−02 | 3.96E−02 | 4.23E−02 | 1.30E−02 | 8.03E−03 | 8.83E−03 | 8.65E−03 |
| Ti (ppm) |  | 0.33 ± 0.01[a] |  | 1.5 | 2.2 | 2.2 | 2.0 |
| Hf (ppm) |  | [b] |  | [b] | [b] | [b] | [b] |
| Internal Unsaturations/100 C | 0.006 | 0.006 | 0.006 | 0.004 | 0.004 | 0.004 | 0.004 |
| Side Chain Unsaturations/100 C | 0.001 | 0.025 | 0.025 | 0.002 | 0.003 | 0.002 | 0.004 |
| Terminal Unsaturations/100 C | 0.008 | 0.007 | 0.007 | 0.025 | 0.020 | 0.021 | 0.03 |

[a] average of AFFINITY (3 samples, but not Comp. A-C); via Neutron Activation Analysis (N.A.A.)
[b] undetectable via Neutron Activation Analysis

TABLE 4A

Continuous solution process catalyst parameters for Examples 1-4 and Comparatives 1-2

| Process Parameter | Example 1 | Example 2 | Example 3 | Example 4 | Comp. 1 | Comp. 2 |
|---|---|---|---|---|---|---|
| Reactor Mode | Series | Series | Parallel | Series | Series | Series |
| R1 Catalyst[a] (component A, or component C) | CpF-1 (A) | CpF-2 (A) | CpF-2 (A) | CpF-2 (A) | PIC-1 (C) | PIC-2 (C) |
| R2 Catalyst[b] | ZN | ZN | ZN | ZN | ZN | ZN |
| R1 catalyst (ppm) | 0.872 | 0.262 | 0.380 | 0.380 | 0.100 | 0.280 |
| R1 ([$M^c$]/[A]) or R1 ([M]/[C]) mole ratio | 74 | 64 | 48 | 64.2 | 100 | 40 |
| R1 ([$P^d$]/[M]) mole ratio | 0.20 | 0.16 | 0.15 | 0.16 | 0 | 0.50 |
| R1 ([$B^e$]/[A]) or R1 ([B]/[C]) mole ratio | 1.20 | 1.20 | 1.36 | 1.20 | 1.10 | 1.23 |
| R2 (vii) (ppm) | 7.28 | 3.85 | 7.24 | 5.16 | 4.00 | 7.50 |
| R2 (vi)/(v) mole ratio | 1.87 | 2.07 | 2.07 | 2.07 | 2.04 | 1.80 |
| R2 (viii)/(vii) mole ratio | 1.35 | 1.35 | 1.35 | 1.35 | 1.35 | 1.35 |
| R2 (ix)/(vii) mole ratio | 0.35 | 0.35 | 0.35 | 0.35 | 0.35 | 0.35 |
| Prod. Rate (kg/h) | 78.2 | 74.8 | 61.5 | 72.0 | 88.2 | 76.7 |

[a] Catalysts: CpF-1 = [(2,7-tBu$_2$Flu)Ph$_2$C(Cp)HfCl$_2$]; CpF-2 = [(2,7-tBu$_2$Flu)Ph$_2$C(Cp)HfMe$_2$]; PIC-1 = [Cp[(t-Bu)$_3$PN]TiCl$_2$], and; PIC-2 = [Cp[(isopropyl)$_3$PN]TiCl$_2$].
[b] in-line Ziegler-Natta catalyst formulation
[c] methylaluminoxane (MMAO-7)
[d] 2,6-di-tert-butyl-4-ethylphenol
[e] trityl tetrakis(pentafluoro-phenyl)borate

TABLE 4B

Continuous solution process catalyst parameters for Examples 1-4 and Comparatives 1-2.

| Process Parameter | Example 1 | Example 2 | Example 3 | Example 4 | Comp. 1 | Comp. 2 |
|---|---|---|---|---|---|---|
| R3 volume (L) | 2.2 | 2.2 | 2.2 | 2.2 | 2.2 | 2.2 |
| $ES^{R1}$ (%) | 40.0 | 40.0 | 60.0 | 50.0 | 40.0 | 40.0 |
| $ES^{R2}$ (%) | 60.0 | 60.0 | 40.0 | 50.0 | 60.0 | 60.0 |
| $ES^{R3}$ (%) | 0.0 | 0.0 | 0.0 | 0.0 | 0.0 | 0.0 |
| R1 ethylene concentration (wt %) | 11.8 | 12.1 | 11.1 | 9.80 | 10.3 | 8.30 |
| R2 ethylene concentration (wt %) | 13.6 | 13.2 | 13.2 | 13.8 | 15.4 | 13.5 |
| R3 ethylene concentration (wt %) | 13.6 | 13.2 | NA | 13.8 | 15.4 | 13.5 |
| ((1-octene)/(ethylene))$^{R1}$ (wt/wt) | 0.40 | 0.40 | 0.48 | 0.41 | 1.76 | 1.11 |
| ((1-octene)/(ethylene))$^{R2}$ (wt/wt) | 0.67 | 0.52 | 0.0 | 0.201 | 0.0 | 0.0 |
| (1-octene/ethylene) (wt/wt) (total) | 0.56 | 0.47 | 0.29 | 0.31 | 0.66 | 0.40 |
| $OS^{R1}$ (%) | 28 | 34 | 100 | 67 | 100 | 100 |
| $OS^{R2}$ (%) | 72 | 66 | 0.0 | 33 | 0.0 | 0.0 |
| $OS^{R3}$ (%) | 0 | 0 | 0 | 0 | 0 | 0 |
| $H_2^{R1}$ (ppm) | 8.00 | 8.00 | 6.82 | 5.35 | 0.20 | 0.60 |
| $H_2^{R2}$ (ppm) | 1.00 | 0.50 | 2.78 | 18.00 | 3.70 | 1.00 |
| $H_2^{R3}$ (ppm) | 0 | 0 | 0 | 0 | 0 | 0 |

TABLE 4C

Continuous solution process catalyst parameters for Examples 1-4 and Comparatives 1-2.

| Process Parameter | Example 1 | Example 2 | Example 3 | Example 4 | Comp. 1 | Comp. 2 |
|---|---|---|---|---|---|---|
| R1 total solution rate (kg/h) | 276.6 | 261.8 | 352.0 | 387.3 | 360.5 | 341.6 |
| R2 total solution rate (kg/h) | 323.4 | 338.2 | 198.0 | 162.7 | 239.5 | 183.4 |
| R3 solution rate (kg/h) | 0.0 | 0 | 0 | 0 | 0 | 0 |
| Total solution rate (kg/h) | 600 | 600 | 550 | 550 | 600 | 525 |
| R1 feed inlet temp (° C.) | 30 | 30 | 30 | 30 | 30 | 30 |
| R2 feed inlet temp (° C.) | 30 | 30 | 50 | 50 | 30 | 40 |
| R3 feed inlet temp (° C.) | NA | 130 | 130 | 130 | 130 | 130 |
| R1 catalyst inlet temp (° C.) | 143 | 31 | 24 | 21 | 21 | 30 |
| R2 catalyst inlet temp (° C.) | 38 | 38 | 38 | 38 | 38 | 38 |
| R1 Mean temp (° C.) | 164.0 | 164.0 | 154.7 | 141.1 | 141.0 | 135.3 |
| R2 Mean temp (° C.) | 190.3 | 185.0 | 205.7 | 197.7 | 206.0 | 196.1 |
| R3 exit temp (° C.) | 194.7 | 189.3 | 181.6 | 197.4 | 208.0 | 196.6 |
| $Q^{R1}$ (%) | 80.0 | 80.0 | 80.0 | 80.0 | 78.2 | 91.0 |
| $Q^{R2}$ (%) | 80.0 | 80.0 | 95.0 | 81.7 | 80.0 | 83.8 |
| $Q^{(R2+R3)}$ (%) | 83.5 | 83.0 | NA | 84.6 | 80.8 | 86.1 |
| $Q^{R3}$ (%) | 2.4 | 2.0 | NA | 1.7 | 4.0 | 1.5 |
| $Q^{T}$ (%) | 88.7 | 88.4 | 89.9 | 90.8 | 93.4 | 91.1 |

TABLE 5

Physical properties of Examples and Comparatives.

| Physical Property | Example 1 | Example 2 | Example 3 | Example 4 | Comparative 1 | Comparative 2 | Comparative 10 | Comparative 11 |
|---|---|---|---|---|---|---|---|---|
| Density (g/cc) | 0.9178 | 0.9170 | 0.9177 | 0.9170 | 0.9169 | 0.9163 | 0.9156 | 0.9124 |
| Melt Index, $I_2$ (dg/min) | 1.07 | 0.99 | 0.92 | 0.70 | 0.88 | 0.85 | 0.95 | 0.92 |
| Stress Exponent | 1.33 | 1.32 | 1.38 | 1.40 | 1.23 | 1.25 | 1.23 | 1.24 |
| $I_{10}/I_2$ | 7.96 | 7.85 | 8.56 | 8.94 | 7.10 | 7.20 | 7.17 | n/a |
| MFR, $I_{21}/I_2$ | 27.5 | 26.4 | 29.8 | 34.8 | 23.4 | 22.8 | 24.7 | 23.3 |
| SEC, $M_w$ | 100119 | 100544 | 93315 | 106261 | 109444 | 99158 | 112007 | 107517 |
| SEC, $M_w/M_n$ | 3.03 | 2.40 | 2.23 | 2.99 | 3.09 | 2.59 | 3.38 | 2.51 |
| SEC, $M_z/M_w$ | 2.66 | 2.09 | 1.73 | 2.05 | 2.16 | 2.54 | 2.59 | 2.14 |
| $CDBI_{50}$ | 38.4 | 37.3 | 57.0 | 49.8 | 74.8 | 31.1 | 70.4 | 59.7 |
| Branch Freq. ($C_6$/1000 C) | 15.3 | 15.8 | 19.8 | 16.7 | 14.1 | 14.7 | 15.6 | 8.1 |

TABLE 5-continued

Physical properties of Examples and Comparatives.

| Physical Property | Example 1 | Example 2 | Example 3 | Example 4 | Comparative 1 | Comparative 2 | Comparative 10 | Comparative 11 |
|---|---|---|---|---|---|---|---|---|
| Comonomer mole % | 3.1 | 3.2 | 4.0 | 3.3 | 2.8 | 2.9 | 3.1 | 3.6 |
| Ti (ppm) | n/a | n/a | 4.24 | 8.45 | 6.1 | 7.1[a] | | 6.8[b] |
| Hf (ppm) | n/a | n/a | 0.541 | 0.502 | 0.0 | 0.0[a] | | 0.0[b] |
| Al (ppm) | n/a | n/a | 160 | 187 | 97 | 120[a] | | 79[b] |
| Mg (ppm) | n/a | n/a | 327 | 389 | 199 | 247[a] | | 173[b] |
| Cl (ppm) | n/a | n/a | 69.5 | 120 | 99 | 91[a] | | 92[b] |
| Internal Unsaturation/100 C | 0.006 | 0.005 | 0.005 | 0.004 | 0.008 | 0.008[a] | n/a | 0.008 |
| Side Chain Unsaturation/100 C | 0.005 | 0.005 | 0.004 | 0.004 | 0.005 | 0.004[a] | n/a | 0.003 |
| Terminal Unsaturation/100 C | 0.029 | 0.030 | 0.025 | 0.049 | 0.044 | 0.045[a] | n/a | 0.029 |

[a] average of 21 samples, having similar melt index and density, produced in the solution pilot plant.
[b] average of ethylene interpolymer products produced in commercial plant.

TABLE 6

Physical attributes of the first, second and third ethylene interpolymer in Example 4, relative to Comparative 1.

Example 4

| Physical Attribute | Reactor 1 1st Interpoly | Reactor 2 2nd Interpoly | Reactor 3 3rd Interpoly | Example 4 |
|---|---|---|---|---|
| Weight Percent (%) | 51.5 | 43.5 | 5% | 100 |
| $M_n$ | 64729 | 23029 | 23029 | 35536 |
| $M_w$ | 126051 | 71144 | 71144 | 106261 |
| Polydispersity ($M_w/M_n$) | 1.95 | 3.09 | 3.09 | 2.99 |
| BrF (#$C_6$/1000 C) | 30.0 [a] | 2.58 [g] | 2.58 | 16.7 |
| $CDBI_{50}$ (%) (range) | 90 | 60 | 60 | 49.8 |
| Density (g/cm³) | 0.8943 [b] | 0.9424 [f] | 0.9424 | 0.9170 |
| Melt Index (dg/min) | 0.19 [c] | 4.30 [c] | 4.30 | 0.70 |
| LCBF (dimensionless) | 0.0565[d] | [e] | [e] | 0.0291 |

Comparative 1

| Physical Attribute | Reactor 1 1st Interpoly | Reactor 2 2nd Interpoly | Reactor 3 3rd Interpoly | Comparative 1 |
|---|---|---|---|---|
| Weight Percent (%) | 35 | 60 | 5% | 100 |
| $M_n$ | 70678 | 24482 | 24482 | 35419 |
| $M_w$ | 137984 | 76220 | 76220 | 109444 |
| Polydispersity ($M_w/M_n$) | 1.95 | 3.11 | 3.11 | 3.09 |
| BrF (#$C_6$/1000 C) | 14.8 [a] | 13.7 [g] | 13.7 | 14.1 |
| $CDBI_{50}$ (%) (range) | 85 | 60 | 60 | 74.8 |
| Density (g/cm³) | 0.9112 [b] | 0.9200 [f] | 0.9200 | 0.9169 |
| Melt Index (dg/min) | 0.12 [c] | 3.27 [c] | 3.27 | 0.88 |
| LCBF (dimensionless) | [e] | [e] | [e] | 0.0007 |

[a] BrF (#$C_6$/1000 C) = 120.32807 − 2.1647891($T^P_{CTREF}$) + 0.0118658($T^P_{CTREF}$)² − 0.000022($T^P_{CTREF}$)³;; where $T^P_{CTREF}$ is the peak elution temperature of the first ethylene interpolymer in the CTREF chromatogram.

[b] BrF (#$C_6$/1000 C) = 9341.8 ($\rho^1$)² − 17766 ($\rho^1$) + 8446.8, where $\rho^1$ was the density of the first ethylene interpolymer.

[c] Melt Index ($I_2$, dg/min) = 5000[1 + (5.7e−5 × Mw)$^{2.0}$]$^{((-4.5-1)/2.0)}$ + 1.0e−6 where Mw is the Mw of each slice of a MWD with a weight defined by a (wt. fraction * sigmoid function); where the sigmoid function = 1/(1 + exp(−(logMw − 4.2)/0.55))

[d] 0.0582 = $LCBF^{Example\ 4}/(wt^{R1}_{fr})$, where $wt^{R1}_{fr}$ is the weight fraction of the first ethylene interpolymer in Example 4.

[e] LCBF < 0.0001 (undetectable levels of LCB)

[f] density of the second and third ethylene interpolymer given the linear specific volume blending rule and $\rho^1$, $\rho^f$ and weight fractions

[g] BrF(#$C_6$/1000 C) of second and third ethylene interpolymer given linear BrF blending rule and weight fractions

TABLE 7

Blown film processing conditions targeting 1.0 mil (25 μm) film and output rate of 100 lb/hr.

| Processing Parameter | Units | Example 3 | Example 4 | Comp. 10 | Comp. 11 |
|---|---|---|---|---|---|
| Density | (g/cm$^3$) | 0.9177 | 0.9170 | 0.9156 | 0.9124 |
| Melt Index, I$_2$ | (dg/min) | 0.92 | 0.70 | 0.95 | 0.92 |
| Processing Aid | ppm | 800 (FX5920A)[1] | 800 (FX5920A) | 800 (FX5920A) | 800 (FX5920A) |
| Output (lbs/hr) | lb/hr | 100 | 100 | 100 | 100 |
| Melt Temperature | ° F. | 430 | 434 | 430 | 430 |
| Extruder Pressure | psi | 3820 | 3925 | 4145 | 4488 |
| Extruder Current | Amp | 36.2 | 36 | 40 | 40 |
| Extruder Voltage | Volt | 188 | 190 | 190 | 204 |
| Screw Speed | Rpm | 39 | 40 | 40 | 43 |
| Nip Roll Speed | ft/min | 131 | 131 | 130 | 130 |
| Frost Line Height | In | 16 | 16 | 16 | 16 |
| Specific Output | lb/(hr · rpm) | 2.6 | 2.5 | 2.5 | 2.3 |
| Specific Power | lb/(hr · amp) | 2.8 | 2.8 | 2.5 | 2.5 |
| Specific Energy | W/lb/hr | 68.1 | 69.0 | 76.0 | 81.6 |

[1]FX5920 fluoroelastomer processing aid blend available from the 3M Company, St. Paul, MN, U.S.A.

TABLE 8A

Blown film physical properties of Examples and Comparatives; film thickness 1.0 mil (25 μm) unless indicated otherwise.

| Physical Property | Units | Method | Example 3 | Example 4 | Comp. 10 | Comp. 11 |
|---|---|---|---|---|---|---|
| Density | (g/cm$^3$) | ASTM D792 | 0.9177 | 0.9170 | 0.9156 | 0.9124 |
| Melt Index, I$_2$ | (dg/min) | ASTM D1238 | 0.92 | 0.70 | 0.95 | 0.92 |
| Film Thickness | mil | Micrometer | 1.0 | 1.0 | 1.0 | 1.0 |
| Film Hexane Extractables[a] | wt % | 21 CFR §177.1520 | 0.45 | 0.33 | 0.87 | 0.81 |
| S.I.T. @ 4.4N/13 mm[b] | ° C. | In-house | 83 | 102.3 | 96.9 | 88.1 |
| Tear MD | g/mil | ASTM D1922 | 321 | 189 | 270 | 277 |
| Tear TD | g/mil | ASTM D1922 | 670 | 462 | 541 | 533 |
| Dart Impact | g/mil | ASTM D1709 Method A | 404 | 569 | 695 | 770 |
| Lubricated Puncture | J/mm | In-house | 66 | 68 | 95 | 91 |
| Gloss at 45° |  | ASTM D2457 | 41 | 57 | 78 | 79 |
| Haze | % | ASTM D1003 | 16.1 | 8.6 | 5 | 4.1 |

[a] = 3.5 mil film (89 μm)
[b] = 2.0 mil film (51 μm)

TABLE 8B

Blown film physical properties of Examples and Comparatives; film thickness 1.0 mil (25 μm) unless indicated otherwise.

| Physical Property | Units | Method | Example 3 | Example 4 | Comp. 10 | Comp. 11 |
|---|---|---|---|---|---|---|
| Density | (g/cm$^3$) | ASTM D792 | 0.9177 | 0.9170 | 0.9156 | 0.9124 |
| Melt Index, I$_2$ | (dg/min) | ASTM D1238 | 0.92 | 0.70 | 0.95 | 0.92 |
| Film Thickness | mil | Micrometer | 1.0 | 1.0 | 1.0 | 1.0 |
| 1% Sec Modulus MD | MPa | ASTM D882 | 222 | 207 | 160 | 144 |
| 1% Sec Modulus TD | MPa | ASTM D882 | 251 | 236 | 165 | 146 |
| 2% Sec Modulus MD | MPa | ASTM D882 | 187 | 174 | 140 | 123 |
| 2% Sec Modulus TD | MPa | ASTM D882 | 210 | 199 | 142 | 124 |
| Tensile Break Str MD | MPa | ASTM D882 | 39.3 | 34.2 | 35.2 | 57.3 |
| Tensile Break Str TD | MPa | ASTM D882 | 39.5 | 34.1 | 51.6 | 47 |
| Elongation at Break MD | % | ASTM D882 | 531 | 461 | 499 | 639 |
| Elongation at Break TD | % | ASTM D882 | 748 | 618 | 869 | 803 |
| Tensile Yield Str MD | MPa | ASTM D882 | 10.0 | 9.8 | 8.4 | 7.7 |
| Tensile Yield Str TD | MPa | ASTM D882 | 10.8 | 10.7 | 8.6 | 7.3 |
| Tensile Elong at Yield MD | % | ASTM D882 | 9 | 10 | 10 | 10 |
| Tensile Elong at Yield TD | % | ASTM D882 | 9 | 10 | 10 | 10 |

TABLE 9A

Percent (%) improved SEC weight average molecular weight ($M_w$) at a reactor temperature of 130° C. and 90% ethylene conversion for the bridged metallocene catalyst formulation relative to the unbridged single site catalyst formulation.

| Weight % 1-octene in ethylene interpolymers | Bridged Metallocene Catalyst Formulation | | Unbridged Single Site Catalyst Formulation | | % Improved $M_w$ (see[3]) |
|---|---|---|---|---|---|
| | Component A | $M_w^A$ (see[1]) | Component C | $M_w^C$ (see[2]) | |
| 0.1 | CpF-1 | 520658 | PIC-1 | 493848 | 5.4 |
| 2.5 | CpF-1 | 216926 | PIC-1 | 165308 | 31 |
| 5.0 | CpF-1 | 179652 | PIC-1 | 130600 | 38 |
| 7.5 | CpF-1 | 160892 | PIC-1 | 113782 | 41 |
| 10.0 | CpF-1 | 148783 | PIC-1 | 103179 | 44 |
| 12.5 | CpF-1 | 140021 | PIC-1 | 95641 | 46 |
| 15.0 | CpF-1 | 133246 | PIC-1 | 89892 | 48 |
| 17.5 | CpF-1 | 127775 | PIC-1 | 85302 | 50 |
| 20.0 | CpF-1 | 123217 | PIC-1 | 81516 | 51 |
| 22.5 | CpF-1 | 119332 | PIC-1 | 78316 | 52 |
| 25.0 | CpF-1 | 115961 | PIC-1 | 75560 | 53 |
| 27.5 | CpF-1 | 112994 | PIC-1 | 73151 | 54 |
| 30.0 | CpF-1 | 110351 | PIC-1 | 71019 | 55 |
| 32.5 | CpF-1 | 107974 | PIC-1 | 69112 | 56 |
| 35.0 | CpF-1 | 105820 | PIC-1 | 67392 | 57 |
| 37.5 | CpF-1 | 103852 | PIC-1 | 65830 | 58 |
| 40.0 | CpF-1 | 102045 | PIC-1 | 64401 | 58 |
| 42.5 | CpF-1 | 100376 | PIC-1 | 63087 | 59 |
| 45.0 | CpF-1 | 98828 | PIC-1 | 61873 | 60 |

[1] $M_w^A = 278325 \times (\text{Octene}^{wt\ \%})^{-0.272}$; where ($\text{Octene}^{wt\ \%}$) is the weight % of octene in the ethylene/1-octene interpolymer
[2] $M_w^C = 225732 \times (\text{Octene}^{wt\ \%})^{-0.340}$
[3] $100\% \times (M_w^A - M_w^C)/M_w^C$

TABLE 9B

Percent (%) improved SEC weight average molecular weight ($M_w$) at a reactor temperature of 160° C. and 90% ethylene conversion for the bridged metallocene catalyst formulation relative to the unbridged single site catalyst formulation.

| Weight % 1-octene in ethylene interpolymers | Bridged Metallocene Catalyst Formulation | | Unbridged Single Site Catalyst Formulation | | % Improved $M_w$ (see[3]) |
|---|---|---|---|---|---|
| | Component A | $M_w^A$ (see[1]) | Component C | $M_w^C$ (see[2]) | |
| 0.1 | CpF-1 | 293273 | PIC-1 | 248166 | 18 |
| 2.5 | CpF-1 | 130734 | PIC-1 | 91198 | 43 |
| 5.0 | CpF-1 | 109858 | PIC-1 | 73513 | 49 |
| 7.5 | CpF-1 | 99227 | PIC-1 | 64804 | 53 |
| 10.0 | CpF-1 | 92315 | PIC-1 | 59257 | 56 |
| 12.5 | CpF-1 | 87287 | PIC-1 | 55285 | 58 |
| 15.0 | CpF-1 | 83382 | PIC-1 | 52237 | 60 |
| 17.5 | CpF-1 | 80217 | PIC-1 | 49792 | 61 |
| 20.0 | CpF-1 | 77573 | PIC-1 | 47766 | 62 |
| 22.5 | CpF-1 | 75314 | PIC-1 | 46048 | 64 |
| 25.0 | CpF-1 | 73348 | PIC-1 | 44564 | 65 |
| 27.5 | CpF-1 | 71614 | PIC-1 | 43262 | 66 |
| 30.0 | CpF-1 | 70067 | PIC-1 | 42107 | 66 |
| 32.5 | CpF-1 | 68673 | PIC-1 | 41072 | 67 |
| 35.0 | CpF-1 | 67408 | PIC-1 | 40136 | 68 |
| 37.5 | CpF-1 | 66251 | PIC-1 | 39284 | 69 |
| 40.0 | CpF-1 | 65186 | PIC-1 | 38504 | 69 |
| 42.5 | CpF-1 | 64202 | PIC-1 | 37784 | 70 |
| 45.0 | CpF-1 | 63287 | PIC-1 | 37119 | 70 |

[1] $M_w^A = 164540 \times (\text{Octene}^{wt\ \%})^{-0.251}$; where ($\text{Octene}^{wt\ \%}$) is the weight % of octene in the ethylene/1-octene interpolymer
[2] $M_w^C = 121267 \times (\text{Octene}^{wt\ \%})^{-0.311}$
[3] $100\% \times (M_w^A - M_w^C)/M_w^C$

TABLE 10A

Percent (%) improvement (reduction) in (α-olefin/ethylene) weight ratio in the reactor feed, for the bridged metallocene catalyst formulation relative to the unbridged single site catalyst formulation, to produce ethylene interpolymers at the densities shown (130° C. reactor temperature and about 90% ethylene conversion).

| | Bridged Metallocene Catalyst Formulation | | Unbridged Single Site Catalyst Formulation | | |
|---|---|---|---|---|---|
| Weight % 1-octene in ethylene interpolymers | Component A | (α-olefin/ethylene)$^A$ (see$^1$) | Component C | (α-olefin/ethylene)$^C$ (see$^2$) | % Reduced (α-olefin/ethylene) Ratio (see$^3$) |
| 0.0 | CpF-1 | 0.000 | PIC-1 | 0.00 | n/a |
| 2.5 | CpF-1 | 0.0075 | PIC-1 | 0.174 | −96% |
| 5.0 | CpF-1 | 0.045 | PIC-1 | 0.422 | −89% |
| 7.5 | CpF-1 | 0.088 | PIC-1 | 0.690 | −87% |
| 10.0 | CpF-1 | 0.136 | PIC-1 | 0.980 | −86% |
| 12.5 | CpF-1 | 0.188 | PIC-1 | 1.29 | −85% |
| 15.0 | CpF-1 | 0.246 | PIC-1 | 1.62 | −85% |
| 17.5 | CpF-1 | 0.309 | PIC-1 | 1.98 | −84% |
| 20.0 | CpF-1 | 0.377 | PIC-1 | 2.35 | −84% |
| 22.5 | CpF-1 | 0.449 | PIC-1 | 2.75 | −84% |
| 25.0 | CpF-1 | 0.527 | PIC-1 | 3.17 | −83% |
| 27.5 | CpF-1 | 0.610 | PIC-1 | 3.60 | −83% |
| 30.0 | CpF-1 | 0.698 | PIC-1 | 4.06 | −83% |
| 32.5 | CpF-1 | 0.790 | PIC-1 | 4.55 | −83% |
| 35.0 | CpF-1 | 0.888 | PIC-1 | 5.05 | −82% |
| 37.5 | CpF-1 | 0.991 | PIC-1 | 5.57 | −82% |
| 40.0 | CpF-1 | 1.10 | PIC-1 | 6.12 | −82% |
| 42.5 | CpF-1 | 1.21 | PIC-1 | 6.68 | −82% |
| 45.0 | CpF-1 | 1.33 | PIC-1 | 7.27 | −82% |

$^1$(α-olefin/ethylene)$^A$ = 0.0004 × (Octene$^{wt\%}$)$^2$ + 0.0121 × (Octene$^{wt\%}$) − 0.0253; where (Octene$^{wt\%}$) is the weight % of octene in the ethylene/1-octene interpolymer
$^2$(α-olefin/ethylene)$^C$ = 0.0017 × (Octene$^{wt\%}$)$^2$ + 0.0862 × (Octene$^{wt\%}$) − 0.0517
$^3$100% × ((α-olefin/ethylene)$^A$ − (α-olefin/ethylene)$^C$)/(α-olefin/ethylene)$^C$

TABLE 10B

Percent (%) improvement (reduction) in (α-olefin/ethylene) weight ratio in the reactor feed, for the bridged metallocene catalyst formulation relative to the unbridged single site catalyst formulation, to produce ethylene interpolymers at the densities shown (160° C. reactor temperature and about 90% ethylene conversion).

| | Bridged Metallocene Catalyst Formulation | | Unbridged Single Site Catalyst Formulation | | |
|---|---|---|---|---|---|
| Weight % 1-octene in ethylene interpolymers | Component A | (α-olefin/ethylene)$^A$ (see$^1$) | Component C | (α-olefin/ethylene)$^C$ (see$^2$) | % Reduced (α-olefin/ethylene) Ratio (see$^3$) |
| 0.0 | CpF-1 | 0.00 | PIC-1 | 0.00 | n/a |
| 2.5 | CpF-1 | 0.0078 | PIC-1 | 0.183 | −96% |
| 5.0 | CpF-1 | 0.031 | PIC-1 | 0.407 | −92% |
| 7.5 | CpF-1 | 0.066 | PIC-1 | 0.653 | −90% |
| 10.0 | CpF-1 | 0.112 | PIC-1 | 0.920 | −88% |
| 12.5 | CpF-1 | 0.170 | PIC-1 | 1.21 | −86% |
| 15.0 | CpF-1 | 0.238 | PIC-1 | 1.52 | −84% |
| 17.5 | CpF-1 | 0.318 | PIC-1 | 1.85 | −83% |
| 20.0 | CpF-1 | 0.409 | PIC-1 | 2.20 | −81% |
| 22.5 | CpF-1 | 0.512 | PIC-1 | 2.57 | −80% |
| 25.0 | CpF-1 | 0.625 | PIC-1 | 2.97 | −79% |
| 27.5 | CpF-1 | 0.750 | PIC-1 | 3.39 | −78% |
| 30.0 | CpF-1 | 0.886 | PIC-1 | 3.82 | −77% |
| 32.5 | CpF-1 | 1.03 | PIC-1 | 4.28 | −76% |
| 35.0 | CpF-1 | 1.19 | PIC-1 | 4.76 | −75% |
| 37.5 | CpF-1 | 1.36 | PIC-1 | 5.26 | −74% |
| 40.0 | CpF-1 | 1.54 | PIC-1 | 5.78 | −73% |
| 42.5 | CpF-1 | 1.74 | PIC-1 | 6.33 | −73% |
| 45.0 | CpF-1 | 1.94 | PIC-1 | 6.89 | −72% |

$^1$(α-olefin/ethylene)$^A$ = 0.0009 × (Octene$^{wt\%}$)$^2$ + 0.0027 × (Octene$^{wt\%}$) − 0.0046; where (Octene$^{wt\%}$) is the weight % of octene in the ethylene/1-octene interpolymer
$^2$(α-olefin/ethylene)$^C$ = 0.0017 × (Octene$^{wt\%}$)$^2$ + 0.0771 × (Octene$^{wt\%}$) − 0.0208
$^3$100% × ((α-olefin/ethylene)$^A$ − (α-olefin/ethylene)$^C$)/(α-olefin/ethylene)$^C$

TABLE 11

CPU continuous solution phase, one reactor, ethylene homopolymerization using the bridged metallocene catalyst formulation.

| | Polymerization Temp. (° C.) | | | | | |
|---|---|---|---|---|---|---|
| | 130 | | 160 | | 190 | |
| Sample Code | Example C1 | Example C2 | Example C3 | Example C4 | Example C5 | Example C6 |
| Component A[1] Concentration in Reactor [mM/L] | 0.15 | 0.47 | 0.19 | 0.82 | 0.22 | 0.93 |
| ([M]/[A]) mole ratio | 100 | 100 | 100 | 100 | 100 | 100 |
| ([P]/[M]) mole ratio | 0.40 | 0.40 | 0.40 | 0.40 | 0.40 | 0.40 |
| ([B]/[A]) mole ratio | 1.20 | 1.20 | 1.20 | 1.20 | 1.20 | 1.20 |
| $HUT^{CPU}$ (min) | 119 | 119 | 109 | 109 | 99 | 99 |
| $Q^{CPU}$ (%) | 74.5 | 94.2 | 74.9 | 94.4 | 75.5 | 94.8 |
| $K_p^{CPU}$ (L/(mM · min)) | 12731 | 22328 | 11727 | 15704 | 13116 | 17761 |

[1]CpF-2 = [(2,7-tBu$_2$Flu)Ph$_2$C(Cp)HfMe$_2$]

TABLE 12

13C-NMR determined long chain branching (LCB) in the first ethylene interpolymer (ethylene homopolymer) produced using the bridged metallocene catalyst formulation[1] on the CPU.

| Sample | Example C10 | Example C11 | Example C12 | Example C13 | Example C14 | Example C15 |
|---|---|---|---|---|---|---|
| CPU Reactor Temp. (° C.) | 190 | 190 | 160 | 160 | 130 | 130 |
| CPU Ethylene Conversion (wt %) | 95.6 | 85.3 | 95.0 | 75.3 | 93.6 | 85.1 |
| CPU [ethylene] out (wt. %) | 0.62 | 2.10 | 0.57 | 2.80 | 0.53 | 1.23 |
| $^{13}$C LCB/1000 C | 0.23 | 0.09 | 0.09 | 0.03 | 0.07 | 0.03 |
| GPC $M_w$ (g/mol) | 46337 | 93368 | 107818 | 255097 | 234744 | 305005 |
| Pd ($M_w/M_n$) | 1.88 | 1.88 | 1.85 | 1.9 | 2.02 | 2.29 |
| $^{13}$C-NMR, C1/1000 C | 2.37 | 1.68 | 1.64 | 0.98 | 0.94 | 0.73 |
| $^{13}$C-NMR, C2/1000 C | 0.2 | 0.14 | 0.17 | 0.10 | 0.12 | 0.09 |
| $^{13}$C-NMR, C3/1000 C | 0.08 | 0.05 | 0.05 | D[2] | D | D |
| $^{13}$C-NMR, C4/1000 C | 0.07 | 0.05 | 0.05 | D | D | D |
| $^{13}$C-NMR, (C6 + LCB)/1000 C | 0.3 | 0.12 | 0.12 | D | 0.07 | D |
| $^{13}$C-NMR, Sat. Term./1000 C | 1.1 | 0.52 | 0.47 | 0.22 | 0.23 | 0.21 |
| $M_n$ (g/mol) | 24640 | 49615 | 58131 | 118329 | 116035 | 133001 |
| $M_z$ (g/mol) | 73219 | 152320 | 176254 | 383637 | 447833 | 567658 |
| $I_2$ (dg/min) | 16.6 | n/a | 0.15 | n/a | n/a | n/a |
| $I_{21}$ (dg/min) | 380 | n/a | 10 | 0.54 | 0.53 | 0.12 |
| $I_{21}/I_2$ | 22.9 | n/a | 66.1 | n/a | n/a | n/a |

[1]Component A = [(2,7-tBu$_2$Flu)Ph$_2$C(Cp)HfMe$_2$]
D = detectable but not quantifiable

What is claimed is:

1. A polyethylene film comprising at least one layer, wherein the layer comprises at least one ethylene interpolymer product comprising:
   (i) a first ethylene interpolymer;
   (ii) a second ethylene interpolymer, and;
   (iii) optionally a third ethylene interpolymer;
   wherein the ethylene interpolymer product has:
   a dimensionless Long Chain Branching Factor, LCBF, greater than or equal to about 0.001;
   from about 0.0015 ppm to about 2.4 ppm of hafnium;
   has from about 0.1 ppm to about 11.4 ppm of titanium; and
   a density from about 0.862 to about 0.975 g/cc; wherein density is measured according to ASTM D792.

2. The polyethylene film according to claim 1, wherein ethylene interpolymer product further comprising one or more of the following:
   (i) greater than or equal to about 0.02 terminal vinyl unsaturations per 100 carbon atoms;
   (ii) greater than or equal to about 0.12 parts per million (ppm) of a total catalytic metal.

3. The polyethylene film according to claim 1, wherein the ethylene interpolymer product has a melt index from about 0.3 to about 500 dg/minute; wherein melt index is measured according to ASTM D1238 (2.16 kg load and 190° C.).

4. The polyethylene film according to claim 1, wherein the ethylene interpolymer product has a $M_w/M_n$ from about 2 to about 25.

5. The polyethylene film according to claim 1, wherein the ethylene interpolymer product has a CDBI$_{50}$ from about 20% to about 98%.

6. The polyethylene film according to claim 1, wherein
   i) the first ethylene interpolymer is from about 5 to about 60 weight percent of the ethylene interpolymer product;

(ii) the second ethylene interpolymer is from about 20 to about 95 weight percent of the ethylene interpolymer product, and;

(iii) optionally the third ethylene interpolymer is from about 0 to about 30 weight percent of the ethylene interpolymer product;

wherein weight percent is the weight of the first, the second or the optional third ethylene interpolymer, individually, divided by the weight of the ethylene interpolymer product.

7. The polyethylene film according to claim 1, wherein
(i) the first ethylene interpolymer has a melt index from about 0.01 to about 200 dg/minute;
(ii) the second ethylene interpolymer has melt index from about 0.3 to about 1000 dg/minute, and;
(iii) optionally the third ethylene interpolymer has a melt index from about 0.5 to about 2000 dg/minute;
wherein melt index is measured according to ASTM D1238 (2.16 kg load and 190° C.).

8. The polyethylene film according to claim 1, wherein
(i) the first ethylene interpolymer has a density from about 0.855 g/cm$^3$ to about 0.975 g/cc;
(ii) the second ethylene interpolymer has a density from about 0.89 g/cm$^3$ to about 0.975 g/cc, and;
(iii) optionally the third ethylene interpolymer has density from about 0.855 g/cm$^3$ to about 0.975 g/cc;
wherein density is measured according to ASTM D792.

9. The polyethylene film according to claim 1, wherein the ethylene interpolymer product is manufactured using a solution polymerization process.

10. The polyethylene film according to claim 1, wherein the ethylene interpolymer product further comprises from 0 to about 10 mole percent of one or more α-olefin.

11. The polyethylene film according to claim 10, wherein the one or more α-olefin are $C_3$ to $C_{10}$ α-olefins.

12. The polyethylene film according to claim 10, wherein the one or more α-olefin is 1-hexene, 1-octene or a mixture of 1-hexene and 1-octene.

13. The polyethylene film according to claim 1, wherein the first ethylene interpolymer is produced using at least one homogeneous catalyst formulation.

14. The polyethylene film according to claim 1, wherein the first ethylene interpolymer is produced using a first homogeneous catalyst formulation.

15. The polyethylene film according to claim 14, wherein the first homogeneous catalyst formulation is a bridged metallocene catalyst formulation.

16. The polyethylene film according to claim 15, wherein the bridged metallocene catalyst formulation comprises a component A defined by Formula (I)

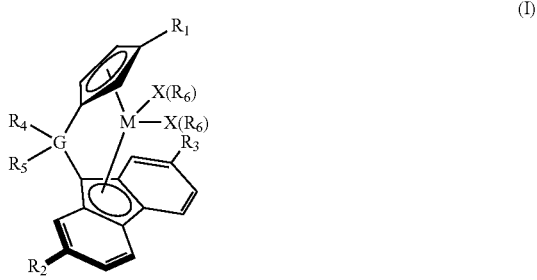

(I)

wherein M is a metal selected from titanium, hafnium and zirconium; G is the element carbon, silicon, germanium, tin or lead; X represents a halogen atom, $R_6$ groups are independently selected from a hydrogen atom, a $C_{1-20}$ hydrocarbyl radical, a $C_{1-20}$ alkoxy radical or a $C_{6-10}$ aryl oxide radical, these radicals may be linear, branched or cyclic or further substituted with halogen atoms, $C_{1-10}$ alkyl radicals, $C_{1-10}$ alkoxy radicals, $C_{6-10}$ aryl or aryloxy radicals; $R_1$ represents a hydrogen atom, a $C_{1-20}$ hydrocarbyl radical, a $C_{1-20}$ alkoxy radical or a $C_{6-10}$ aryl oxide radical; $R_2$ and $R_3$ are independently selected from a hydrogen atom, a $C_{1-20}$ hydrocarbyl radical, a $C_{1-20}$ alkoxy radical or a $C_{6-10}$ aryl oxide radical, and; $R_4$ and $R_5$ are independently selected from a hydrogen atom, a $C_{1-20}$ hydrocarbyl radial, a $C_{1-20}$ alkoxy radical or a $C_{6-10}$ aryl oxide radical.

17. The polyethylene film according to claim 1, wherein the second ethylene interpolymer is produced using a first heterogeneous catalyst formulation; optionally, the third ethylene interpolymer is produced using the first heterogeneous catalyst formulation or a second heterogeneous catalyst formulation.

18. The polyethylene film according to claim 17, wherein the first and the second heterogeneous catalyst formulations are a first and a second in-line Ziegler-Natta catalyst formulation; optionally, the first and the second in-line Ziegler-Natta catalyst formulations are the same formulation.

19. The polyethylene film according to claim 17, wherein the first and the second heterogeneous catalyst formulations are a first and a second batch Ziegler-Natta catalyst formulation; optionally, the first and the second batch Ziegler-Natta catalyst formulations are the same formulation.

20. The polyethylene film according to claim 16, wherein the third ethylene interpolymer is produced using a fifth homogeneous catalyst formulation.

21. The polyethylene film according to claim 20, wherein the fifth homogeneous catalyst formulation is the bridged metallocene catalyst formulation, a third homogeneous catalyst formulation or a fourth homogeneous catalyst formulation.

22. The polyethylene film according to claim 21, wherein the third homogeneous catalyst formulation is an unbridged single site catalyst formulation comprising a component C defined by Formula (II)

$$(L^A)_a M(Pl)_b (Q)_n \tag{II}$$

wherein M is a metal selected from titanium, hafnium and zirconium; $L^A$ is selected from the group consisting of unsubstituted cyclopentadienyl, substituted cyclopentadienyl, unsubstituted indenyl, substituted indenyl, unsubstituted fluorenyl and substituted fluorenyl; Pl is a phosphinimine ligand; Q is independently selected from the group consisting of a hydrogen atom, a halogen atom, a $C_{1-10}$ hydrocarbyl radical, a $C_{1-10}$ alkoxy radical and a $C_{5-10}$ aryl oxide radical; wherein each of the hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and (a+b+n) is equivalent to the valence of the metal M.

23. The polyethylene film according to claim 22, wherein the fourth homogeneous catalyst formulation comprises a bulky metal-ligand complex that is not a member of the chemical genera defined by Formula (I) or Formula (II).

24. The polyethylene film according to claim 15, wherein the ethylene interpolymer product contains ≤2.4 ppm of a catalytic metal A, wherein the catalytic metal A originates from the bridged metallocene catalyst formulation.

25. The polyethylene film according to claim 24; wherein the catalytic metal A is hafnium.

26. The polyethylene film according to claim 17, wherein the ethylene interpolymer product contains a catalytic metal Z1 and optionally a catalytic metal Z2 and the total amount of the catalytic metal Z1 plus the catalytic metal Z2 is from about 0.1 to about 12 parts per million; wherein the catalytic metal Z1 originates from the first heterogeneous catalyst formulation and the catalytic metal Z2 originates from the second heterogeneous catalyst formulation; optionally the catalytic metal Z1 and the catalytic metal Z2 are the same metal.

27. The polyethylene film according to claim 26; wherein the catalytic metal Z1 and the catalytic metal Z2, are independently selected from titanium, zirconium, hafnium, vanadium, niobium, tantalum, chromium, molybdenum, tungsten, manganese, technetium, rhenium, iron, ruthenium or osmium.

28. The polyethylene film according to claim 26; wherein the catalytic metal Z1 and the catalytic metal Z2, are independently selected from titanium, zirconium, hafnium, vanadium or chromium.

29. The polyethylene film according to claim 20, wherein the ethylene interpolymer product contains ≤0.9 ppm of a catalytic metal D; wherein the catalytic metal D originates from the fourth homogeneous catalyst formulation.

30. The polyethylene film according to claim 29; wherein the catalytic metal D is titanium, zirconium, or hafnium.

31. The polyethylene film according to claim 1, wherein the first ethylene interpolymer has a first $M_w/M_n$ from about 1.7 to about 2.8, the second ethylene interpolymer has a second $M_w/M_n$ from about 2.2 to about 4.4 and the optional third ethylene interpolymer has a third $M_w/M_n$ from about 1.7 to about 5.0.

32. The polyethylene film according to claim 31, wherein the first $M_w/M_n$ is lower than the second $M_w/M_n$.

33. The polyethylene film according to claim 1, wherein the first ethylene interpolymer has a first $CDBI_{50}$ from about 70 to about 98%, the second ethylene interpolymer has a second $CDBI_{50}$ from about 45 to about 98% and the optional third ethylene interpolymer has a third $CDBI_{50}$ from about 35 to about 98%.

34. The polyethylene film according to claim 33; wherein the first $CDBI_{50}$ is higher than the second $CDBI_{50}$.

35. The polyethylene film according to claim 1, wherein a machine direction secant modulus measured at 1% strain is at least 25% higher and a transverse direction secant modulus measured at 1% strain is at least 40% higher; relative to a comparative polyethylene film of the same composition but the first ethylene interpolymer in the ethylene interpolymer product is replaced with a comparative ethylene interpolymer; wherein the first ethylene interpolymer is produced with a bridged metallocene catalyst formulation and the comparative ethylene interpolymer is produced with an unbridged single site catalyst formulation; wherein secant modui was determined according to ASTM D882.

36. The polyethylene film according to claim 1, wherein a machine direction secant modulus measured at 2% strain is at least 20% higher and a transverse direction secant modulus measured at 2% strain is at least 40% higher; relative to a comparative polyethylene film of the same composition but the first ethylene interpolymer in the ethylene interpolymer product is replaced with a comparative ethylene interpolymer; wherein the first ethylene interpolymer is produced with a bridged metallocene catalyst formulation and the comparative ethylene interpolymer is produced with an unbridged single site catalyst formulation; wherein secant modui was determined according to ASTM D882.

37. The polyethylene film according to claim 1, wherein a weight % hexane extractable is improved, by being at least 40% lower, relative to a comparative polyethylene film of the same composition but the first ethylene interpolymer in the ethylene interpolymer product is replaced with a comparative ethylene interpolymer; wherein the first ethylene interpolymer is produced with a bridged metallocene catalyst formulation and the comparative ethylene interpolymer is produced with an unbridged single site catalyst formulation; wherein weight % hexane extractables was determined according to Code of Federal Registration 21 CFR § 117.1520 Para (c) 3.1 and 3.2.

38. The polyethylene film according to claim 1, wherein a machine direction Elmendorf tear strength is improved, by being at least 15% higher, relative to a comparative polyethylene film of the same composition but the first ethylene interpolymer in the ethylene interpolymer product is replaced with a comparative ethylene interpolymer; wherein the first ethylene interpolymer is produced with a bridged metallocene catalyst formulation and the comparative ethylene interpolymer is produced with an unbridged single site catalyst formulation; wherein both the first ethylene interpolymer and the comparative ethylene interpolymer are produced in a dual reactor solution process, wherein a first reactor and a second reactor are configured in parallel; wherein Elmendorf tear was determined according to ASTM D1922-09.

39. The polyethylene film according to claim 1, wherein a seal initiation temperature is improved, by being at least 5% lower, relative to a comparative polyethylene film of the same composition but the first ethylene interpolymer in the ethylene interpolymer product is replaced with a comparative ethylene interpolymer; wherein the first ethylene interpolymer is produced with a bridged metallocene catalyst formulation and the comparative ethylene interpolymer is produced with an unbridged single site catalyst formulation; wherein both the first ethylene interpolymer and the comparative ethylene interpolymer are produced in a dual reactor solution process, wherein a first reactor and a second reactor are configured in parallel.

40. The polyethylene film according to claim 1, wherein the layer further comprises at least one second polymer.

41. The polyethylene film according to claim 40, wherein the second polymer is an ethylene polymer, a propylene polymer or a mixture of the ethylene polymer and the propylene polymer.

42. The polyethylene film according to claim 1, wherein the film has a thickness form about 0.5 mil to about 10 mil.

43. The polyethylene film according to claim 1, wherein the film comprises from 2 to 11 layers, wherein at least one layer comprises the ethylene interpolymer product.

* * * * *